(12) United States Patent
Bednarek et al.

(10) Patent No.: US 8,366,883 B2
(45) Date of Patent: Feb. 5, 2013

(54) PRESSURIZED VAPOR CYCLE LIQUID DISTILLATION

(75) Inventors: David F. Bednarek, North Hampton, NH (US); Robert Andrew Charles, New Boston, NH (US); Andrew Coll, Manchester, NH (US); Jason A. Demers, Manchester, NH (US); Timothy P. Duggan, Epsom, NH (US); Gustav Heinzmann, Manchester, NH (US); Joseph A. Hoell, Jr., Dunbarton, NH (US); James L. Jackson, Brookline, NH (US); Scott A. Leonard, Bedford, NH (US); David W. McGill, Bedford, NH (US); Kingston Owens, Bedford, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 11/480,294

(22) Filed: Jun. 30, 2006

(65) Prior Publication Data

US 2007/0017192 A1    Jan. 25, 2007

Related U.S. Application Data

(63) Continuation-in-part of application No. 10/713,617, filed on Nov. 13, 2003, now Pat. No. 7,597,784.

(60) Provisional application No. 60/518,782, filed on Nov. 10, 2003, provisional application No. 60/490,615, filed on Jul. 28, 2003, provisional application No. 60/425,820, filed on Nov. 13, 2002.

(51) Int. Cl.
| | |
|---|---|
| *B01D 1/28* | (2006.01) |
| *B01D 3/42* | (2006.01) |
| *C02F 1/04* | (2006.01) |
| *F04B 49/03* | (2006.01) |
| *F04B 49/04* | (2006.01) |

(52) U.S. Cl. ............ 203/1; 55/404; 159/24.1; 159/24.2; 159/44; 159/47.1; 159/DIG. 20; 202/182; 202/202; 203/10; 203/21; 203/100; 203/DIG. 8; 203/DIG. 18; 417/68; 417/200; 417/208; 417/297.5

(58) Field of Classification Search ................ 159/24.1, 159/24.2, 44, 47.1, DIG. 20; 202/182, 202; 203/1, 10, 21, 100, DIG. 8, DIG. 18; 417/68, 417/200, 208, 297.5; 55/404
See application file for complete search history.

(56) References Cited

U.S. PATENT DOCUMENTS

| | | | | |
|---|---|---|---|---|
| 1,668,532 | A | | 5/1928 | Stewart ............................ 417/67 |
| 2,532,267 | A | | 11/1950 | Chase .............................. 62/115 |
| 3,455,791 | A | | 7/1969 | Nash et al. ...................... 203/24 |
| 3,603,082 | A | | 9/1971 | Sneeden et al. ............... 60/39.36 |
| 3,753,335 | A | | 8/1973 | Morris .............................. 55/29 |
| 3,820,014 | A | * | 6/1974 | Ludt .............................. 324/439 |
| 3,891,496 | A | | 6/1975 | Erwin .......................... 159/47.1 |
| 3,911,694 | A | * | 10/1975 | Doerner .......................... 62/499 |
| 3,950,216 | A | | 4/1976 | Bruns .......................... 159/13.1 |
| 3,956,072 | A | | 5/1976 | Huse .............................. 202/177 |
| 4,002,538 | A | | 1/1977 | Pottharst, Jr. ................... 203/10 |
| 4,030,985 | A | | 6/1977 | Barba et al. ................... 202/174 |
| 4,045,293 | A | | 8/1977 | Cooksley ........................ 203/10 |

(Continued)

*Primary Examiner* — Virginia Manoharan
(74) *Attorney, Agent, or Firm* — Michelle Saquet Temple

(57) ABSTRACT

Embodiments of the invention are directed toward a novel pressurized vapor cycle for distilling liquids. In some embodiments of the invention, a liquid purification system is revealed, including the elements of an input for receiving untreated liquid, a vaporizer coupled to the input for transforming the liquid to vapor, a head chamber for collecting the vapor, a vapor pump with an internal drive shaft and an eccentric rotor with a rotatable housing for compressing vapor, and a condenser in communication with the vapor pump for transforming the compressed vapor into a distilled product. Other embodiments of the invention are directed toward heat management, and other process enhancements for making the system especially efficient.

3 Claims, 55 Drawing Sheets

U.S. PATENT DOCUMENTS

| | | | | |
|---|---|---|---|---|
| 4,106,560 | A | 8/1978 | Lauro | 165/159 |
| 4,134,939 | A | 1/1979 | Zardi et al. | 261/112.1 |
| 4,148,211 | A | 4/1979 | Sawa et al. | 73/23.31 |
| 4,154,642 | A | 5/1979 | Mattern et al. | 159/13.2 |
| 4,159,227 | A | 6/1979 | Sundquist | 202/185 A |
| 4,168,211 | A | 9/1979 | Pottharst, Jr. | 203/10 |
| 4,199,537 | A | 4/1980 | Zardi et al. | 261/112 |
| 4,232,734 | A | 11/1980 | Hatje et al. | 165/118 |
| 4,248,296 | A | 2/1981 | Jezek | 165/118 |
| 4,259,160 | A | 3/1981 | McClure | 203/1 |
| 4,260,461 | A | 4/1981 | Pottharst, Jr. | 203/7 |
| 4,309,243 | A | 1/1982 | Sundquist | 159/24.3 |
| 4,316,774 | A | 2/1982 | Trusch | 203/11 |
| 4,317,786 | A | 3/1982 | Lagana | 261/112.1 |
| 4,317,787 | A | 3/1982 | Lagana | 261/112.1 |
| 4,423,766 | A * | 1/1984 | Bernhardt et al. | 165/302 |
| 4,437,933 | A | 3/1984 | Kikkawa et al. | 159/17 R |
| 4,444,675 | A | 4/1984 | Goeldner | 252/175 |
| 4,511,436 | A | 4/1985 | el Din Nasser | 202/174 |
| 4,520,868 | A | 6/1985 | Grawey | 165/158 |
| 4,521,161 | A | 6/1985 | Olsen et al. | 417/68 |
| 4,532,985 | A | 8/1985 | Cutler | 165/118 |
| 4,536,258 | A | 8/1985 | Huhta-Koivisto | 202/180 |
| 4,537,039 | A | 8/1985 | Fearon | 62/182 |
| 4,539,076 | A | 9/1985 | Swain | 202/154 |
| 4,551,070 | A | 11/1985 | Olsen et al. | 417/68 |
| 4,561,940 | A * | 12/1985 | Meier | 202/181 |
| 4,572,287 | A | 2/1986 | Allo et al. | 165/118 |
| 4,585,523 | A | 4/1986 | Giddings | 202/236 |
| 4,586,985 | A | 5/1986 | Ciocca et al. | 202/174 |
| 4,597,835 | A | 7/1986 | Moss | 203/89 |
| 4,636,283 | A | 1/1987 | Nasser | 202/173 |
| 4,671,856 | A | 6/1987 | Sears | 203/22 |
| 4,686,009 | A * | 8/1987 | McCabe | 202/176 |
| 4,707,220 | A | 11/1987 | Feres | 159/6.1 |
| 4,731,159 | A | 3/1988 | Porter et al. | 159/6.1 |
| 4,734,167 | A | 3/1988 | Goeldner | 202/176 |
| 4,747,752 | A | 5/1988 | Somarakis | 417/48 |
| 4,799,542 | A | 1/1989 | Sladky | 165/118 |
| 4,822,455 | A | 4/1989 | Olrik | 202/236 |
| 4,857,144 | A | 8/1989 | Casparian | 159/13.2 |
| 4,869,067 | A | 9/1989 | Sears | 60/645 |
| 4,877,489 | A * | 10/1989 | Lloyd | 202/181 |
| 4,925,526 | A | 5/1990 | Havukainen | 159/13.3 |
| 4,948,514 | A | 8/1990 | MacGregor et al. | 210/748 |
| 4,984,432 | A | 1/1991 | Corey | 62/87 |
| 4,994,097 | A | 2/1991 | Brouwers | 55/317 |
| 5,045,155 | A | 9/1991 | Ramsland | 202/174 |
| 5,053,110 | A * | 10/1991 | Deutsch | 202/176 |
| 5,054,547 | A | 10/1991 | Shipley | 165/115 |
| 5,061,376 | A | 10/1991 | MacGregor | 210/748 |
| 5,073,177 | A | 12/1991 | Brouwers | 55/317 |
| 5,074,998 | A | 12/1991 | De Baat Doelman | 210/97 |
| 5,100,300 | A | 3/1992 | Haavik | 417/68 |
| 5,108,548 | A | 4/1992 | Keane et al. | 202/182 |
| 5,127,926 | A * | 7/1992 | Baker et al. | 95/47 |
| 5,171,431 | A | 12/1992 | Schulte | 210/94 |
| 5,197,863 | A | 3/1993 | Dardis et al. | 417/68 |
| 5,217,065 | A | 6/1993 | Green et al. | 165/117 |
| 5,217,352 | A | 6/1993 | Haavik | 417/68 |
| 5,222,869 | A | 6/1993 | Wunner et al. | 417/68 |
| 5,236,555 | A * | 8/1993 | Yuan | 202/153 |
| 5,238,369 | A * | 8/1993 | Farr | 417/18 |
| 5,246,541 | A | 9/1993 | Ryham | 159/13.2 |
| 5,251,593 | A | 10/1993 | Pedersen | 123/204 |
| 5,294,303 | A | 3/1994 | Robbins | 203/10 |
| 5,295,794 | A | 3/1994 | Haavik | 417/68 |
| 5,317,882 | A | 6/1994 | Ritenour | 62/268 |
| 5,350,519 | A * | 9/1994 | Kaschemekat et al. | 210/640 |
| 5,370,502 | A | 12/1994 | Haavik et al. | 417/68 |
| 5,395,215 | A | 3/1995 | Dardis et al. | 417/68 |
| 5,409,576 | A | 4/1995 | Tleimat | 202/174 |
| 5,411,640 | A | 5/1995 | Ramsland | 202/174 |
| 5,415,223 | A | 5/1995 | Reavis et al. | 165/96 |
| 5,507,625 | A | 4/1996 | Dudeck | 417/68 |
| 5,513,697 | A | 5/1996 | Gudmundsson | 165/88 |
| 5,514,283 | A | 5/1996 | Stefanini | 210/695 |
| 5,516,706 | A | 5/1996 | Kusakabe | 438/476 |
| 5,534,118 | A * | 7/1996 | McCutchen | 202/205 |
| 5,580,448 | A | 12/1996 | Brandreth, III | 210/206 |
| 5,587,054 | A | 12/1996 | Keith | 202/182 |
| 5,591,317 | A | 1/1997 | Pitts, Jr. | 204/667 |
| 5,597,453 | A | 1/1997 | Sears | 203/24 |
| 5,599,429 | A | 2/1997 | Martin et al. | 202/176 |
| 5,606,723 | A | 2/1997 | Morse et al. | 422/186 |
| 5,614,086 | A | 3/1997 | Hill et al. | 210/170 |
| 5,645,124 | A | 7/1997 | Hartfield et al. | 165/117 |
| 5,645,694 | A | 7/1997 | Stewart et al. | 203/22 |
| 5,653,582 | A | 8/1997 | Harvey et al. | 417/68 |
| 5,667,543 | A | 9/1997 | Brouwers | 55/317 |
| 5,667,683 | A | 9/1997 | Benian | 210/409 |
| 5,670,041 | A | 9/1997 | Cho et al. | 210/222 |
| 5,673,721 | A | 10/1997 | Alcocer | 137/13 |
| 5,683,579 | A | 11/1997 | Lopes | 210/222 |
| 5,683,586 | A | 11/1997 | Harcourt et al. | 210/695 |
| 5,710,536 | A | 1/1998 | Fastman | 336/200 |
| 5,725,778 | A | 3/1998 | Cho et al. | 210/695 |
| 5,729,987 | A * | 3/1998 | Miller | 62/98 |
| 5,738,766 | A | 4/1998 | Jefferson | 204/155 |
| 5,755,970 | A | 5/1998 | Fourqurean et al. | 210/695 |
| 5,761,903 | A | 6/1998 | Straka | 60/278 |
| 5,772,850 | A | 6/1998 | Morris | 202/237 |
| 5,776,334 | A | 7/1998 | Cho | 210/138 |
| 5,810,976 | A | 9/1998 | Keith | 202/182 |
| 5,814,192 | A | 9/1998 | Pittmon et al. | 202/182 |
| 5,817,224 | A | 10/1998 | Pitts, Jr. | 204/571 |
| 5,834,784 | A | 11/1998 | Morgan et al. | 250/436 |
| 5,846,414 | A | 12/1998 | Cho | 210/222 |
| 5,858,177 | A | 1/1999 | Morris | 203/26 |
| 5,901,568 | A | 5/1999 | Haga | 62/324.6 |
| 5,916,490 | A | 6/1999 | Cho | 261/72.1 |
| 5,951,856 | A | 9/1999 | Cho | 210/138 |
| 5,961,295 | A | 10/1999 | Haavik et al. | 417/68 |
| 5,968,321 | A | 10/1999 | Sears | 202/172 |
| 5,973,481 | A | 10/1999 | Thompson et al. | 322/7 |
| 6,063,267 | A | 5/2000 | Crewson et al. | 210/143 |
| 6,113,744 | A | 9/2000 | Munro | 202/167 |
| 6,261,419 | B1 | 7/2001 | Zebuhr | 202/172 |
| 6,319,408 | B1 | 11/2001 | Zebuhr | 210/624 |
| 6,328,536 | B1 | 12/2001 | Zebuhr | 417/259 |
| 6,423,187 | B1 | 7/2002 | Zebuhr | 202/236 |
| 6,508,915 | B1 * | 1/2003 | Osuda et al. | 203/1 |
| 6,536,207 | B1 | 3/2003 | Kamen et al. | 60/39.6 |
| 6,592,338 | B2 | 7/2003 | Zebuhr | 417/259 |
| 6,598,409 | B2 * | 7/2003 | Shyy et al. | 62/115 |

* cited by examiner

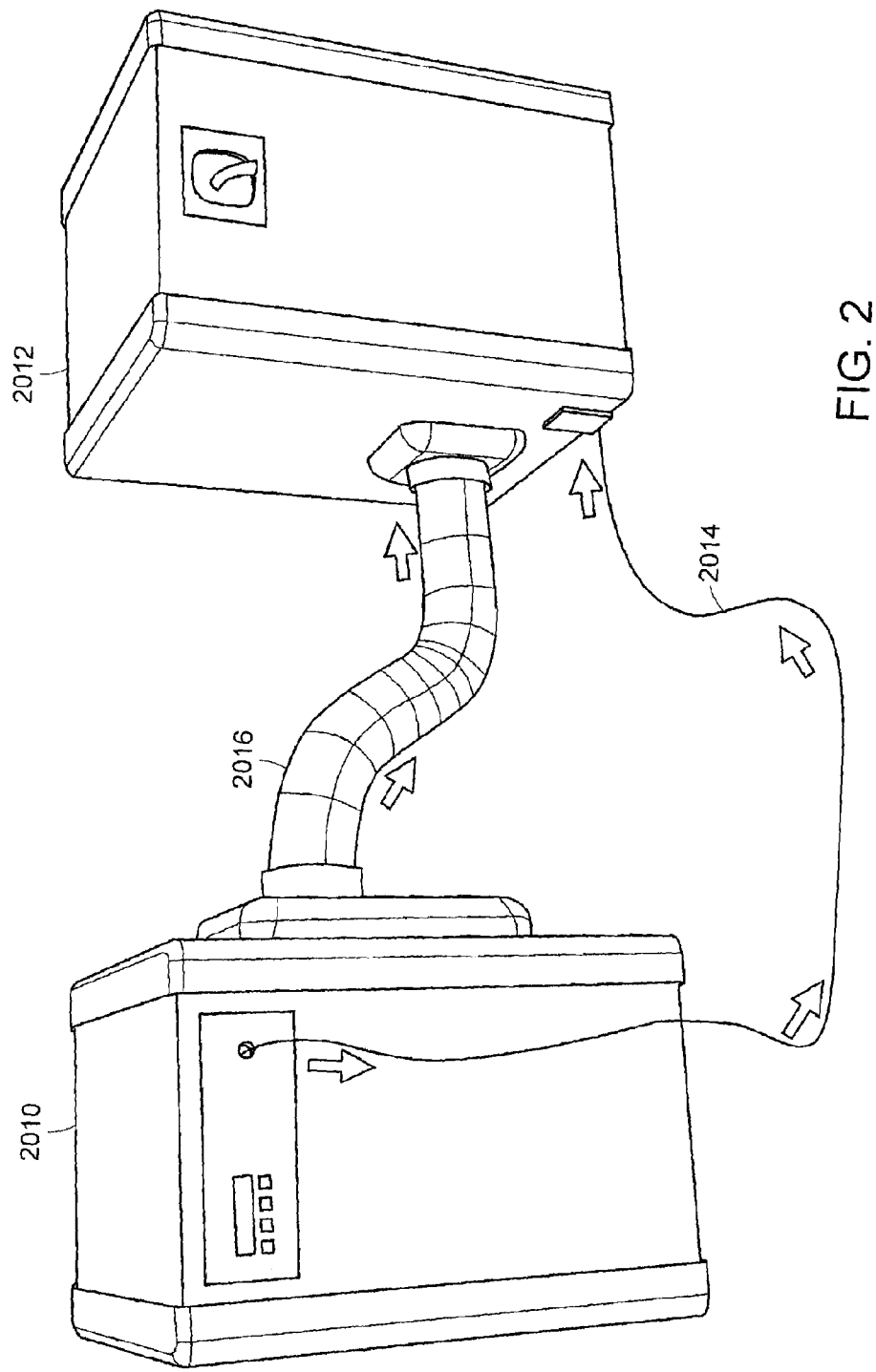

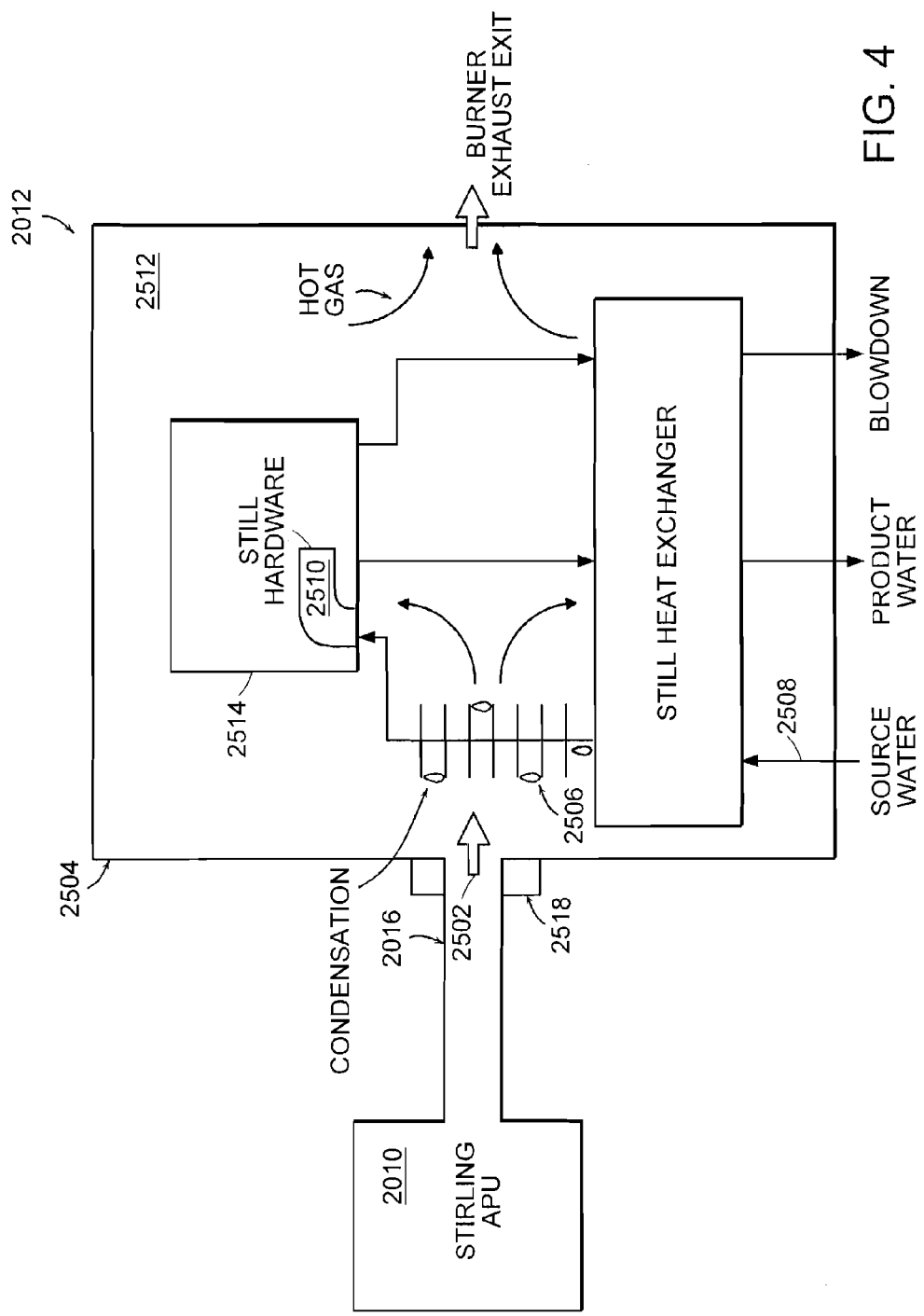

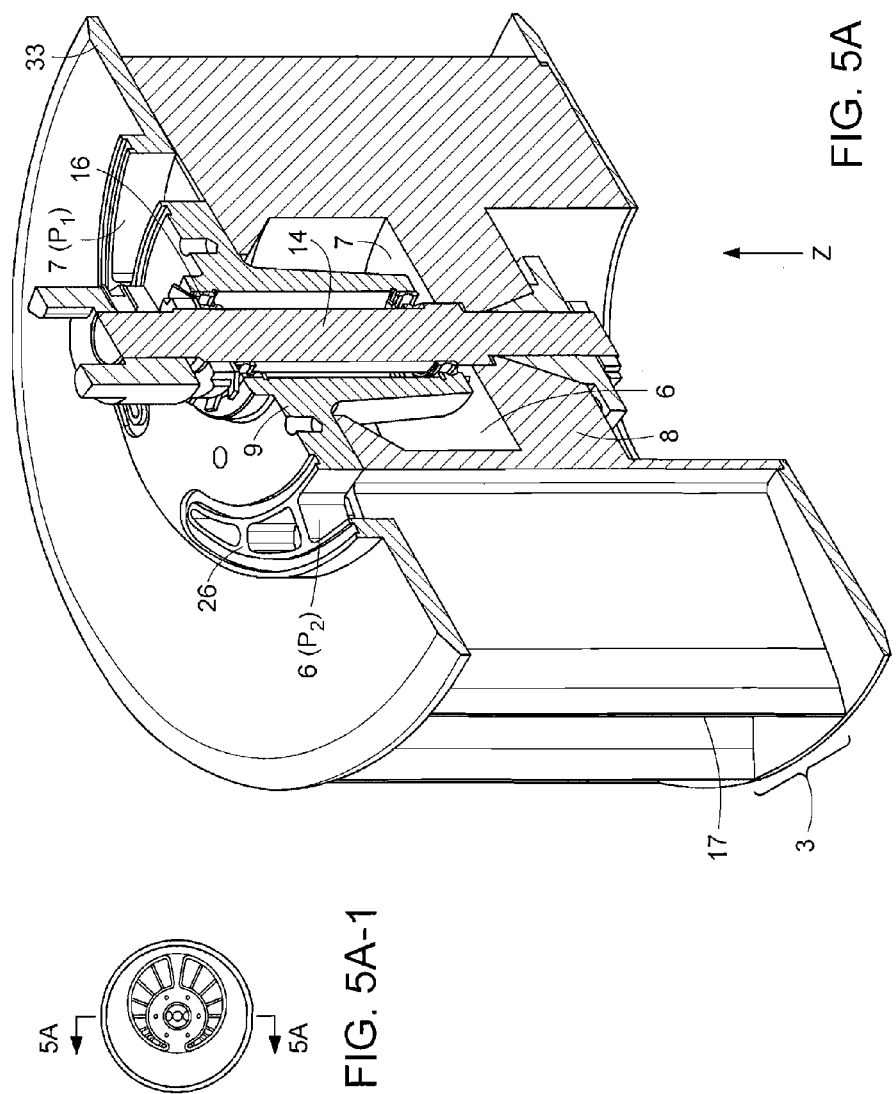

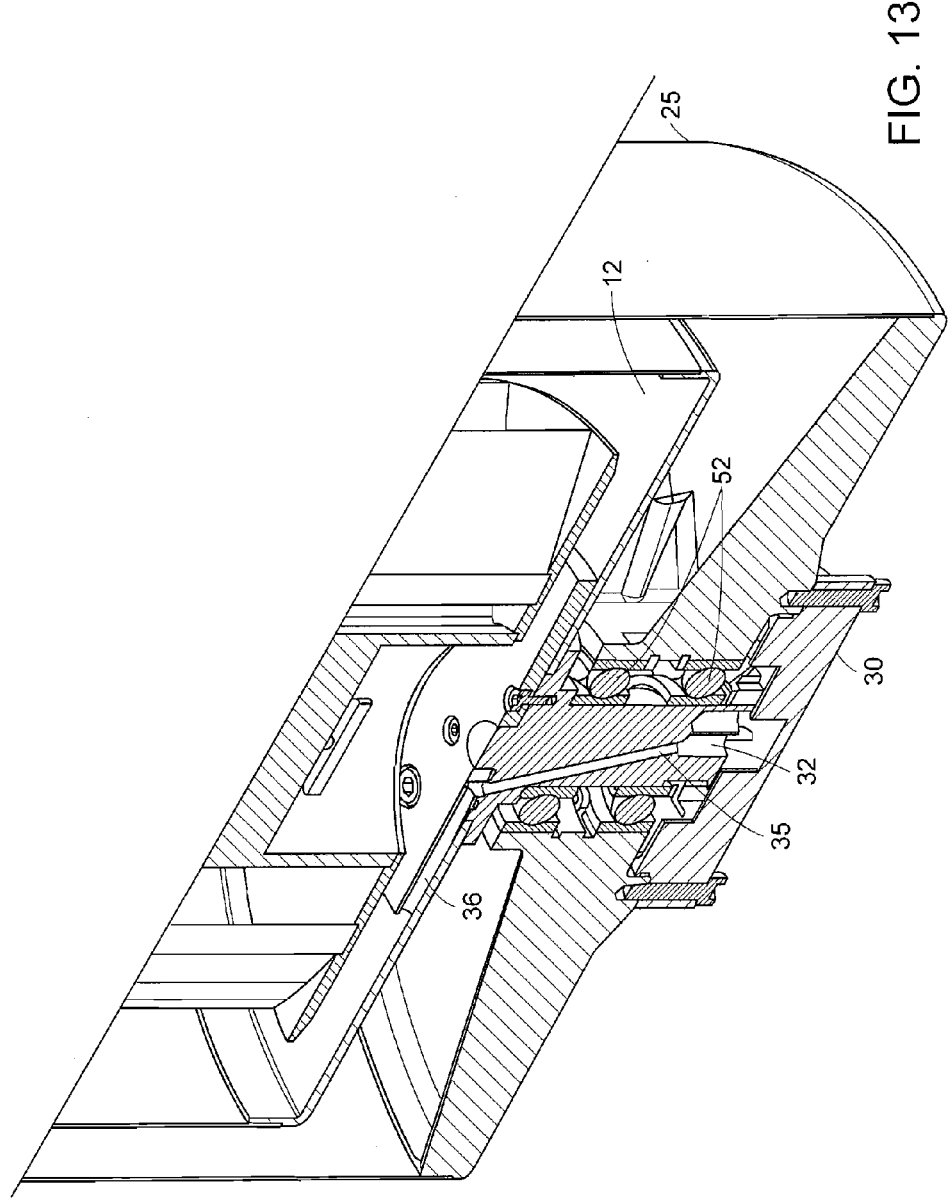

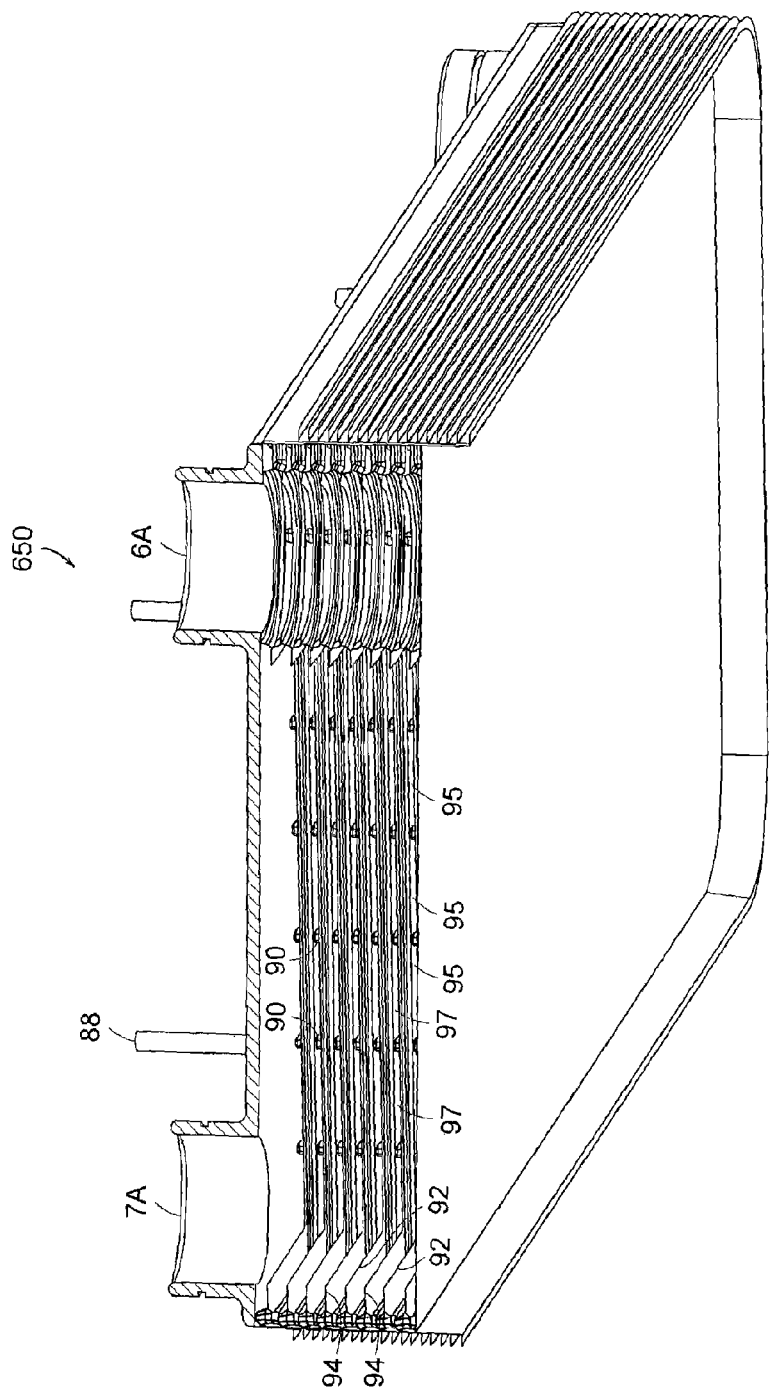

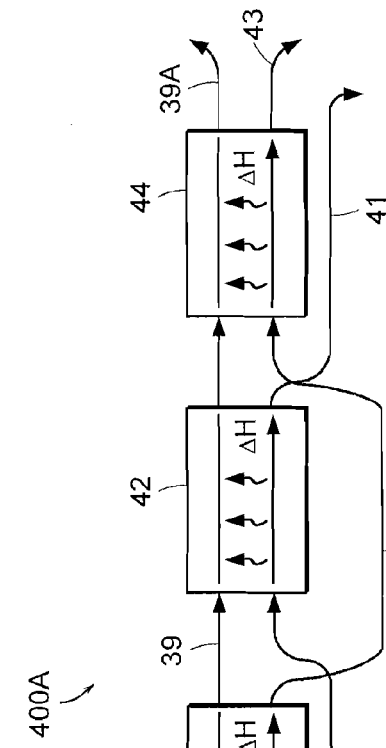
FIG. 18A
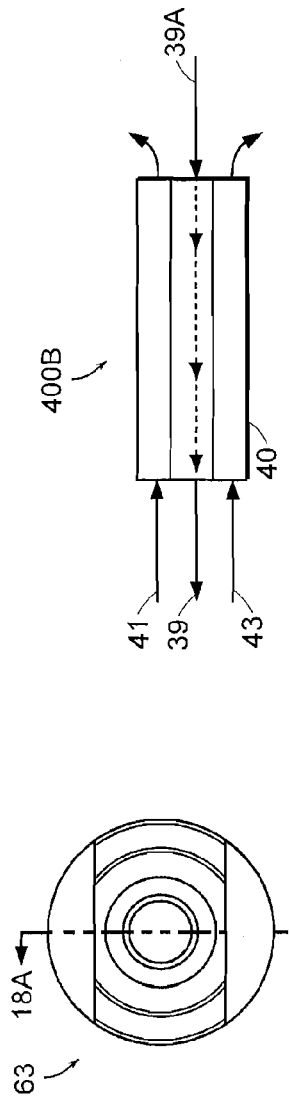
FIG. 18B
FIG. 19B
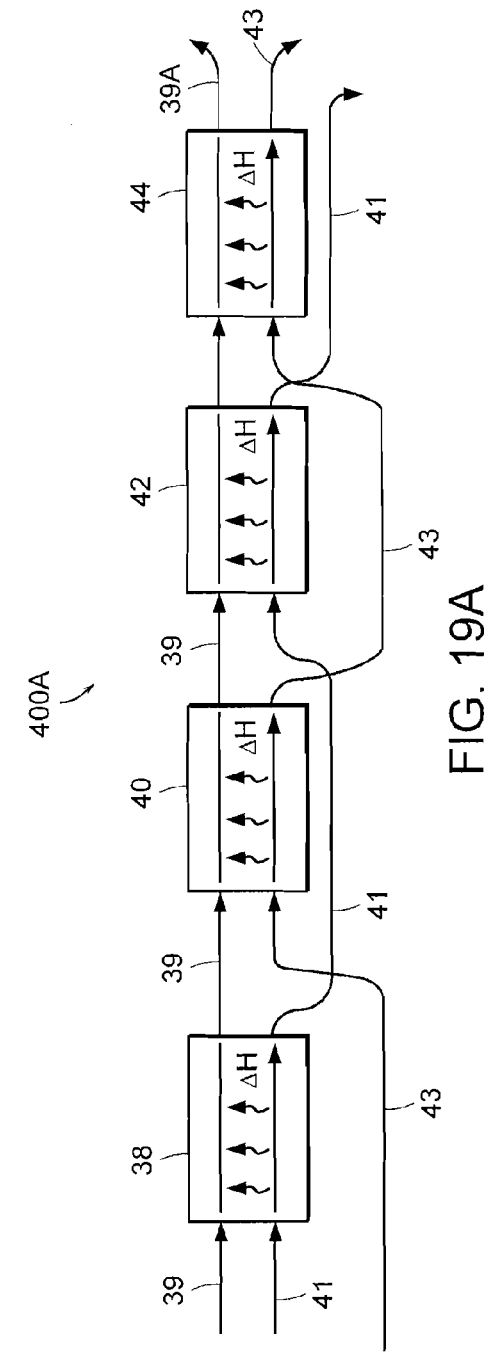
FIG. 19A

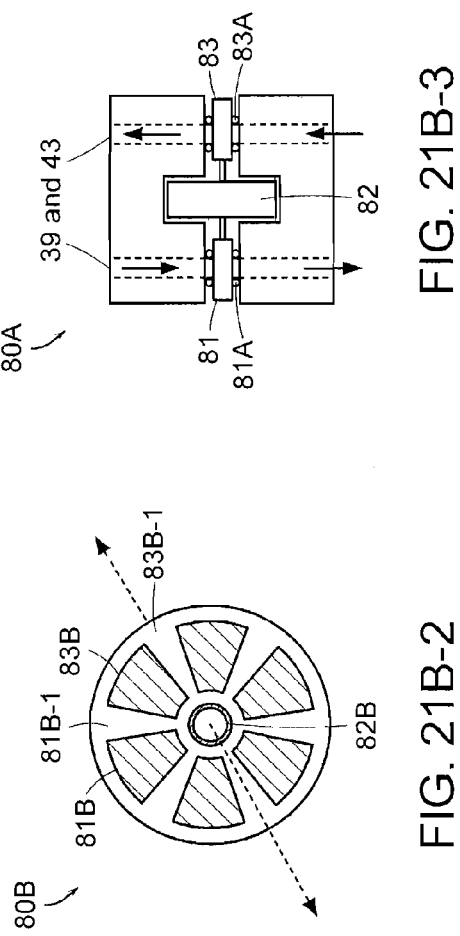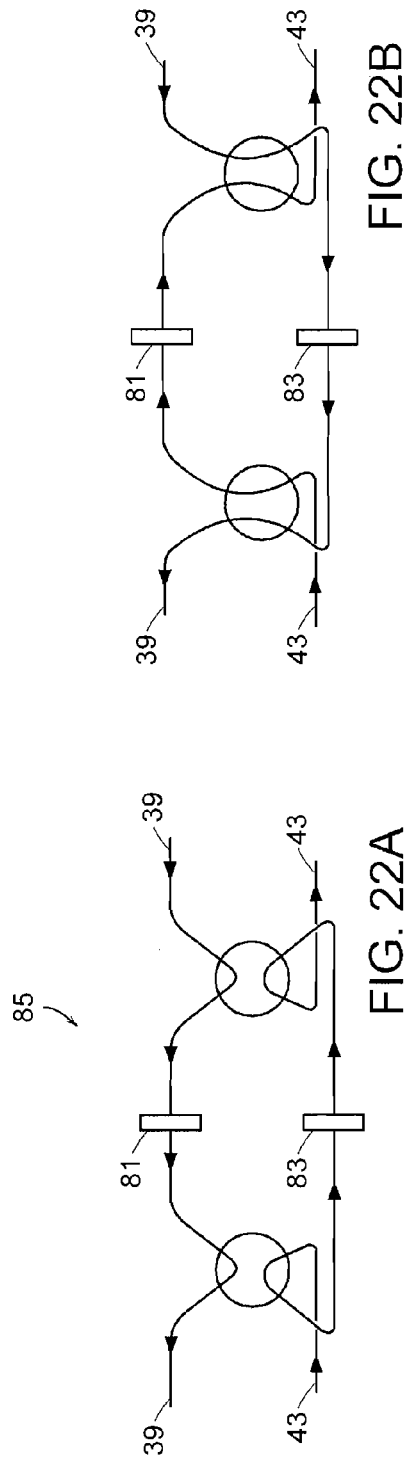

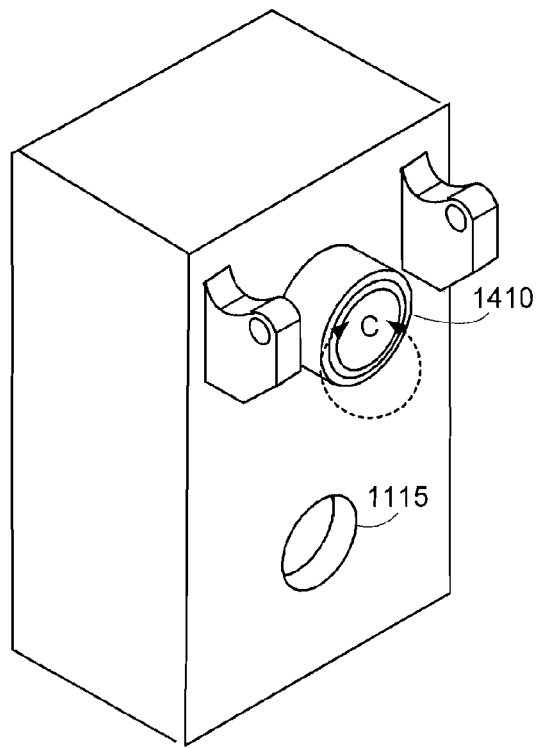
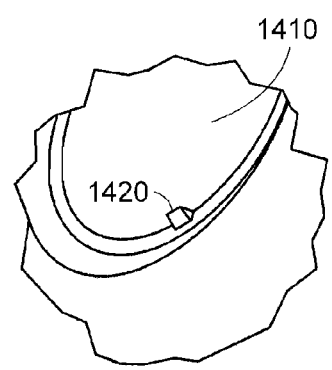
FIG. 26B
FIG. 26A
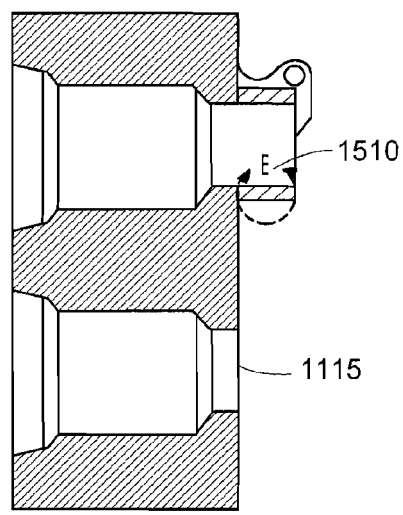
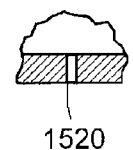
FIG. 27B
FIG. 27A

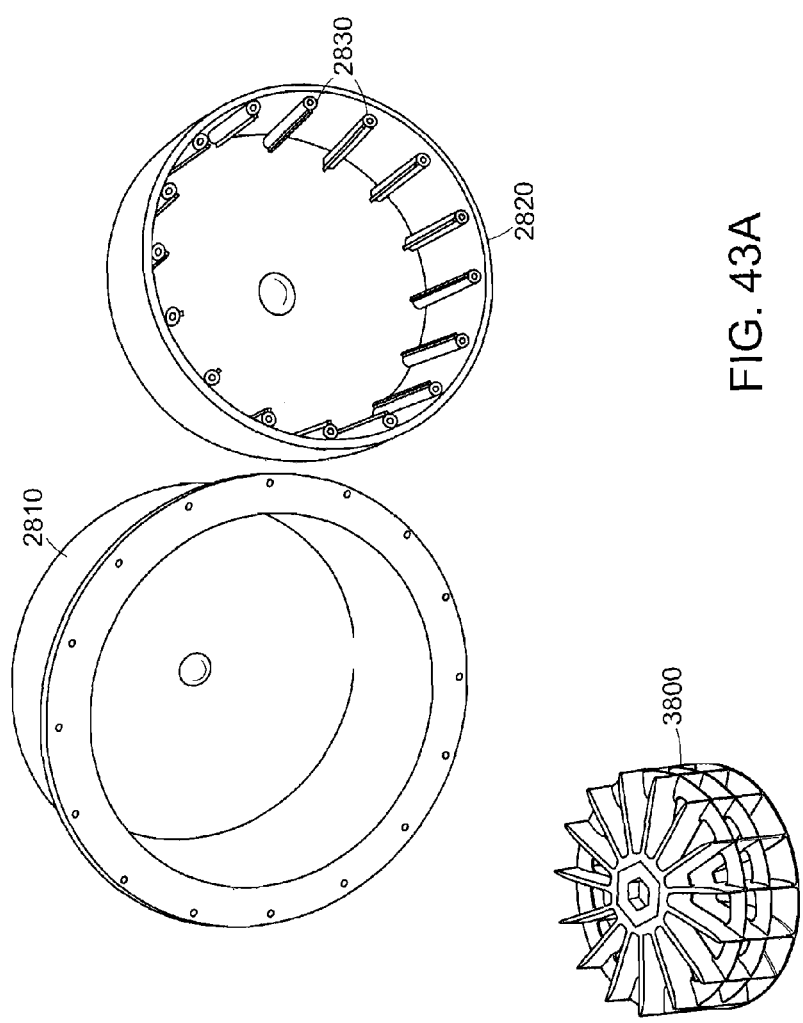

FIG. 55        5800

PRESSURIZED VAPOR CYCLE LIQUID DISTILLATION

CROSS REFERENCE TO RELATED APPLICATIONS

This application is a Continuation-In-Part of U.S. patent application Ser. No. 10/713,617 filed Nov. 13, 2003 and entitled Pressurized Vapor Cycle Liquid Distillation, now issued U.S. Pat. No. 7,597,784, issued on Oct. 6, 2009, which claims priority from the following applications: U.S. Provisional Patent Application Ser. No. 60/425,820 filed Nov. 13, 2002 and entitled Pressurized Vapor Cycle Liquid Distillation; U.S. Provisional Patent Application Ser. No. 60/490,615 filed Jul. 28, 2003 and entitled Systems and Methods for Distributed Utilities, and Provisional Patent Application Ser. No. 60/518,782 filed Nov. 10, 2003 and entitled Locally Powered Water Distillation System, all of which is hereby incorporated herein by reference in their entireties.

TECHNICAL FIELD

The present invention relates to liquid purification, and more particularly to liquid purification by vapor compression distillation comprising a liquid ring pump with rotatable housing having an internal liquid recovery system.

BACKGROUND OF THE INVENTION

A dependable source of clean water eludes vast segments of humanity. For example, the Canadian International Development Agency reports that about 1.2 billion people lack access to safe drinking water. Published reports attribute millions and millions of deaths per year, mostly children, to water related diseases. Many water purification techniques are well known, including carbon filters, chlorination, pasteurization, and reverse osmosis. Many of these techniques are significantly affected by variations in the water quality and do not address a wide variety of common contaminants, such as bacteria, viruses, organics, arsenic, lead, mercury, and pesticides that can be found in water supplies in the developing world and elsewhere. Some of these systems require access to a supply of consumables, such as filters or chemicals. Moreover, some of these techniques are only well suited to centralized, large-scale water systems that require both a significant infrastructure and highly trained operators. The ability to produce reliable clean water without regard to the water source, on a smaller, decentralized scale, without the need for consumables and constant maintenance is very desirable, particularly in the developing world.

The use of vapor compression distillation to purify water is well known and can address many of these concerns. However, the poor financial resources, limited technical assets, and low population density that does not make it feasible to build centralized, large-scale water systems in much of the developing world, also limits the availability of adequate, affordable, and reliable power to operate vapor compression distillation systems, as well as hindering the ability to properly maintain such systems. In such circumstances, an improved vapor compression distillation system and associated components increases efficiency and production capability, while decreasing the necessary power budget for system operation and the amount of system maintenance required.

SUMMARY OF THE INVENTION

In a first embodiment of the invention a liquid purification system is provided that advantageously may be compact, inexpensive, and easily maintained. One embodiment has a distillation device with a liquid ring pump and a rotatable housing with a single continuous shaft about which the liquid ring pump, motor and rotor rotates, and a second shaft supporting the rotatable housing, with an internal or external combustion engine, having motor rotor and magnets outside the fluid pressure boundary for the distillation system.

Another alternative embodiment has a distillation device with a liquid ring pump encased in a fully rotatable housing within the head vapor space of a still. Systemic heat sources can be redirected through a multi-line heat exchanger to maximize energy efficiency during the vaporization step. Back-wash lines may be directed to the intake from the head chamber of the evaporator/condenser, to keep unique flip-filters in the intake from fouling and to add heat into the heat exchange network. Further, a method of eliminating mist may be incorporated in the liquid ring pump component to eliminate contaminated liquid droplets entrained in the vapor and prevent them from being carried along to the condenser and thereby contaminating the purified product. One particular embodiment of the mist eliminator may have a top, a bottom and a housing wherein liquid is removed from suspension in vapor to an inner surface of the housing, the improvement comprising a plurality of vanes disposed along a diverter cone, wherein the diverter cone is situated at the bottom of said mist eliminator and wherein the vanes are angled to create a rotating motion to the vapor in the housing, a plurality of scales forming an angle $\alpha$ of at least about 15 degrees relative to a longitudinal axis Z of the housing, wherein the scales are situated to entrap liquid removed from suspension in vapor upon contact of the liquid with the scales, and each scale is in fluid communication with a gap between the scale and the inner surface of the housing of a dimension adapted to draw liquid through the gap to a collection area.

In related embodiments, the gap may be between about 0.025 and 0.05 inches, and may comprise a steam output for allowing steam to escape and/or a separator for collecting any liquid passing through the top of the mist eliminator.

Another particular embodiment has a distillation device with a liquid ring pump and a rotatable housing with a single continuous shaft about which the liquid ring pump, motor and rotor rotates, and a second shaft supporting the rotatable housing, with an internal or external combustion engine and siphon pump in a lower reservoir to siphon liquid into the chamber of the liquid ring pump. The result is a highly efficient, easily accessed and maintained, relatively simple and inexpensive system for purifying a liquid.

Yet another embodiment provides a level sensor for controlling fluid flow of a liquid in a liquid distillation system during distillation, the level sensor coupled with a variable flow valve controlled by the fluid level in the system.

Yet another method for removing contaminants from water comprises driving an electric generator by means of a thermal cycle engine for generating electrical power capacity, the thermal cycle engine including a burner for combusting a fuel, employing at least a portion of the electrical power capacity of the electric generator for powering a water purification unit, supplying source water to an input of the water purification unit, conveying heat output of the thermal cycle engine for supplying heat to the water purification unit to reduce the amount of electrical power required to purify the water. Further embodiments may additionally comprise one or all of transferring heat from an exhaust gas of the burner to source water, heating an enclosure surrounding the water purification unit to reduce thermal loss, vaporizing untreated water, and condensing vaporized water into distilled water product.

Another embodiment employs a backpressure regulator comprising a hinged arm having a closed position and a movable stop shaped to cover a port connected to a pressurized conduit, the stop being held by a retainer attached to the arm, and the stop being positioned adjacent to the port when the arm is in the closed position, wherein the arm is away from the closed position when the pressure conduit exceeds a set point, and the arm is in the closed position when the pressure in the conduit is less than the set point.

Additional advantages and specific aspects of the system will be more readily ascertained from the drawings and the accompanying detailed description of the preferred embodiments, below.

BRIEF DESCRIPTION OF THE DRAWINGS

The foregoing features of the invention will be more readily understood by reference to the following detailed description, taken with reference to the accompanying drawings, in which:

FIG. 2 shows the component power unit and water purification unit in accordance with a preferred embodiment of the present invention.

FIG. 4 is a schematic overview of an integral power unit/water purification system in accordance with an embodiment of the present invention.

FIG. 5A is a cross-sectional and top view of a rotor and stator in accordance with a particular embodiment showing the support structure for the input, the vanes and chambers between the vanes, and the rotating drive shaft.

FIG. 13 is a detailed cross-sectional view of the lower reservoir of FIG. 12C showing more clearly the siphon pump, the surrounding bearings, and fluid line.

FIG. 16A is a cross-sectional view of the evaporator/condenser core section of the still. Individual heating layers and ribs in accordance with a particular embodiment are shown, with input and output manifolds and bolts, for connecting and attaching to the fluid distribution manifold.

FIG. 18A is a side view of a coupler in accordance with an embodiment of the present invention, for connecting various flow lines and components in the overall system.

FIG. 18B is a top view of a coupler as depicted in FIG. 12A.

FIG. 19A is a schematic diagram of a multi-line heat exchanger in accordance with a specific embodiment of the present invention showing multiple two-channel heat exchangers that are plumbed to produce a multi-line effect.

FIG. 19B is an alternative heat exchanger in accordance with a particular embodiment of the present invention showing a single three-channel heat exchanger wherein heat from a product stream and blowdown stream exchange with a cold intake but not with each other.

FIG. 22 shows a view of a manual switch for changing water flow through individual units of a flip-filter, enabling backwashing of the units without having to physically flip the filters.

FIG. 26A is a diagonal view of a backpressure regulator in accord with an embodiment of the invention.

FIG. 26B shows a close-up view of section C of FIG. 26A, depicting a notch in the port of the backpressure regulator.

FIG. 27A is a cutaway side view of a backpressure regulator consistent with an embodiment of the invention.

FIG. 27B shows a close-up view of section E of FIG. 27A.

FIG. 43A shows a top view of a tapered fixed housing, a tapered rotatable housing which sits within the fixed housing, and an impeller with a hexagonally shaped stop which rotates within the rotatable housing. The ribs of the rotatable housing are designed to interact with the vanes of the impeller, to aid rotation. Part of a valve plate for the top of the impeller is also visible off to the lower left of the figure.

DETAILED DESCRIPTION OF SPECIFIC EMBODIMENTS

Definitions. As used in this description and the accompanying claims, the following terms shall have the meanings indicated, unless the context otherwise requires.

The term "purifying" as used herein, and in any appended claims, refers to substantially reducing the concentration of one or more contaminants to less than or equal to specified levels or otherwise substantially altering the concentration of one or more contaminants to within a specified range.

The term "specified levels" as used herein refers to some desired level of concentration, as established by a user for a particular application. One instance of a specified level may be limiting a contaminant level in a fluid to carry out an industrial or commercial process. An example is eliminating contaminant levels in solvents or reactants to a level acceptable to enable an industrially significant yield in a chemical reaction (e.g., polymerization). Another instance of a specified level may be a certain contaminant level in a fluid as set forth by a governmental or intergovernmental agency for safety or health reasons. Examples might include the concentration of one or more contaminants in water to be used for drinking or particular health or medical applications, the concentration levels being set forth by organizations such as the World Health Organization or the U.S. Environmental Protection Agency.

As used herein, the terms rotor and impeller are intended to be used interchangeably, such that a rotor and an impeller perform the equivalent function within the liquid purification system described and claimed herein.

Figure 1A:
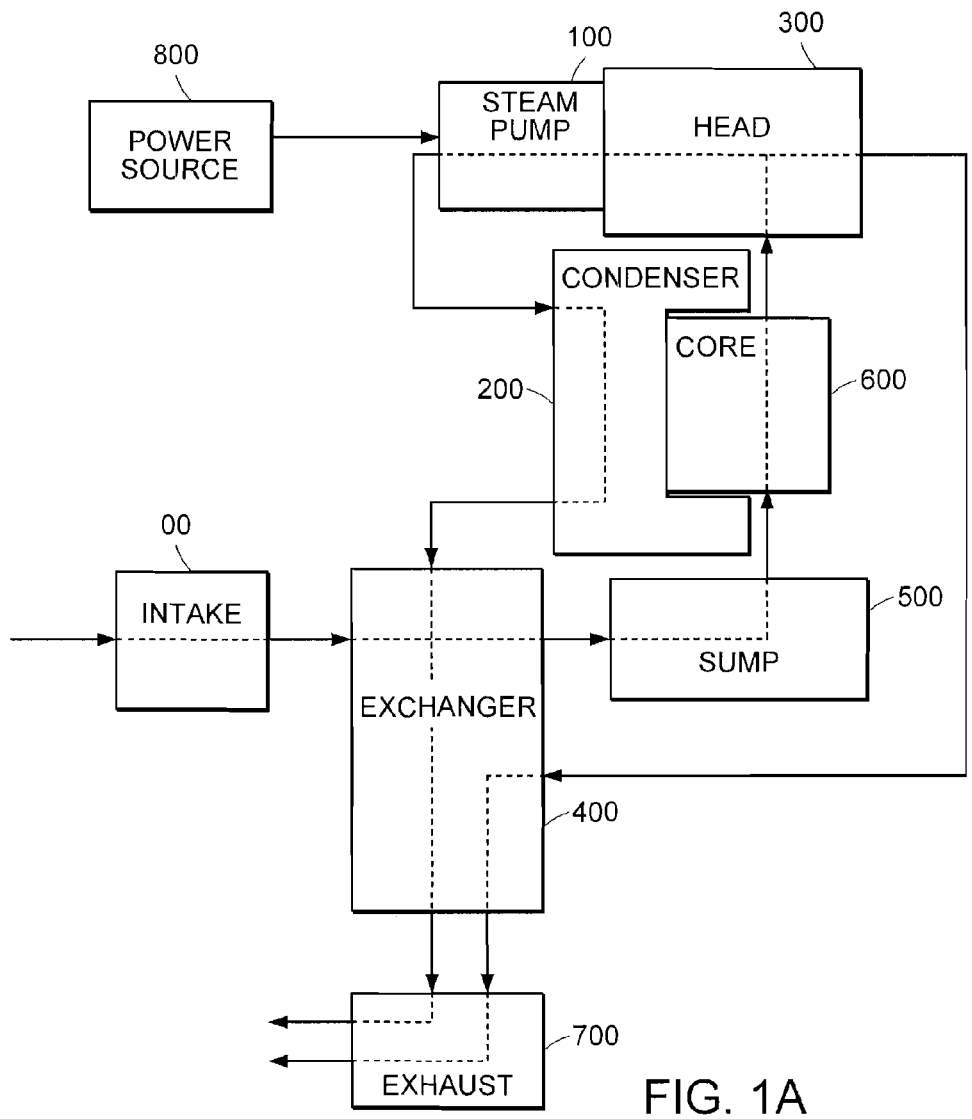
FIG. 1A is a conceptual flow diagram of a possible embodiment of the overall system designed in accordance with the present invention.

A conceptual flow diagram of an overall system in accordance with one possible embodiment of the present invention is shown in FIG. 1A, with liquid flow paths indicated by arrows. In an embodiment of this type, liquid flows through the system from an intake 00 into an exchanger 400 wherein exchanger 400 receives heat from at least one of a plurality of sources including a condenser 200, a head 300, and exhaust (not shown) from a power source such as an internal or external combustion engine. Liquid continues flowing past heat exchanger 400 into a sump 500 and into a core 600 in thermal contact with condenser 200. In the core 600, the liquid is partially vaporized. From core 600, the vapor path proceeds into head 300 in communication with a compressor 100, and from there into condenser 200. After vapor is condensed, liquid proceeds from condenser 200 through heat exchanger 400, and finally into an exhaust region 700 and then out as final distilled product.

Figure 1B:
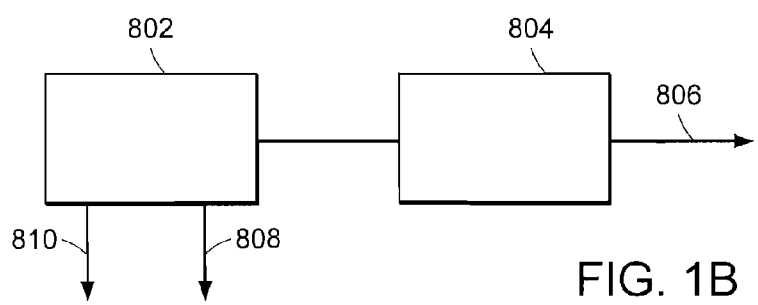
FIG. 1B is a schematic block diagram of a power source for use with the system shown in FIG. 1A in accordance with an embodiment of the invention.

A power source 800 is used to power the overall system. Power source 800 may be coupled to a motor 150 (not shown) that is used to drive compressor 100, particularly when compressor 100 is a steam pump, such as a liquid ring pump. The power source 800 may also be used to provide electrical energy to the other elements of the system shown in FIG. 1A. Power source 800 may be, for example, an electrical outlet, a standard internal combustion (IC) generator or an external combustion generator. An IC generator and an external combustion generator advantageously produce both power and thermal energy as shown in FIG. 1B, where engine 802 produces both mechanical and thermal energy. Engine 802 may be either an internal combustion engine or an external combustion engine. A generator 804, such as a permanent magnet brushless motor, is coupled to a crankshaft of the engine 802 and converts the mechanical energy produced by the engine 802 to electrical energy, such as power 806. Engine 802 also produces exhaust gases 808 and heat 810. The thermal energy produced by the engine 802 in the form of exhaust gas 808 and heat 810 may advantageously be used to provide heat to the system.

Alternatively, heat from electrical power generator 800 may be recaptured by channeling the engine exhaust into the insulated cavity that surrounds the still, which lies between fixed housing and the individual still components. In such an embodiment, exhaust blows across a finned heat exchanger that heats source liquid as it enters evaporator 600.

Returning to FIG. 1A, the power source 800 is preferably an external combustion generator such as a Stirling engine generator. A Stirling engine produces a thermal energy output in the form of exhaust gases and radiative heat. The exhaust gases of a Stirling engine are relatively hot, typically 100° C. to 300° C., and represent 10 to 20% of the thermal energy produced by the Stirling engine. The exhaust produced by the Stirling engine is typically a clean exhaust, comprising mainly $CO_2$, $N_2$, and water. A cooler of the Stirling engine may be used to reject heat produced by the engine to the environment around the engine. Use of an external combustion engine, such as a Stirling cycle engine, to provide mechanical power for conversion into electrical power by means of a generator is described in detail in U.S. Pat. No. 6,536,207 (Kamen et al.), issued Mar. 25, 2003, and incorporated herein by reference. For additional information relating to preferred embodiments of a Stirling cycle engine, see co-pending U.S. patent application Ser. No. 09/517,245, filed Mar. 2, 2000, entitled "Stirling Engine Thermal System Improvements", and co-pending U.S. patent application Ser. No. 09/517,808, filed Mar. 2, 2000, entitled "Auxiliary Power Unit," which are both herein incorporated by reference in their entirety.

Pre-treatment of the liquid to be distilled, preferably water, may be conducted, in which case pre-treatment may occur prior to or within intake 00. Pre-treatment operations may include any or all of gross-filtering; treatment with chemical additives such as polyphosphates, polyacetates, organic acids, or polyaspartates; and electrochemical treatment such as an oscillating magnetic field or an electrical current; degassing; and UV treatment. Additives may be added in liquid form to the incoming liquid stream using a continuous pumping mechanism such as a roller pump or pulsatile pump, including a standard diaphragm pump or piezoelectric diaphragm pump. Alternatively, the additives may be added by a semi-continuous mechanism using, for example, a syringe pump, which would require a re-load cycle, or a batch pumping system, wherein a small volume of the additive would be pumped into a holding volume or reservoir external to the system that uniformly mixes the additive with the liquid before the liquid flows into the system. A volcano valve pump as described in U.S. Pat. No. 6,464,667, hereby incorporated by reference herein, may also be used for the addition of additives. In addition, an FMS pump, as described in U.S. Pat. No. 5,193,990, hereby incorporated by reference herein, may be used for addition of additives. As well, the additives may be added using a fluid system management pump described in U.S. Application Ser. No. 60/792,073 filed Apr. 14, 2006 to inventors Dirk A van der Merwe, James D. Dale, Brian Tracey, Larry B. Gray, Jason A Demers, David E. Altobelli, Dean L. Kamen, N. Christopher Perry, and Kingston Owens, hereby incorporated by reference herein. Such a pump may be a reciprocating positive-displacement pump, as described in more detail below.

It is also envisioned that the user could simply drop a prescribed volume of the additive into, for example, a bucket containing the liquid to be purified. Liquid additives may be loaded as either a lifetime quantity (i.e., no consumables for the life of the machine), or as a disposable amount requiring re-loading after consumption.

Additives could also be added in solid form, wherein such additives could be embedded in a time-release matrix inserted into the flow-through channel of intake 00. In this particular embodiment, replacement additive would need to be inserted periodically by the user. In yet another embodiment, a powder form of an additive could be added in a batch system wherein the powder is added, for example in tablet form, to an external reservoir containing water to be purified wherein the additive is uniformly mixed, similar to the batch system for adding liquid additives described above.

Post-treatment of the distilled product, preferably water, may occur, in which case post-treatment may occur preferably within an external output region (not shown). Post-treatment operations may include taste additives such as sugar-based additives for sweetening, acids for tartness, and minerals. Other additives, including nutrients, vitamins, stabilized proteins such as creatinine, and fats, and sugars may also be added. Such additives may be added either in liquid or solid form, whether as a time-release tablet through which the output liquid flows, or a powder added to an external reservoir such as through a batch system. Alternatively, the additive may be added to the output liquid via an internal coating of a separate collection reservoir or container, for example, by leaching or dissolution on contact. In such embodiments, the ability to detect purified liquid with and without the additive is preferred. Detection systems in accordance with embodiments of the present invention include pH analysis, conductivity and hardness analysis, or other standard electrical-based assays. Such detection systems allow for replacement of additives, as needed, by triggering a signal mechanism when the additive level/quantity is below a pre-set level, or is undetectable.

In another embodiment, liquid characteristics, such as for example water hardness, is monitored in the output and may be coupled with an indicator mechanism which signals that appropriate additives should be added.

In yet another embodiment, ozone is systemically generated using, for example, electric current or discharge methods, and added to the output product for improved taste. Alternatively, air pumped through a HEPA filter may be bubbled through the output liquid to improve palatability of the final purified product.

It is envisioned that other embodiments may include means for detecting nucleic acids, antigens and bio-organisms such as bacteria. Examples of such detection means include nanoscale chemistry and biochemistry micro-arrays known in the field and currently commercially available. Such arrays may also be used to monitor the presence and/or absence of nutrients and other additives in the purified product, as discussed above.

In another embodiment, UV treatment may be used post-purification, for example in a storage barrel or other container, to aid in maintenance of the purified product.

In another particular embodiment, a Stirling engine generator which produces exhaust high in $CO_2$ content is used as the power source 800 to power the overall system. In such an embodiment, the exhaust from the Stirling engine is funneled back to intake 00 and used to acidify the water to be purified as one means of pre-treatment. The acidification of the incoming water supply would result from the forced dissolution of the $CO_2$ (under pressure) in the exhaust, and the acidification may reduce any scaling, such as lime build-up, that occurs in the system. Alternatively, the $CO_2$ exhaust may be channeled into the purified product as a means for post-treatment acidification.

The system provided in accordance with embodiments of the present invention has two basic functional components that may be combined within a single integral unit or may be capable of separate operation and coupled as described herein for the purpose of local water purification. FIG. 2 depicts an embodiment of the invention in which a power unit 2010 is coupled electrically, via cable 2014, to provide electrical power to a vapor compression water distillation unit 2012, with exhaust gas from the power unit coupled to convey heat to the water distillation unit via an exhaust duct 2016.

Thermal cycle engines are limited, by second law of thermodynamics, to a fractional efficiency, i.e., a Carnot efficiency of $(T_H-T_C)/T_H$, where $T_H$ and $T_C$ are the temperatures of the available heat source and ambient thermal background, respectively. During the compression phase of a heat engine cycle, heat must be exhausted from the system in a manner not entirely reversible, thus there will always be a surfeit of exhaust heat. More significantly, moreover, not all the heat provided during the expansion phase of the heat engine cycle is coupled into the working fluid. Here, too, exhaust heat is generated that may be used advantageously for other purposes. The total heat thermodynamically available (i.e., in gas hotter than the ambient environment) in the burner exhaust is typically on the order of 10% of the total input power. For a power unit delivering on the order of a kilowatt of electrical power, as much as 700 W of heat may be available in an exhaust stream of gas at temperatures in the vicinity of 200° C. In accordance with embodiments of the present invention, the exhaust heat, as well as the electrical power generated by an engine-powered generator, are used in the purification of water for human consumption, thereby advantageously providing an integrated system to which only raw water and a fuel need be provided.

Moreover, external combustion engines, such as Stirling cycle engines, are capable of providing high thermal efficiency and low emission of pollutants, when such methods are employed as efficient pumping of oxidant (typically, air, and, referred to herein and in any appended claims, without limitation, as "air") through the burner to provide combustion, and the recovery of hot exhaust leaving the heater head. In many applications, air is pre-heated, prior to combustion, nearly to the temperature of the heater head, so as to achieve the stated objectives of thermal efficiency. However, the high temperature of preheated air, desirable for achieving high thermal efficiency, complicates achieving low-emission goals by making it difficult to premix the fuel and air and by requiring large amounts of excess air in order to limit the flame temperature. Technology directed toward overcoming these difficulties in order to achieve efficient and low-emission operation of thermal engines is described, for example, in U.S. Pat. No. 6,062,023 (Kerwin, et al.) issued May 16, 2000, and incorporated herein by reference.

External combustion engines are, additionally, conducive to the use of a wide variety of fuels, including those most available under particular local circumstances, however the teachings of the present description are not limited to such engines, and internal combustion engines are also within the scope of the present invention. Internal combustion engines, however, impose difficulties due to the typically polluted nature of the exhausted gases, and external combustion engines are preferably employed.

Figure 3:
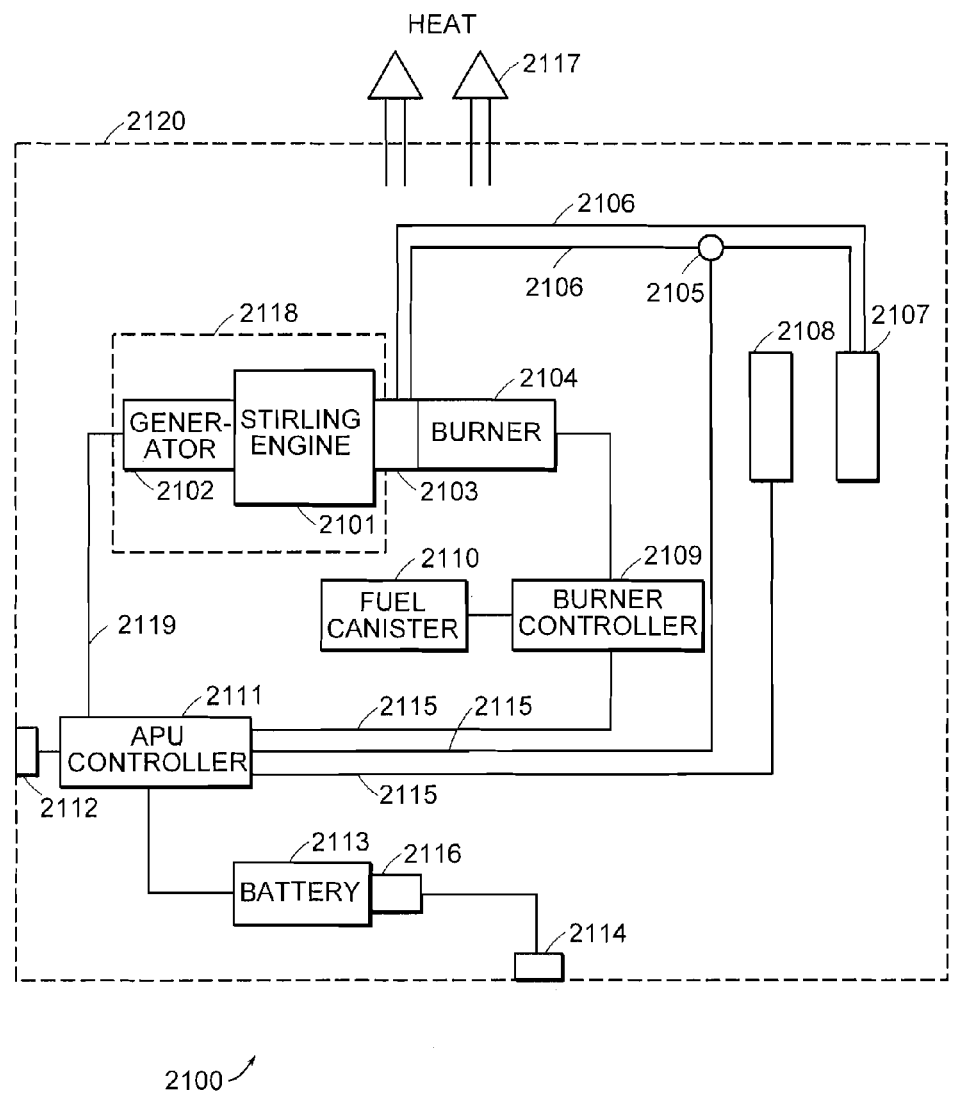
FIG. 3 is a schematic block diagram of an auxiliary power unit for providing electrical power and heat for water purification in accordance with the present invention.

An embodiment of a power unit 2010 is shown schematically in FIG. 3. Power unit 2010 includes an external combustion engine 2101 coupled to a generator 2102. In a preferred embodiment, the external combustion engine 2101 is a Stirling cycle engine. The outputs of the Stirling cycle engine 2101 during operation include both mechanical energy and residual heat energy. Heat produced in the combustion of a fuel in a burner 2104 is applied as an input to the Stirling cycle engine 2101, and partially converted to mechanical energy. The unconverted heat or thermal energy accounts for 65 to 85% of the energy released in the burner 2104. This heat is available to provide heating to the local environment around the power unit 2110 in two forms: a smaller flow of exhaust gas from the burner 2104 and a much larger flow of heat rejected at the cooler 2103 of the Stirling engine. Power unit 2110 may also be referred to as an auxiliary power unit (APU). The exhaust gases are relatively hot, typically 100 to 300° C., and represent 10 to 20% of the thermal energy produced by the Stirling engine 2101. The cooler rejects 80 to 90% of the thermal energy at 10 to 20° C. above the ambient temperature. The heat is rejected to either a flow of water or, more typically, to the air via a radiator 2107. Stirling cycle engine 2101 is preferably of a size such that power unit 2010 is transportable.

As shown in FIG. 3, Stirling engine 2101 is powered directly by a heat source such as burner 2104. Burner 2104 combusts a fuel to produce hot exhaust gases, which are used to drive the Stirling engine 2101. A burner control unit 2109 is coupled to the burner 2104 and a fuel canister 2110. Burner control unit 2109 delivers a fuel from the fuel canister 2110 to the burner 2104. The burner controller 2109 also delivers a measured amount of air to the burner 2104 to advantageously ensure substantially complete combustion. The fuel combusted by burner 2104 is preferably a clean burning and commercially available fuel such as propane. A clean burning fuel is a fuel that does not contain large amounts of contaminants, the most important being sulfur. Natural gas, ethane, propane, butane, ethanol, methanol and liquefied petroleum gas ("LPG") are all clean burning fuels when the contaminants are limited to a few percent. One example of a commercially available propane fuel is HD-5, an industry grade defined by the Society of Automotive Engineers and available from Bernzomatic. In accordance with an embodiment of the invention, and as discussed in more detail below, the Stirling engine 2101 and burner 2104 provide substantially complete combustion in order to provide high thermal efficiency as well as low emissions. The characteristics of high efficiency and low emissions may advantageously allow use of power unit 2010 indoors.

Generator 2102 is coupled to a crankshaft (not shown) of Stirling engine 2101. It should be understood to one of ordinary skill in the art that the term generator encompasses the class of electric machines such as generators wherein mechanical energy is converted to electrical energy or motors wherein electrical energy is converted to mechanical energy. The generator 2102 is preferably a permanent magnet brushless motor. A rechargeable battery 2113 provides starting power for the power unit 2010 as well as direct current ("DC") power to a DC power output 2112. In a further embodiment, APU 2010 also advantageously provides alternating current ("AC") power to an AC power output 2114. An inverter 2116 is coupled to the battery 2113 in order to convert the DC power produced by battery 2113 to AC power. In the embodiment shown in FIG. 3, the battery 2113, inverter 2116 and AC power output 2114 are disposed within an enclosure 2120.

Utilization of the exhaust gas generated in the operation of power unit 2010 is now described with reference to the schematic depiction of an embodiment of the invention in FIG. 4. Burner exhaust is directed through a heat conduit 2016 into enclosure 2504 of water purification unit designated generally by numeral 2012. Heat conduit 2016 is preferably a hose that may be plastic or corrugated metal surrounded by insulation, however all means of conveying exhaust heat from power unit 2010 to water purification unit 2012 are within the scope of the present invention. The exhaust gas, designated by arrow 2502, blows across finned heat exchanger 2506, thereby heating the source water stream 2508 as it travels to still evaporator 2510. The hot gas 2512 that fills the volume surrounded by insulated enclosure 2504 essentially removes all thermal loss from the still system since the gas temperature within the insulated cavity is hotter than surface 2514 of the still itself. Thus, there is substantially no heat flow from the still to the ambient environment, and losses on the order of 75 W for a still of 10 gallon/hour capacity are thereby recovered. A microswitch 2518 senses the connection of hose 2016 coupling hot exhaust to purification unit 2012 so that operation of the unit may account for the influx of hot gas.

In accordance with alternate embodiments of the invention, adding heat to exhaust stream 2502 is within the scope of the invention, whether through addition of a post-burner (not shown) or using electrical power for ohmic heating.

During initial startup of the system, power unit 2010 is activated, providing both electrical power and hot exhaust. Warm-up of water purification unit 2012 is significantly accelerated since finned heat exchanger 2506 is initially below the dew point of the moisture content of the exhaust, since the exhaust contains water as a primary combustion product. All the heat of vaporization of this water content is available to heat source water as the water condenses on the fins of the heat exchanger. The heat of vaporization supplements heating of the fins by convection of hot gas within the still cavity. Heating of the fins by convection continues even after the fins reach the dew point of the exhaust.

In accordance with other embodiments of the present invention, power unit 2010 and water purification unit 2012 may be further integrated by streaming water from the purification unit through the power unit for cooling purposes. The use of source water for cooling presents problems due to the untreated nature of the water. Whereas using the product water requires an added complexity of the system to allow for cooling of the power unit before the purification unit has warmed up to full operating conditions.

Figure 5B:
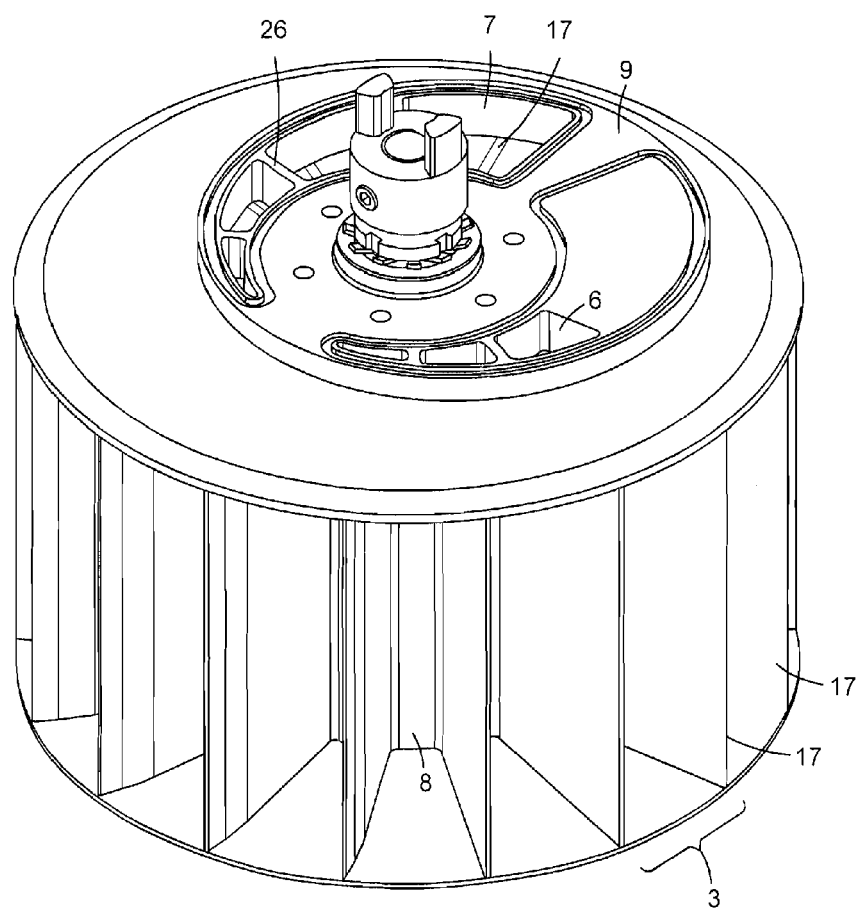
FIG. 5B is a side top view of a rotor and stator corresponding to the embodiment shown in FIG. 5A, showing the support structures for the input and output, the vanes, the eccentric configuration within the housing unit, and the drive shaft.

Some specific embodiments of the present invention may improve upon the basic design of the liquid ring pump, particularly with respect to increasing overall energy efficiency by reducing frictional losses. A preferred embodiment of the present invention having a fully rotatable housing, that provides maximum reduction in frictional loss yet maintains simplicity of design and cost-effectiveness of production is shown in FIGS. 5A through 5D. As can be seen in FIG. 5A, stator 9 is stationary relative to rotor 8, and comprises an intake 7 and exit 6. Steam is drawn in at pressure $P_1$ and passes into rotor chamber 3. Rotor 8 is off-set from a central axis Z upon which the rotating housing and the liquid ring pump are centered. As rotor 8 turns about central shaft 14 with rotor bearings 16, the effective volume of chamber 3 decreases. Steam is thereby compressed to pressure $P_2$ as it is carried along a rotational path into exit 6, to be routed to a condenser 200. Preferably, a rotatable housing (not shown) rotates with the liquid ring in the liquid ring pump, to reduce energy loss due to friction.

Figure 5C:
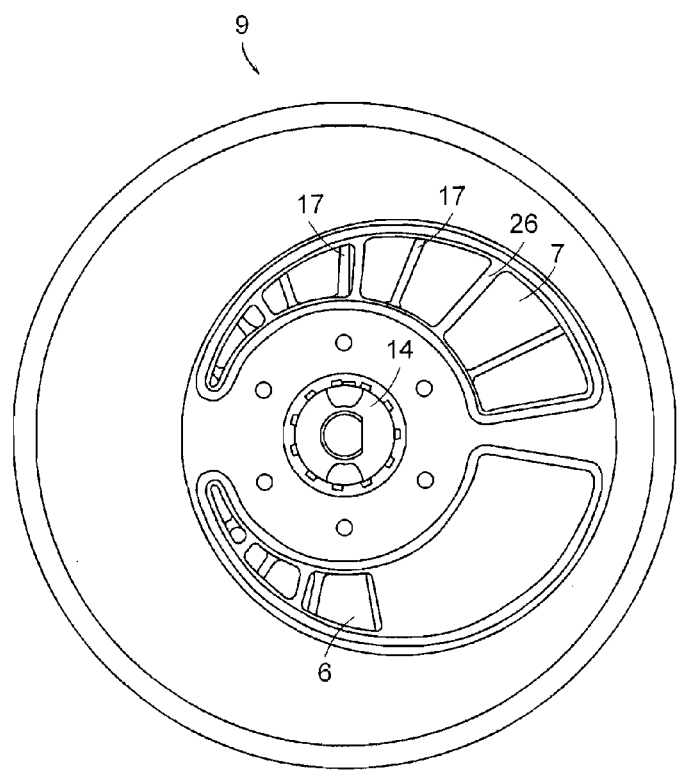
FIG. 5C is a top view of a rotor and stator corresponding to the embodiment shown in FIGS. 5A and 5B, showing support structures for input and output, the vanes, the eccentric configuration within the housing unit, and the drive shaft.
Figure 5D:
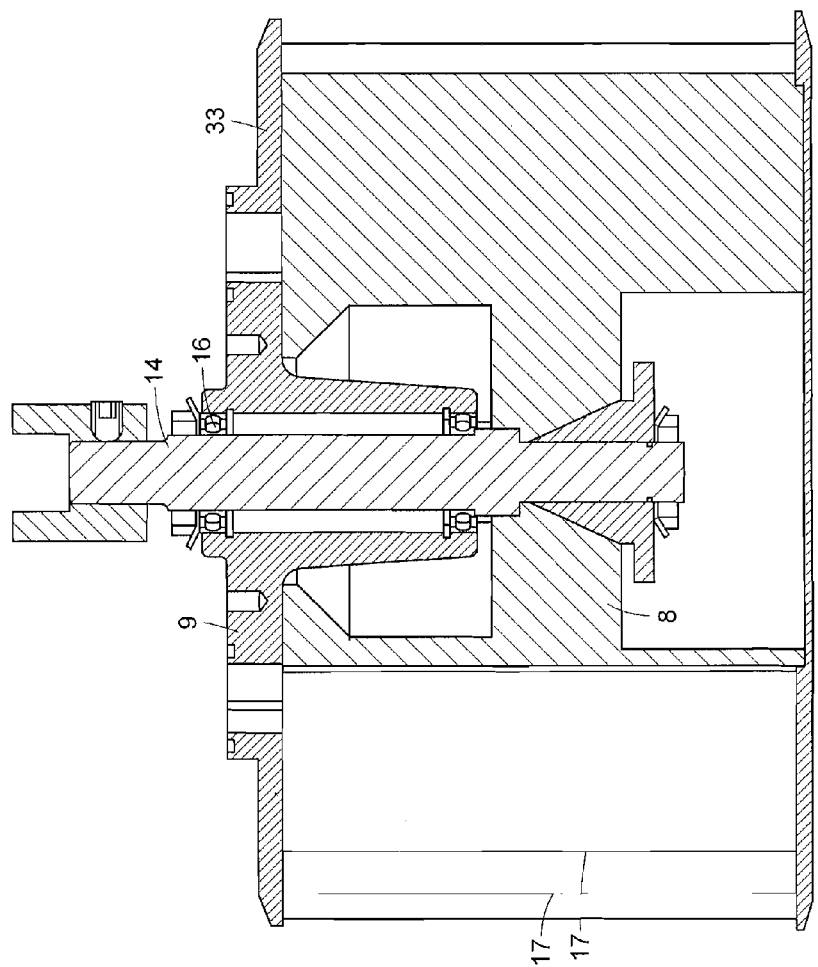
FIG. 5D is a cross-sectional view of a rotor and stator corresponding to the embodiment shown in FIGS. 5A, 5B, and 5C showing vanes, drive shaft, and bearings.
Figures 1, 5D:
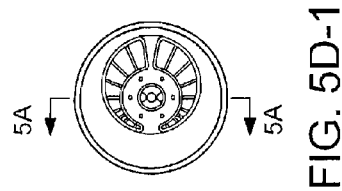

Stator 9 has support structures 26 in the input and output regions, as seen in FIG. 5B and FIG. 5C. The individual vanes 17 of rotor 8 can be seen below the support structures 26 in the top view of stator 9 shown in FIGS. 5B and 5C, as well as the eccentric placement of rotor 8 about the central axis. This particular embodiment of a liquid ring pump is both axially fed and axially exhausted and may have a vertical, horizontal, or other orientation during operation. FIG. 5D shows yet another view of this embodiment.

Preferably, a liquid ring pump in accordance with the present invention is designed to operate within a fairly narrow range of input and output pressure, such that generally, the system operates in the range of from 5 to 15 psig. System pressure may be regulated using check valves to release steam from chamber 3 of FIG. 5A-D. Improved system performance is preferably achieved by placing exit 6 of the exhaust port at a specific angle of rotation about the rotor axis, wherein the specific angle corresponds to the pressure rise desired for still operation. One embodiment of a specific port opening angle to regulate system pressure is shown in FIG. 5B. Exit 6 is placed at approximately 90 degrees of rotation about the rotor access, allowing steam from chamber 3 to vent. Placing exit 6 at a high angle of rotation about the stator axis would raise the system pressure and lower pump throughput, while placing exit 6 at a lower angle of rotation about the stator axis would result in lower system pressure and increased pump throughput. Choosing the placement of exit 6 to optimize system pressure can yield improved pump efficiency. Further, the placement of exit 6 to maintain system pressure can minimize system complexity by eliminating check valves at the exhaust ports to chamber 3, thereby providing a simpler, more cost-effective compressor.

Figure 6A:
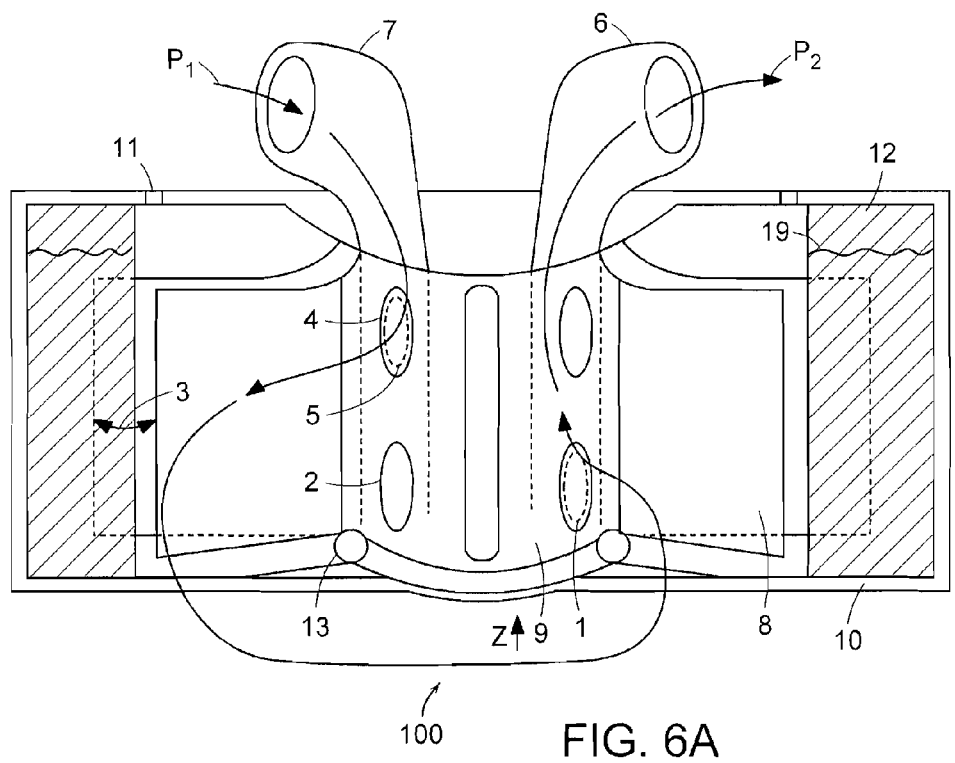
FIG. 6A is a schematic diagram of a liquid ring pump in accordance with a specific embodiment of the present invention.
Figure 6B:
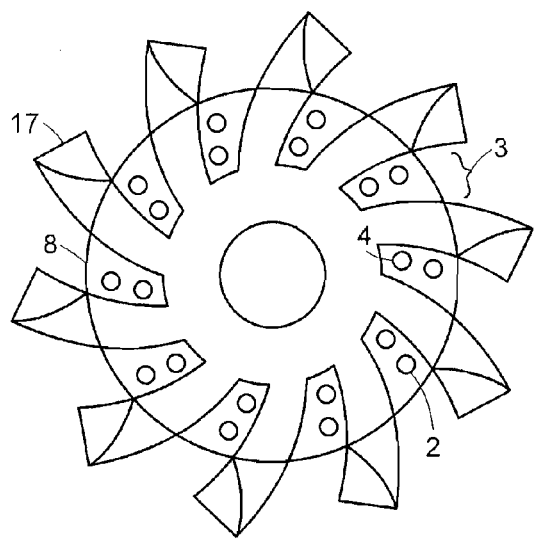
FIG. 6B is a top view of a rotor in accordance with an embodiment of the present invention showing multiple vanes and chambers between the vanes, and intake and exit holes in each individual chamber.

An alternative embodiment for a liquid ring pump is shown in FIG. 6A as a schematic diagram. In FIG. 6A, compressor 100 is an example of a possible liquid ring pump with an outer rotatable housing 10 that encloses a single two-channel stator/body 9, and a rotor 8, wherein the seal surface between the rotatable housing 10 and stationary stator/body 9 is a cylinder. Two-channel stator/body 9 is kept stationary in reference to a chamber 12 of pump 100 as well as to rotor 8 and rotatable housing 10, and comprises an intake 7 and an exit 6. Steam is drawn in at pressure $P_1$ and passes through an intake orifice 5. When the intake orifice 5 lines up with an intake hole 4 in rotor 8 as the rotor spins around the stationary stator 9, the steam passes through intake hole 4 into a rotor chamber 3. Rotor 8 is offset from a central axis Z so that, as rotor 8 turns, the effective volume of rotor chamber 3 decreases. In this way, steam is compressed to pressure $P_2$ as it is carried along a rotational path to an exit hole 2 in rotor 8. As rotor 8 turns, exit hole 2 lines up with an exit orifice 1 of stationary exit 6, and the steam at pressure $P_2$ passes through exit orifice 1 into exit 6 to be routed to a condenser 200. In such an embodiment, rotatable housing 10 rotates with water 19 present in chamber 12 thereby reducing frictional energy losses due to windage. There may also be a small hole 11 present in the housing 10 to permit water 19 to leave and/or enter chamber 12, thereby controlling the liquid level in the pump. In addition, rotor 8 has multiple vanes 17 that are readily apparent when rotor 8 is viewed from above, as in FIG. 6B. Individual rotor chamber 3, and individual intake hole 4 and exit hole 2 for each rotor chamber 3, are also easily seen in this view.

Figure 7A:
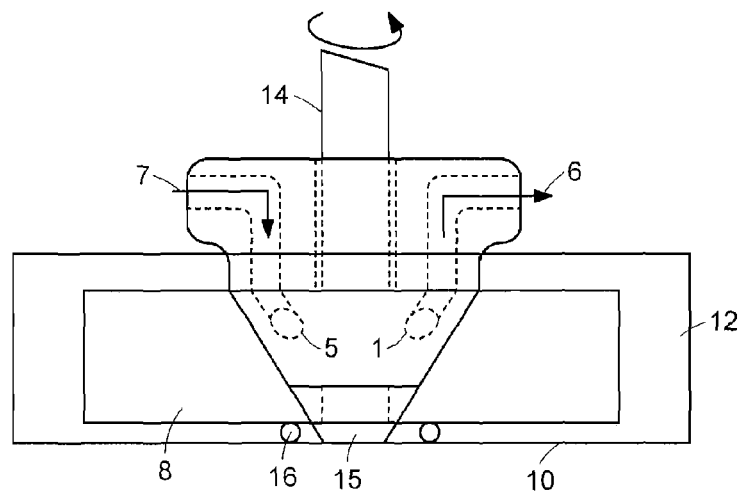
FIG. 7A is further detail of a liquid ring pump in accordance with a specific embodiment of the present invention showing the stationary intake port and the rotating drive shaft, rotor and housing unit.

Another alternative embodiment of a liquid ring pump, wherein the interface between rotatable housing 10 and stator 9 is conical rather than cylindrical, is seen in FIG. 7A. In this embodiment, a rotor drive shaft 14 has an end 15 situated upon a bearing 16 that allows rotatable rotor housing 10 to rotate with rotor 8. Intake 7 and exit 6, with corresponding intake orifice 5 and exit orifice 1, are kept stationary with respect to rotor 8 and rotor housing 10.

Figure 7B:
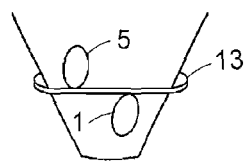
FIG. 7B is a view of a seal which may be present between the stationary and rotor sections of a liquid ring pump in accordance with a specific embodiment of the present invention, separating the intake orifice from the exit orifice.

In addition, there may be either a conical or axial seal 13 present between stationary sections 6 and 7 and rotor 8. In the conical embodiment seen most clearly in FIG. 7B, seal 13 thereby separates intake orifice 5 from exit orifice 1 of rotor 8 to prevent leaks. The liquid ring pumps shown in FIGS. 6 and 7 are both axially fed and radially ported, in contrast with the preferred embodiment of a liquid ring pump, discussed with reference to FIGS. 5A-5D (vide supra), which is axially fed and axially ported.

In alternative embodiments there is provided a vertical fixed housing having an inner rotatable housing (described above as rotatable housing 10) such as a cylindrical rotatable housing. The rotatable housing is increased in size and is designed to be just smaller than the fixed housing, with a thin film of water under the rotatable housing. As the impeller spins the rotatable housing and the water also spin, so that the spinning water keeps the rotatable housing constantly elevated, thus avoiding the need for a shaft with internal bearings. The larger diameter of the rotatable housing results in an increased linear speed and increased pressure, resulting in improved rotation of the rotatable housing. This also increases the torque of the rotatable housing, resulting again from the increased rotatable housing size and increased resulting pressure as the fixed housing, water and rotatable housing all rotate.

In related embodiments, the stationary housing 2810 is tapered and within it sits a tapered rotatable housing 2820 designed to be just smaller than fixed housing 2810 having fins/ribs 2830 such that there is a thin film of water under housing 2820, in the fixed housing. The tapering provides the optimum gap between the fixed housing and the rotatable so that the rotatable housing is elevated during rotation. A tapered rotatable housing also provides an axial force in addition to the radial force, and automatically "sets" the film thickness between the fixed housing and the rotatable housing by floating up to the correct height.

There may also be a (jewel) bearing pair 2910 between fixed housing 2810 and rotatable housing 2820, one half of the bearing pair 3010 rising up from the base of the fixed housing to an apex, the other half of the bearing pair being a convex point 3310 matched to the apex of the fixed housing so that the rotatable housing rests upon the fixed housing at this apex/convex point interface 2910. Fixed housing bearing may provide added support for maintaining the rotatable housing above the water level in the fixed housing, and such a bearing provides reduced friction. In such embodiments, the fixed housing and the rotatable housing, along with the jewel bearing, may all be made of plastic. Also, at start-up, the jewel bearing minimizes contact between the fixed housing and rotatable housing and provides a minimal gap between the fixed housing and rotatable housing so that the rotatable housing will begin to rotate, as required.

For proper function, the bearing pair 2910 must stay wet, so the fluid level between the fixed housing and the rotatable housing must stay higher than the rotatable housing bottom. To help maintain a sufficient fluid level, a pitot tube may be submerged at the bottom of the rotatable housing and the liquid ring may be allowed to spill over through the inner diameter of the rotatable housing lid. Alternatively, the pitot tube may be placed on the side of fixed housing 2810, to maintain the level of water within the housing. If water is not maintained in the pitot tube, then the water level in the housing and liquid ring pump is too low. A sensor, such as a capacitor sensor described herein may be used to detect whether the pitot tube contains water at all, or sufficient water to maintain proper functioning of the liquid ring pump.

In addition, as the rotatable housing spins, the tapered sides may draw liquid up the sides of the rotatable housing, requiring a fluid return to maintain a sufficient water level in the sump, meant in a general sense to be the water level maintained in the fixed housing as required for sufficient functioning/rotation of the rotatable housing within the fixed housing. Thus, one or more small holes 3210 and 3330 may be present in the outside or bottom of the rotatable housing, allowing water to feed into the gap between the rotatable housing and the fixed housing. It is important to avoid emptying the sump or creating a vacuum in the sump as this would adversely affect the water level. A bypass may be added to fixed housing 2810 to allow pressure equalization between the top and bottom of the liquid ring pump. Housing 2810 also has a water fill/drain port for filling and or draining liquid, as needed. For the rotatable housing to begin rotating at start-up, it is necessary to minimize contact between the rotating rotatable housing and the fixed housing initially. Thus, the above-described jewel bearing is used to maintain a minimal gap between the rotatable housing and the fixed housing, permitting initiation of rotation of the rotatable housing at start-up.

In other related embodiments, the fins/ribs are vertically disposed along the inner surface of the rotatable housing, attached at a downwardly tapered angle and designed to offset the taper angle of the rotatable housing, thus providing fins that are effectively parallel to a true vertical. The fins are designed to improve coupling with an impeller, described below, during rotation.

One particular embodiment of the cylindrical rotatable housing is designed to be mounted with a horizontal axis, as traditionally seen when hydrodynamic bearings are used.

Another particular embodiment provides a cylindrical rotatable housing designed to be mounted with a vertical axis. For vertically mounted rotatable housings, a tapered fixed housing/rotatable housing provides upward hydrodynamic thrust (force) for free rotation, as described above.

Embodiments described above, wherein the rotating housing acts as a large hydrodynamic bearing, eliminate the need for seals, bearings and a shaft for the rotatable housing, which in turn also dramatically reduces stress on the rotatable housing by eliminating overhang load. This enables the use of inexpensive manufacturing processes and simplifies liquid ring pump assembly.

In related embodiments, an impeller 3800 having multiple vanes 3810 and stacked annular horizontal cross-plates 3820 intersecting across the multiple vanes for stability (see FIG. 38) is utilized in conjunction with the fixed housing, rotatable housing and hydrodynamic bearing, replacing rotor 8, described in embodiments illustrated in FIGS. 5-6 and 8-11 above. The rotatable housing and impeller rotate within the liquid ring pump fixed housing, with the impeller being attached to the fixed housing by a shaft (see FIGS. 39-42) through the central axis of impeller 3800, similar to rotor 8. Although the rotatable housing rotates within the fixed housing, the rotatable housing is not attached to the fixed housing, or to the impeller. The impeller sits within the rotatable housing, and rotates with the shaft along with the rotatable housing. The fins on the inside of the rotatable housing are designed to improve coupling with impeller 3800. To prevent the impeller from "riding up" along the shaft during rotation, creating leaks, a valve plate or similar device is placed above the compressor plate to prevent leakage between the vanes and prevent the impeller from riding up during rotation. The valve plate also serves to prevent the rotatable housing from rising up too high during rotation, which might otherwise occur from pressure from the rotating liquid ring acting as a hydrodynamic bearing between the fixed housing and the rotatable housing.

Figure 40:
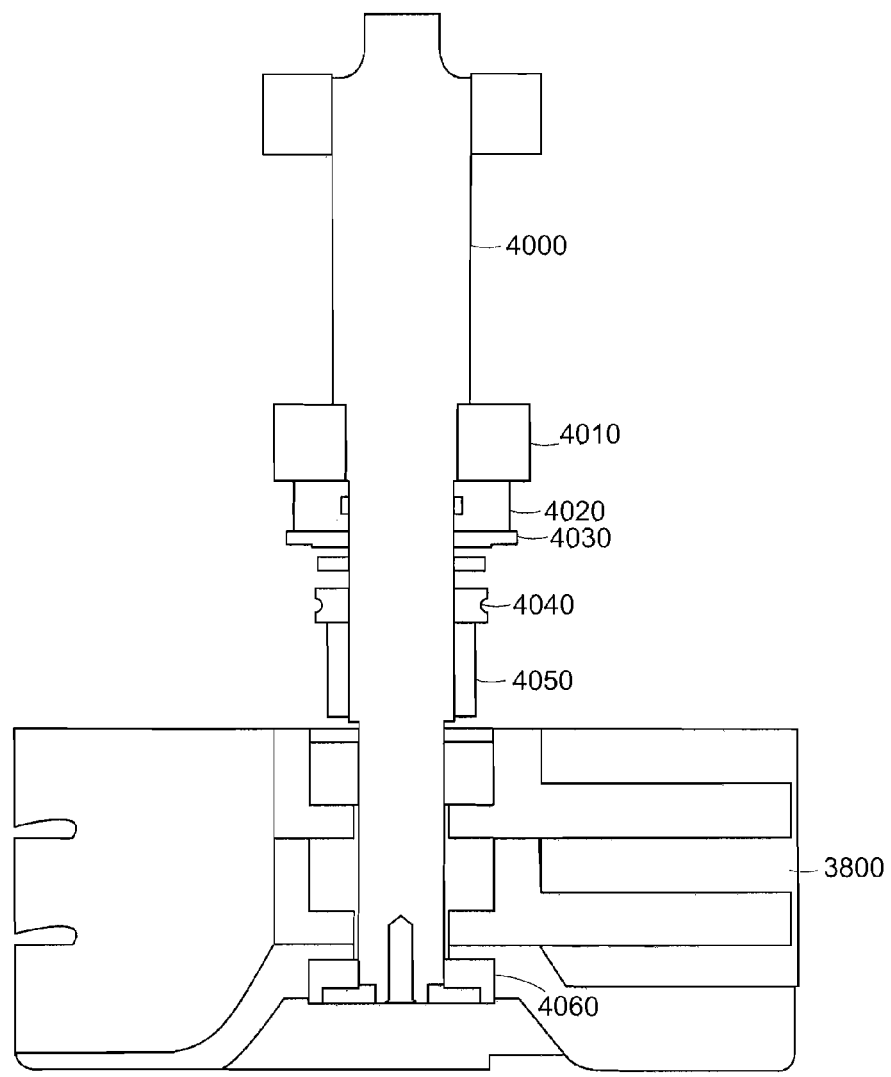
FIG. 40 shows a cross-section through the center of an impeller connected to a shaft, the shaft having face and spiral seals, a collar, and bearings above the impeller, and additional seals below.
Figure 41:
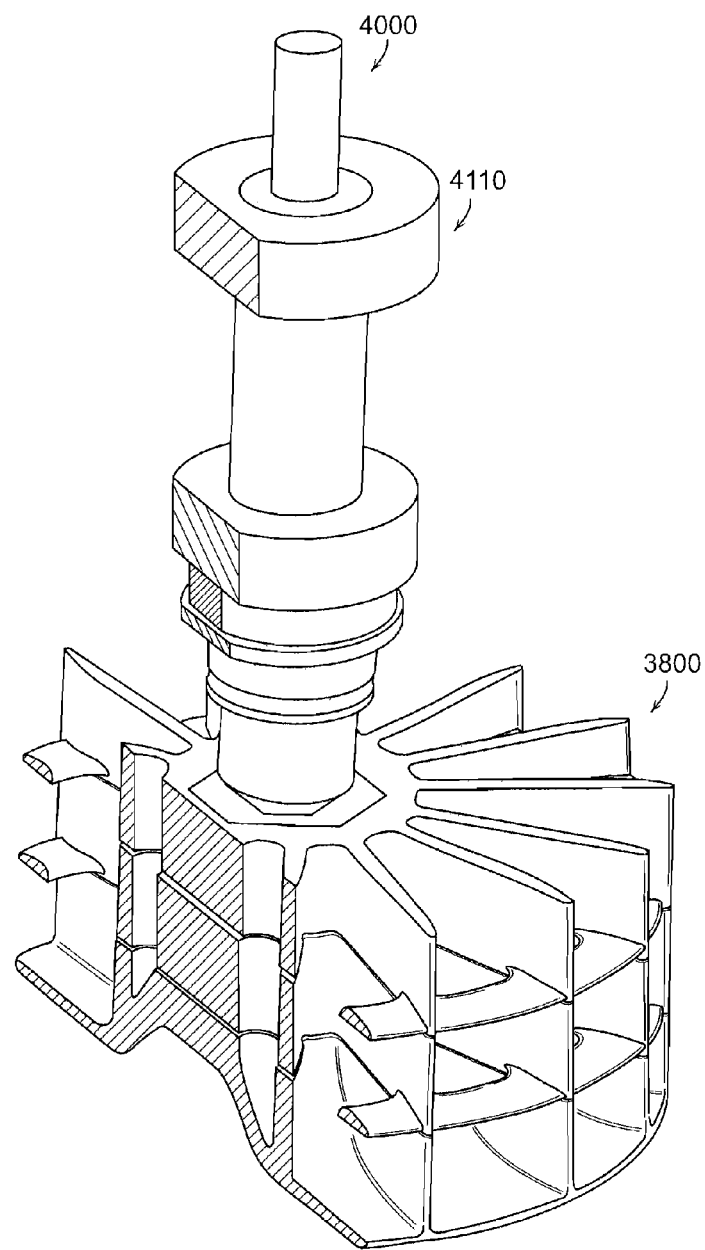
FIG. 41 shows an off-center cross-section of an impeller connected to a shaft, showing the stacked sections of the impeller having annular horizontal cross-sections connecting the vanes of the impeller, and the same collar, seals and bearings for the shaft depicted in FIG. 40.
Figure 42:
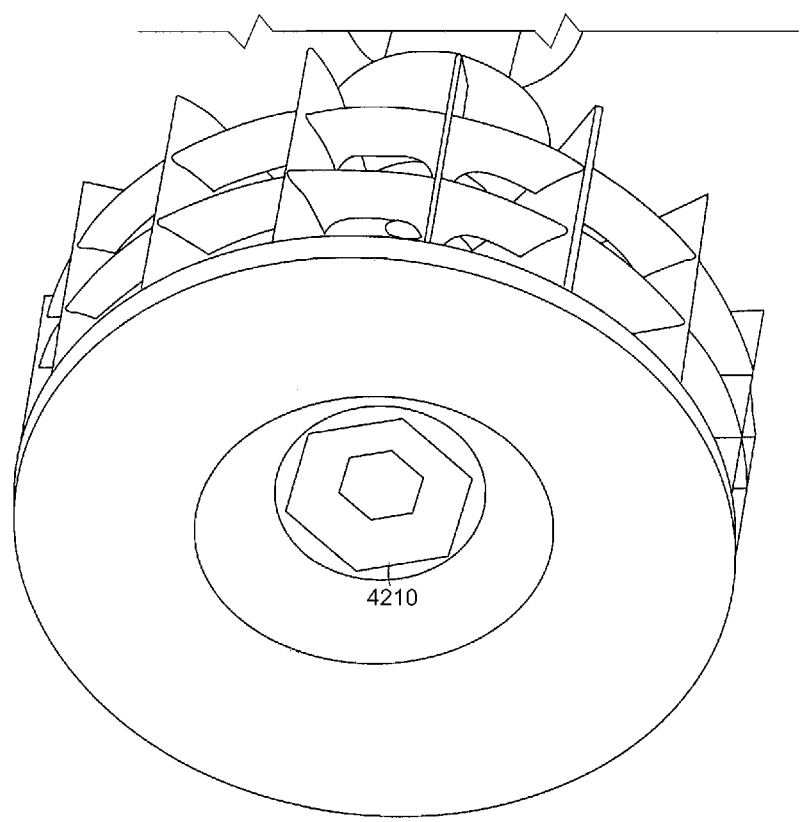
FIG. 42 shows a bottom view of an impeller.

As can be seen in FIG. 40, shaft 4000 comprises bearings 4010, a ringed collar 4020, face seal 4030, spiral seal 4040, and valve plate 4050 above the top of the impeller. In addition, one or more seals 4060 may be located below impeller 3800. FIG. 41 shows a cut-away view of impeller 3800 and shaft 4000 and an additional upper collar 4110. A top view of impeller 3800 is shown in FIG. 42, where a stop 4210 is designed to interact with shaft 4000 and prevent the impeller from rising too high along the shaft during rotation. Minimizing the gap between impeller 3800 along shaft 4000 prevents leakage between multiple vane 3810.

Figure 38:
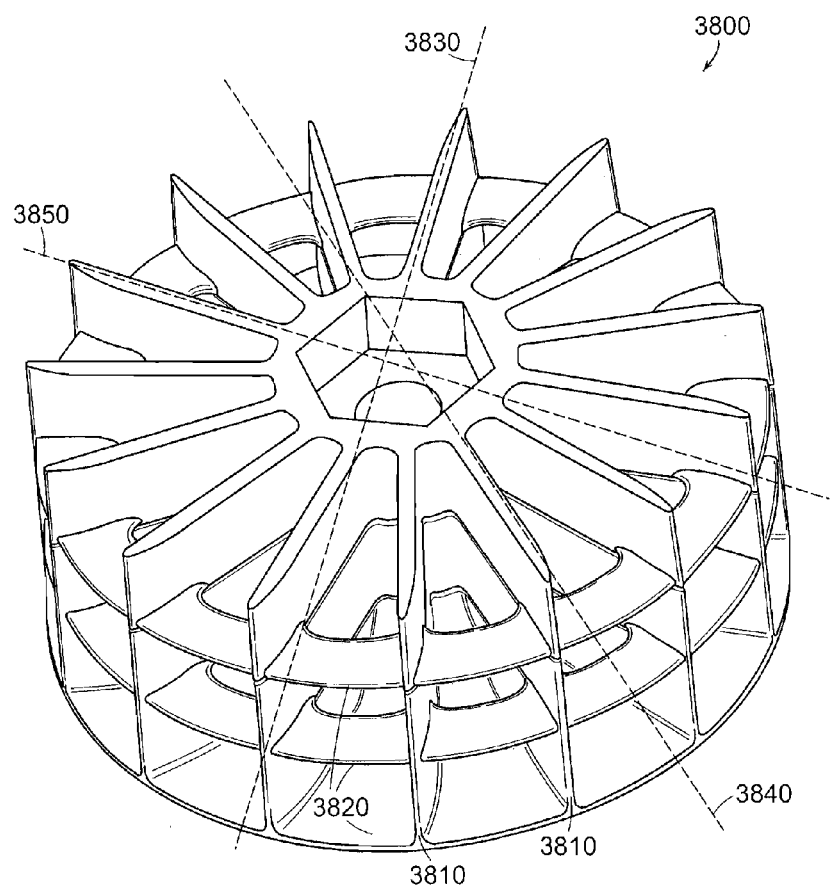
FIG. 38 shows a top view of an impeller in accordance with embodiments of the present invention, detailing the oblique angle of each vane relative to the central rotational axis, the offset vanes across the central rotational axis, and the stacked annular horizontal cross-plates connecting and stabilizing the vanes.

The stacked annular horizontal cross-plates 3820 greatly decreases drag of multiple vanes 3810 along the liquid ring in rotatable housing improves the rigidity, and thus durability, of impeller 3800, and decreases root stress. Although the cross-plates extend to the end of the vanes in the embodiments depicted in FIGS. 38-42, other embodiments are envisioned with annular horizontal cross-plates that extend only part way from the central axis which encompasses shaft 4000. The vanes extend from the central axis in a non-axial manner. Each vane, rather than extending perpendicular to a tangent for a hypothetical circular circumference about the central rotational axis of the impeller, actually extends oblique to such a tangent—i.e. oblique to the rotational axis—extending instead perpendicular to a hypothetical elliptical circumference about the central axis. Thus, if lines were drawn from each vane extending inward to the central rotational axis of the impeller, such lines would not intersect in the axial center of the impeller. Moreover, the vanes are off-set relative to the vane on the opposite side of the axial center, such that each vane does not intersect the radial center and continue on, in the same linear direction, on the other side of the axis as another vane. This is best depicted in FIG. 38, where three dotted lines 3830, 3840 and 3850 have been drawn through three impeller vanes, showing the non-axial intersection of the lines, the oblique angles of each impeller relative to a circular circumference, and the non-transecting linear direction of each vane.

FIG. 43A shows a top view of a fixed tapered external housing 2810, tapered rotatable housing 2820, which sits within housing 2810, and an impeller 3800 with a hexagonally shaped stop 4210 which rotates within the rotatable housing. The ribs 2830 of rotatable housing 2820 are designed to interact with the vanes 3810 of impeller 3800, to aid rotation. Part of a valve plate 4400 for the top of the impeller is also visible off to the lower left of the figure.

Figure 43B:
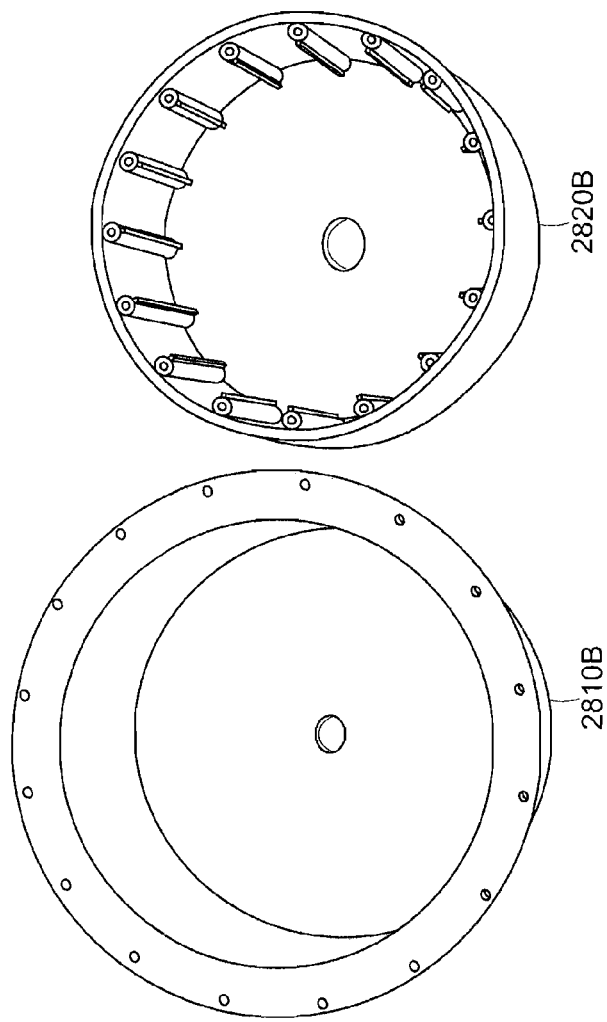
FIG. 43B shows a tapered fixed housing and an inner tapered rotatable housing.

FIG. 43A shows a top view of a tapered fixed housing 2810, tapered rotatable housing 2820 which sits within the fixed housing, and an impeller 3800 with a hexagonally shaped stop 4210 which rotates within the rotatable housing. The ribs 2830 of rotatable housing 2820 are designed to interact with the vanes 3810 of impeller 3800, to aid rotation. Part of a valve plate for the top of the impeller is also visible off to the lower left of the figure. FIG. 43B shows another view of a tapered external housing 2810B and tapered rotatable inner housing 2820B.

Figure 39:
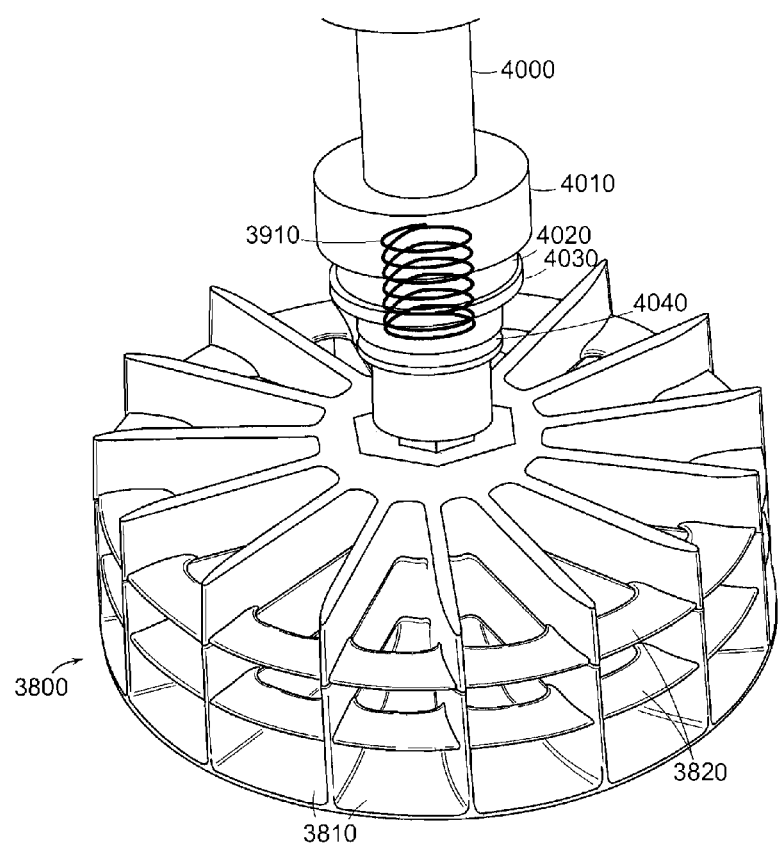
FIG. 39 shows an impeller connected to a shaft, wherein bearings, a collar, and face and spiral seals are visible on the shaft above the impeller.
Figure 44:
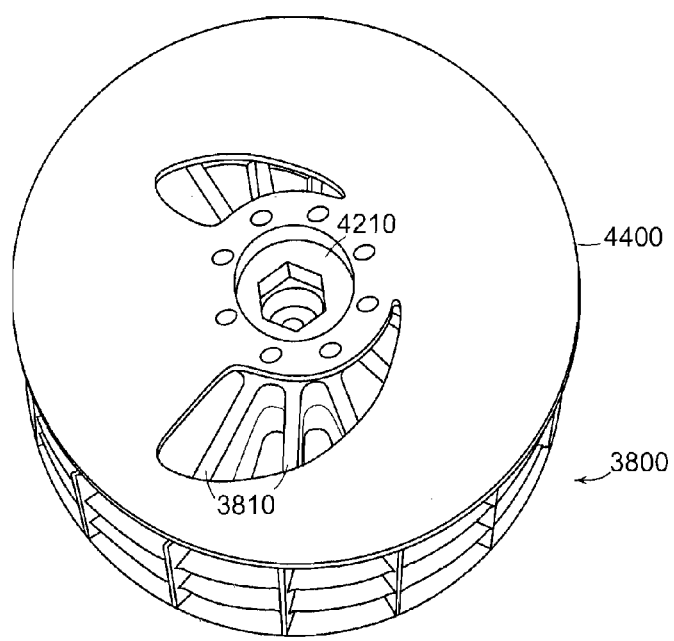
FIG. 44 shows a top view of an impeller having a stop, with a valve plate situated over the impeller.
Figure 45:
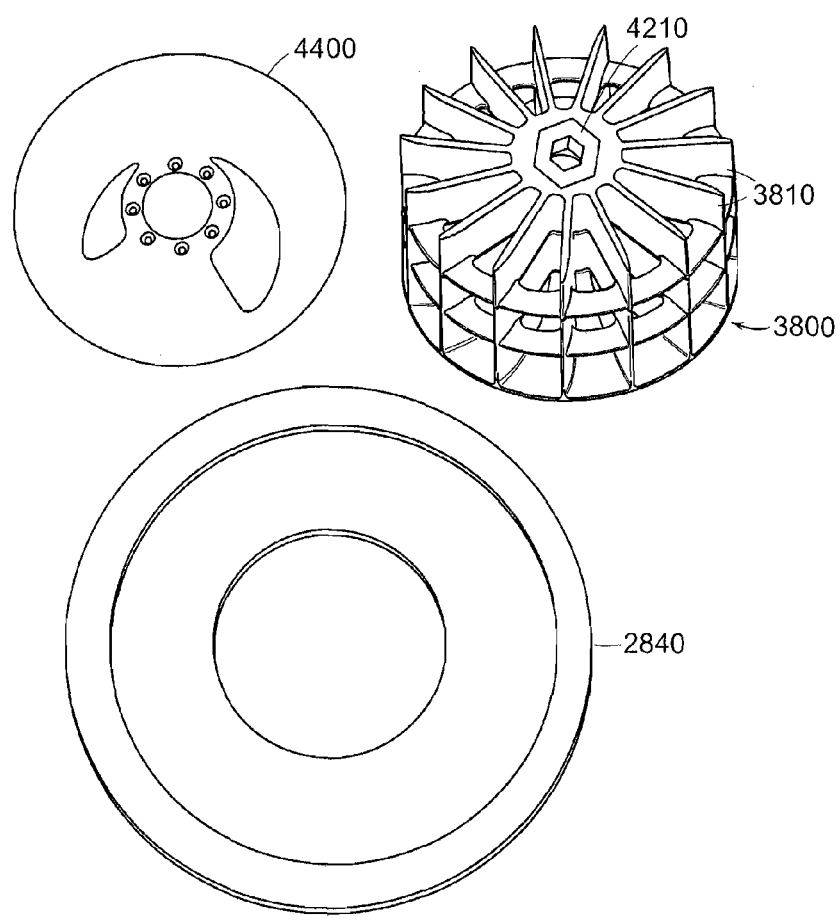
FIG. 45 shows a top view of a disassembled impeller with stop, valve plate, and top cover for the rotatable housing.

FIG. 44 is a top view of an impeller 3800 having a stop 3810, with a valve plate 4400 situated over the impeller, while FIG. 45 shows a top view of a disassembled impeller 3800 with stop 3810, valve plate 4400, and top cover 2820 for the rotatable housing. Impeller 3800 may be spring-loaded from below, to press it up against valve plate 4400, utilizing spring 3910 around shaft 4000, as depicted in FIG. 39.

Figure 46A:
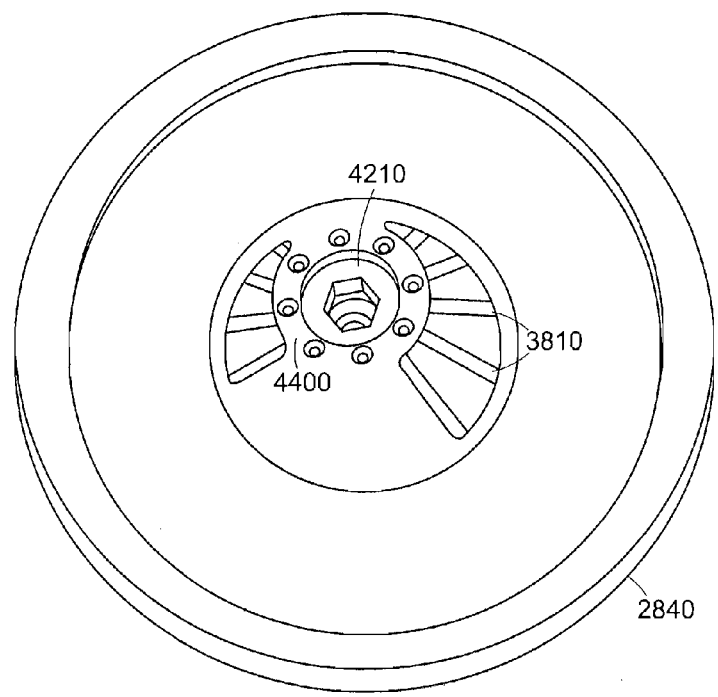
FIG. 46A shows a top view of an assembled impeller with stop and valve plate within a rotatable housing (not visible) and a housing cover for the rotatable housing.
Figure 46B:
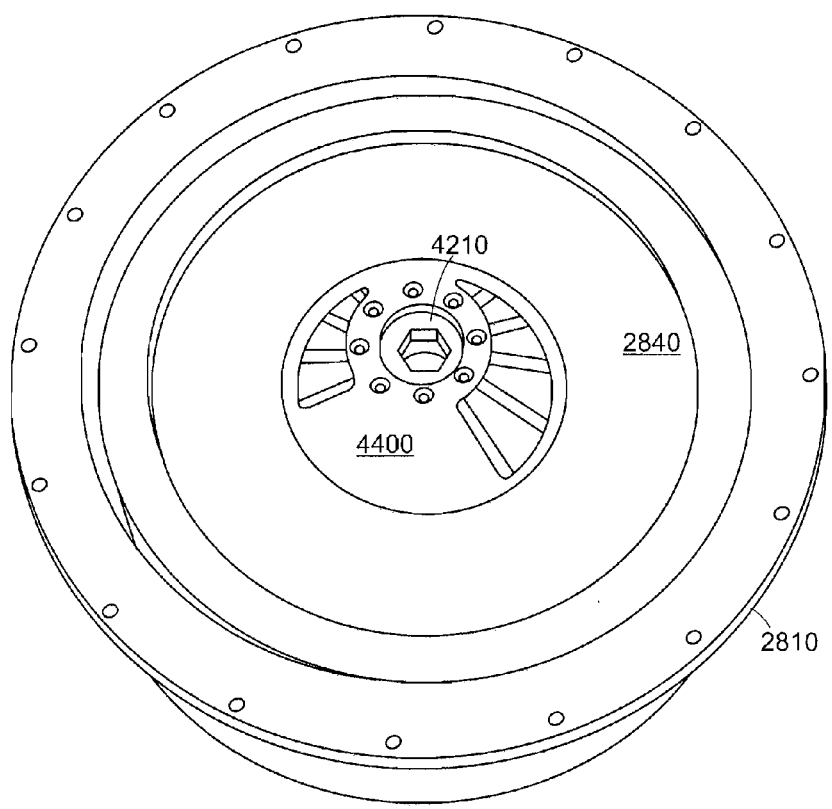
FIG. 46B shows a top view of an assemble impeller with stop and valve plate within rotatable a housing (not visible) having a housing cover, the rotatable housing and cover within an external fixed housing.
Figure 47:
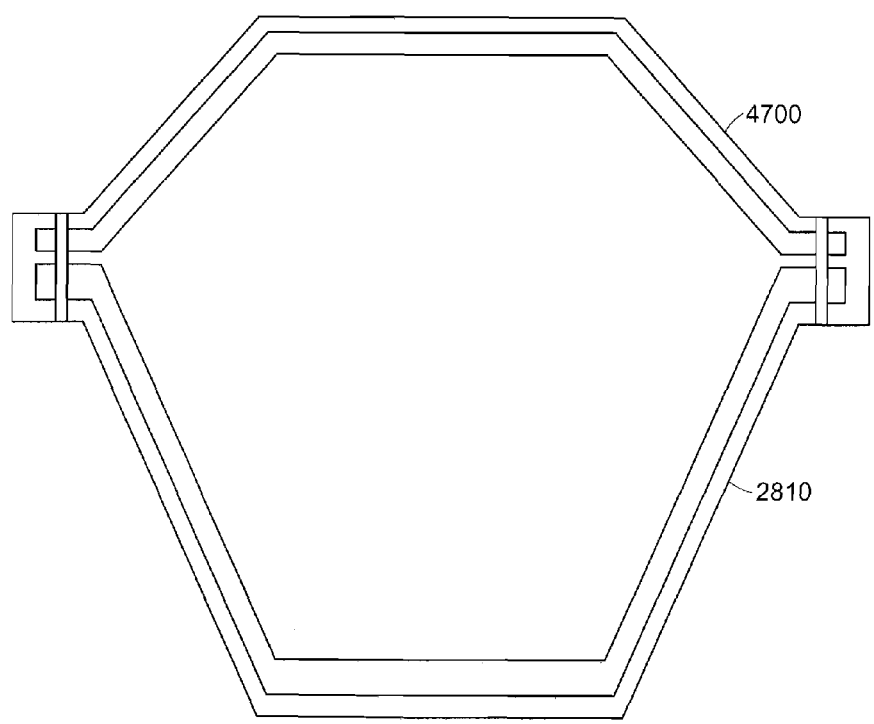
FIG. 47 shows a housing for a rotable housing and impeller having a housing cover/top.
Figure 48:
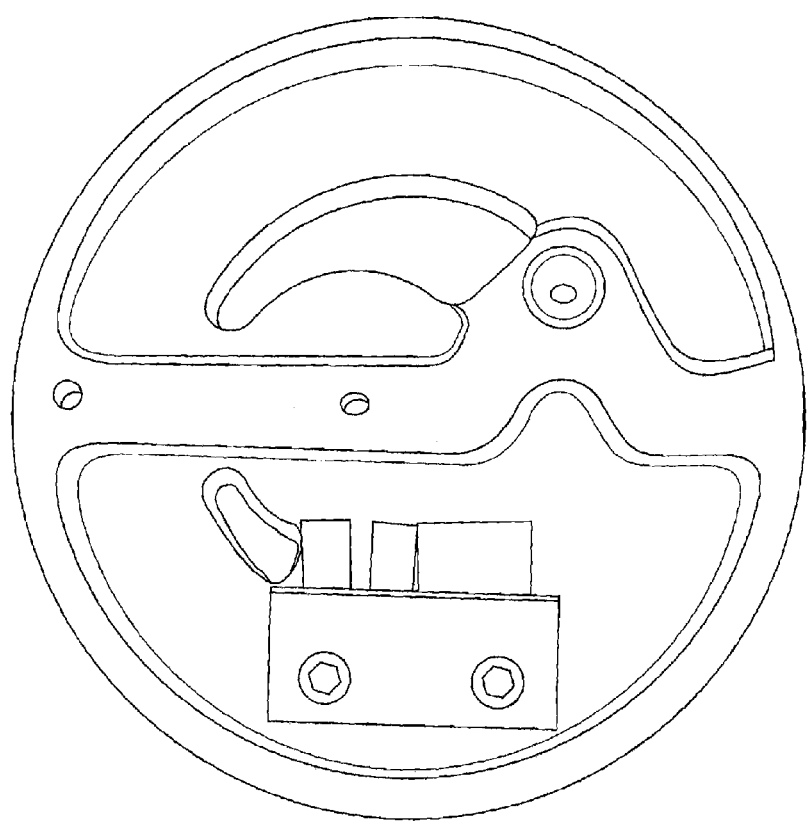
FIG. 48 shows a flapper valve for controlling input and output to the impeller, and regulating pressure in the impeller, in accordance with an embodiment of the invention.

A top view of an assembled impeller 3800 with stop 4210 and valve plate 4400 within a rotatable housing (not visible) and a rotatable housing cover 2820 for the rotatable housing is shown in FIG. 46A, and FIG. 46B shows a top view of an assembled impeller 3800 with stop 3810 and valve plate 4400 within a rotatable housing (not visible) having a rotatable housing cover 2820, wherein the assembled rotatable housing, impeller, valve plate and rotatable housing cover all sit within fixed housing 2810 or 2810B. Alternatively, housing 2810 may have a cover or top 4700, as shown in FIG. 47, to aid in preventing impeller 3800 from riding up shaft 4000 during rotation. In addition, as shown in FIG. 48 vanes 4810 may have a ridge 4820 on the top of each blade. In this embodiment, the ridge would rub against valve plate 4400 as the impeller spins. Over time the ridge 4820 will wear away slightly, providing an optimal seal between impeller 3800 and valve plate 4400. In addition, the seal between impeller 3800 and valve plate 4400 is useful as an "energy director" when the impeller is ultrasonically welded to form a stacked impeller, thereby allowing the various parts to be molded in the same mold (I think you may have deleted an important point or claim here. The idea was to have a thin ridge of plastic on the top of each impeller blade, running along the length of the blade.

Figure 49:
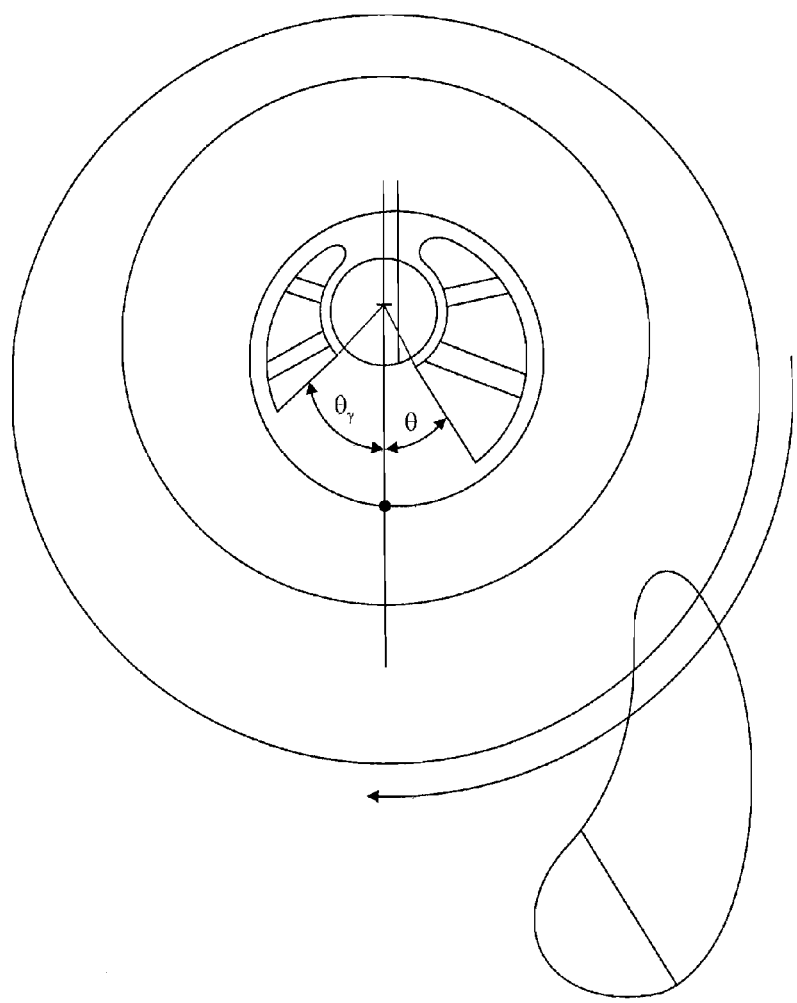
FIG. 49 shows a schematic for controlling/regulating pressure between the input and output of an impeller such as described in FIGS. 38-42.

During operation, impeller vanes 3810 cut off air flow during rotation, pressure builds, and a compression ratio is formed for controlling pressure in and out of impeller 3800. A variable compression ratio is achieved by controlling pressure into and out of impeller 3800, using flapper valves (not shown). FIG. 49 shows a schematic of how such valves regulate pressure between the input and output of an impeller such as described above.

In another embodiment, a volcano valve may be used to automatically add water to maintain the liquid ring in the liquid ring pump automatically. In this embodiment, when the liquid ring no longer covers the volcano valve, the valve will automatically open, thereby allowing water to flow into the liquid ring. When the ring fills up, the volcano valve will become fully or at least partially covered and stop the flow of water into the liquid ring.

Figure 8:
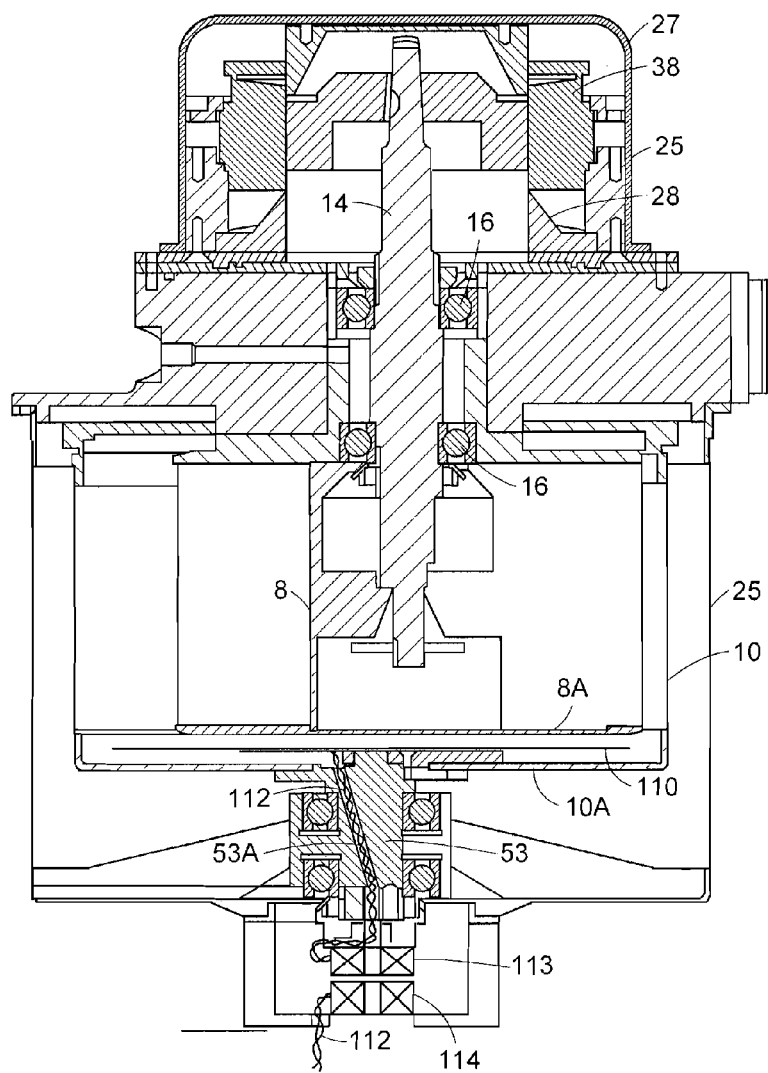
FIG. 8 is a cross-sectional view of a liquid ring pump according to an embodiment of the present invention, showing a capacitive sensor.

During operation, it may be desirable to measure the depth of the liquid ring in the compressor, to optimize performance. In the embodiments herein disclosed, liquid ring pump housing 10 rotates with the liquid ring in the pump, and the temperature of the liquid is typically around 110° C. Methods of measuring ring depth include any one of the usual methods, such as using ultra-sound, radar, floats, fluid conductivity, and optical sensors. Because of the complexities of the rotating housing, use of a capacitive sensor is a preferred embodiment for this measurement, wherein as the depth of the liquid in the capacitor changes, the capacitance of the capacitor also changes. As shown in FIG. 8, a disc-shaped capacitor sensor plate 110 is mounted to the bottom of rotating housing 10, equidistant from the bottom surface 10A of rotating housing 10, and the bottom surface 8A of rotor 8. The capacitor is thus defined by housing 10, rotor 8, and capacitor sensor 110. Leads 112 connect the capacitor, from capacitor sensor 110, through a passageway 53A in rotating housing shaft 53, to the secondary 113 of a core transformer, preferably of ferrite (not shown). In one embodiment, the secondary 113 is rotating at the same speed as the capacitor plate, and is in inductive communication with the primary of the ferrite core transformer. The primary winding 114 is stationary, and signals to and from the level-measuring capacitor are communicated through the transformer, in this way enabling depth information to be transmitted from a rotating position to a stationary position. Capacitance is measure by determining the LC resonance of the capacitor (C) with the inductance (L) of the transformer secondary. In a preferred embodiment, an LC oscillator circuit is constructed and the oscillation frequency is used as a measure of the capacitance.

Alternatively, in another particular embodiment in accordance with the invention, it can be envisioned that a regenerative blower might be used in place of a liquid ring pump for compressor 100. An example of a possible regenerative blower that could be used instead of a liquid ring pump is the commercially available REGENAIR® R4 Series by GAST (e.g. models R4110-2/R4310A-2 et seq.), capable of operating at 52" H₂O maximum pressure, 92 cfm open flow, or 48" H₂O maximum pressure, 88 cfm open flow, respectively. See Appendix A, incorporated by reference herein.

Figure 9:
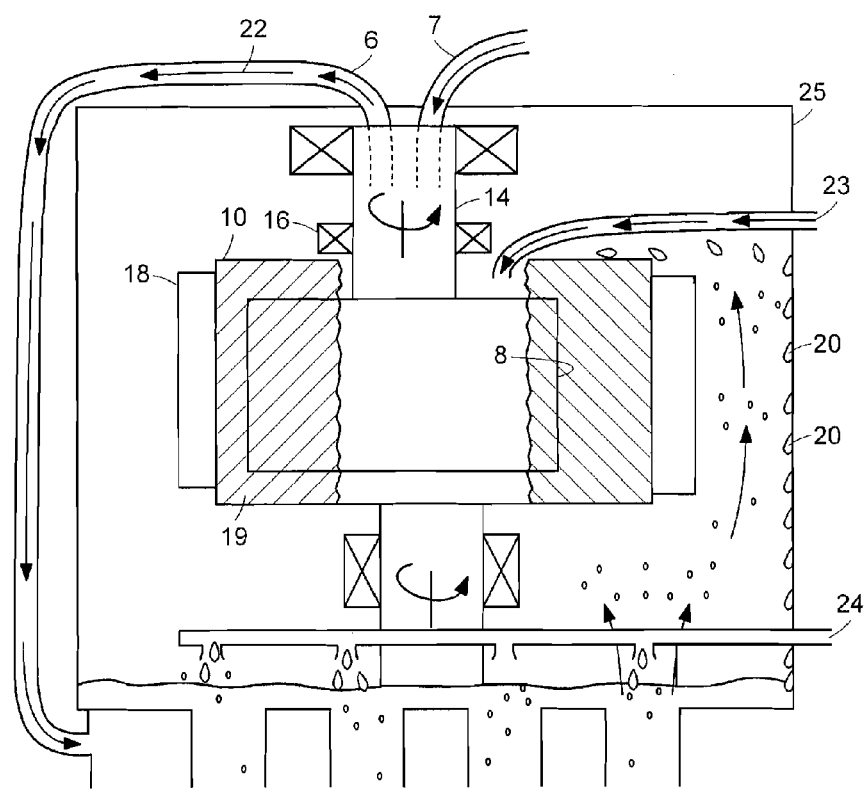
FIG. 9 is a cross-sectional view of a liquid ring pump according to an embodiment of the present invention showing the eccentric rotor, rotor vanes, drive shaft with bearings, the rotatable housing unit for the liquid ring pump, the fixed housing, and the cyclone effect and resulting mist and water droplet elimination from the steam.

To prevent contaminated liquid droplets from being entrained and carried along with vapor to condenser 200, pump 100 may be designed as shown in the alternative embodiment of FIG. 9, for example. In such an embodiment, the liquid ring pump is within the head space of the evaporator/condenser, and mist is eliminated as rotating housing 10 rotates, wherein the rotation creates a cyclone effect, flinging mist and water droplets off by centrifugal force to collide with the still housing and run down to the water in the sump. There may also be fins 18 extending from the outside of rotating housing 10 to enhance circulation and rotation of vapor in the annular space between rotating housing 10 and fixed housing 25. A steam exit 22 is provided for passage of steam to condenser 200.

Figure 50:
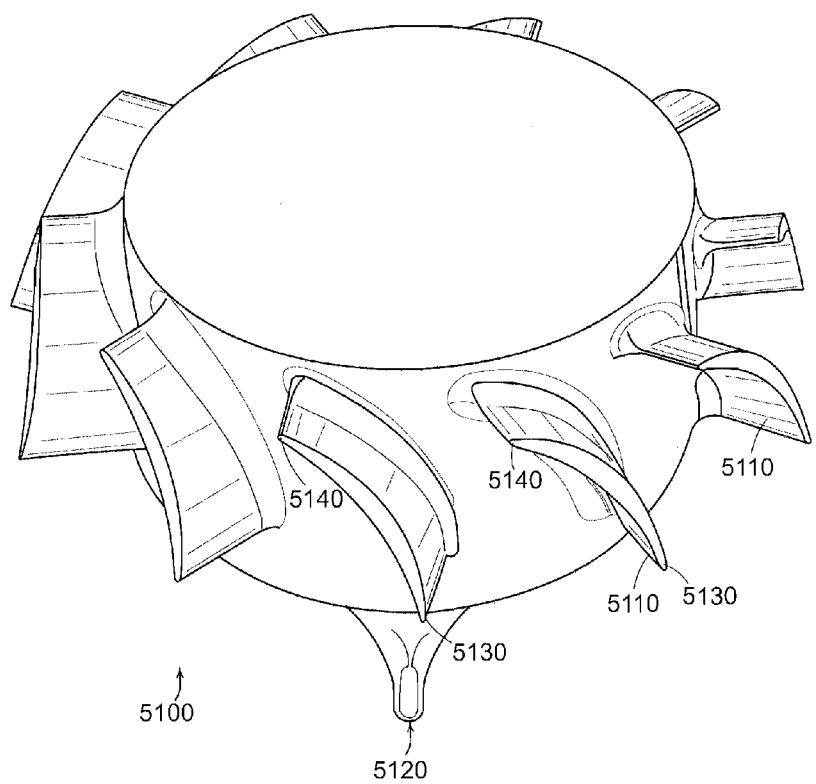
FIG. 50 shows a top side view of a diverter cone with vanes, for directing flow from the liquid ring pump into the mist eliminator.
Figure 51:
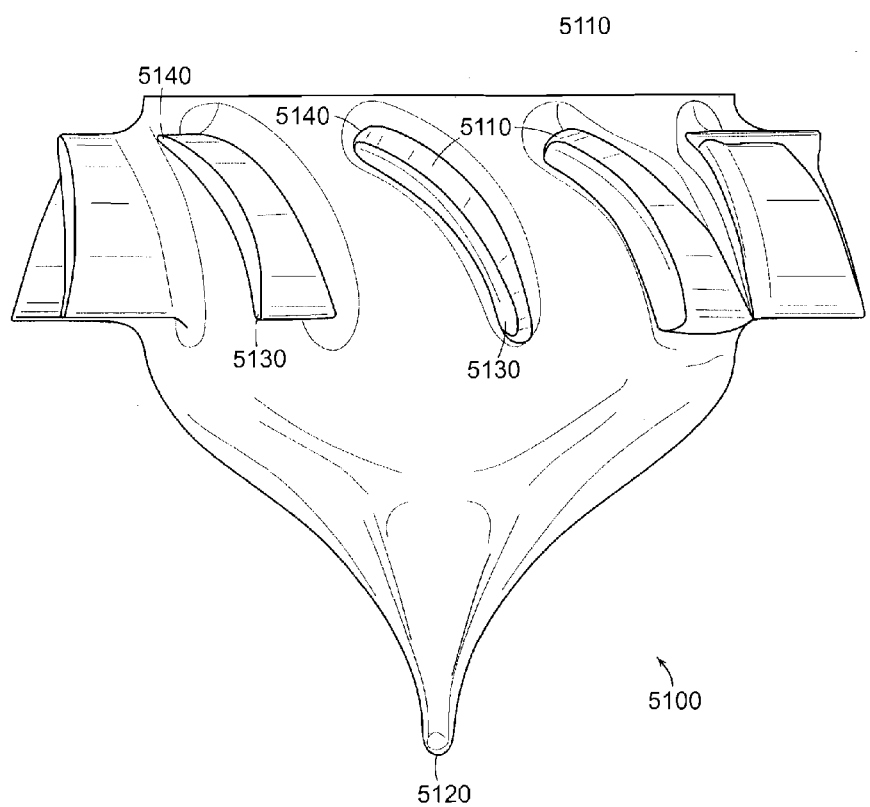
FIG. 51 shows a side-on view of a diverter cone with vanes, showing the non-parallel arcuate, propeller-like nature of the vanes.
Figure 52:
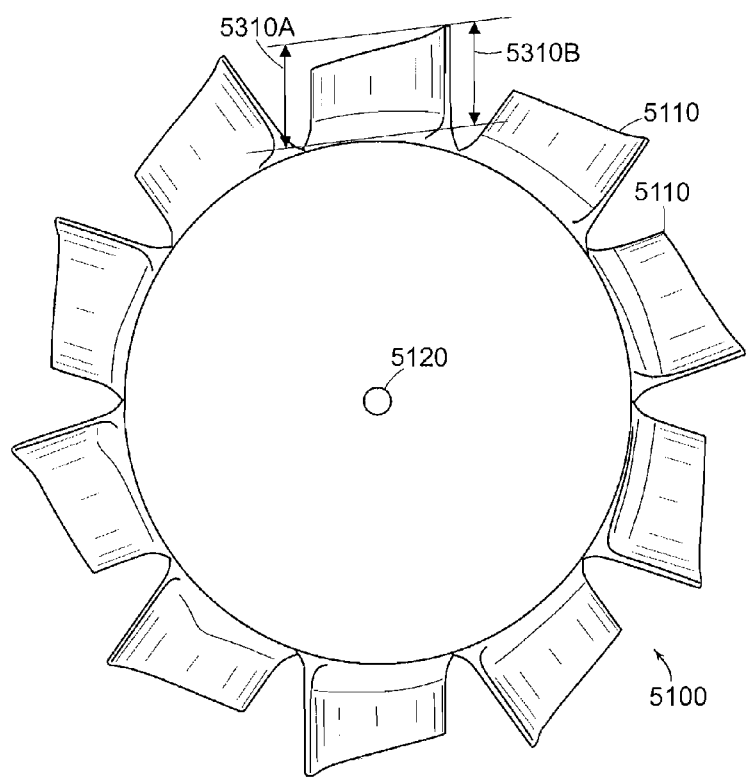
FIG. 52 shows a direct view from the bottom of a diverter cone with vanes, showing the propeller-like pitch of the vanes with respect to the cone.

A particular embodiment of the mist eliminator having a top, a bottom and a housing wherein liquid is removed from suspension in vapor to an inner surface of the housing. The mist eliminator has a plurality of vanes disposed along a diverter cone, as illustrated in FIGS. 50-52, the diverter cone being situated at the bottom of the mist eliminator such that the vanes are angled to create a rotating motion to the vapor as it enters the housing. In a particular embodiment, vanes 5110 of diverter cone 5100 are curved in an arcuate manner and angled (see FIG. 50) southeasterly downward towards the lower apex 5120 of the cone. More particularly, vanes 5110 are not parallel, having a wider gap 5130 between each vane at the lower end of the vanes—i.e. the ends directed towards the steam entering from the vaporizer—compared to the gap 5140 between each vane at the upper end of the vanes—where steam is diverted by the vanes along the surface of the diverter cone into the mist eliminator. This is most easily seen in FIG. 50, a view looking down from above diverter cone 5100, and FIG. 51, a direct side view of diverter cone 5100. FIG. 52, a head-on view from the bottom of diverter cone 5100, shows the non-parallel, arcuate, propeller-like nature of the vanes relative to the diverter cone, and the non-uniform effective lengths 5310A and 5310B, resulting from the non-parallel pitch of each vane relative to the diverter cone, from one side of each vane to the other. In alternative embodiments, vanes 5110 may be arranged in any manner, having any direction and spacing, effective for diverting the flow of steam from the liquid ring pump into the mist eliminator.

In other particular embodiments, the diverter cone may not be present, replaced by an input, which imparts rotating motion to the vapor entering the housing of the mist eliminator. For example, the input may have a thread-like inner surface such that as vapor is forced into the mist eliminator and wherein the threads impart rotational motion to the vapor. Other designs for the input may also impart rotational motion to entering vapor, such as a circular tunnel or corkscrew-like input designed for the entering vapor.

There is also a plurality of scales along the inner surface of the housing, forming an angle α of at least about 15 degrees relative to a longitudinal axis Z of the housing. The scales are situated to entrap liquid removed from suspension in vapor upon contact of the liquid with the scales. In one particular embodiment, the scales may be envisioned to be situated like inverted siding on a house, such that the top of each scale, angled 15° away from the vertical surface of the housing, overlaps the base of the scale above it. In addition, each scale is in fluid communication with a gap, or trough created by the overlap between the scale and the inner surface of the housing of a dimension adapted to draw liquid through the gap to a collection area. In particular embodiments, the gap may be between about 0.025 and 0.05 inches. Particular embodiments of the mist eliminator may also comprise a steam output for allowing steam to escape and/or a separator for collecting any liquid passing through the top of the mist eliminator. The plurality of scales may be attached to the inner surface of the housing by any attaching means, such as screws, brads, staples, adhesive resin, or any other suitable attaching means. Alternatively, the scales may be a feature of the surface of the inner housing, created by a molding process or other manufacturing process as a single piece. In yet another embodiment, the scales may be angled downward, like the siding on a house.

Figures 1, 10:
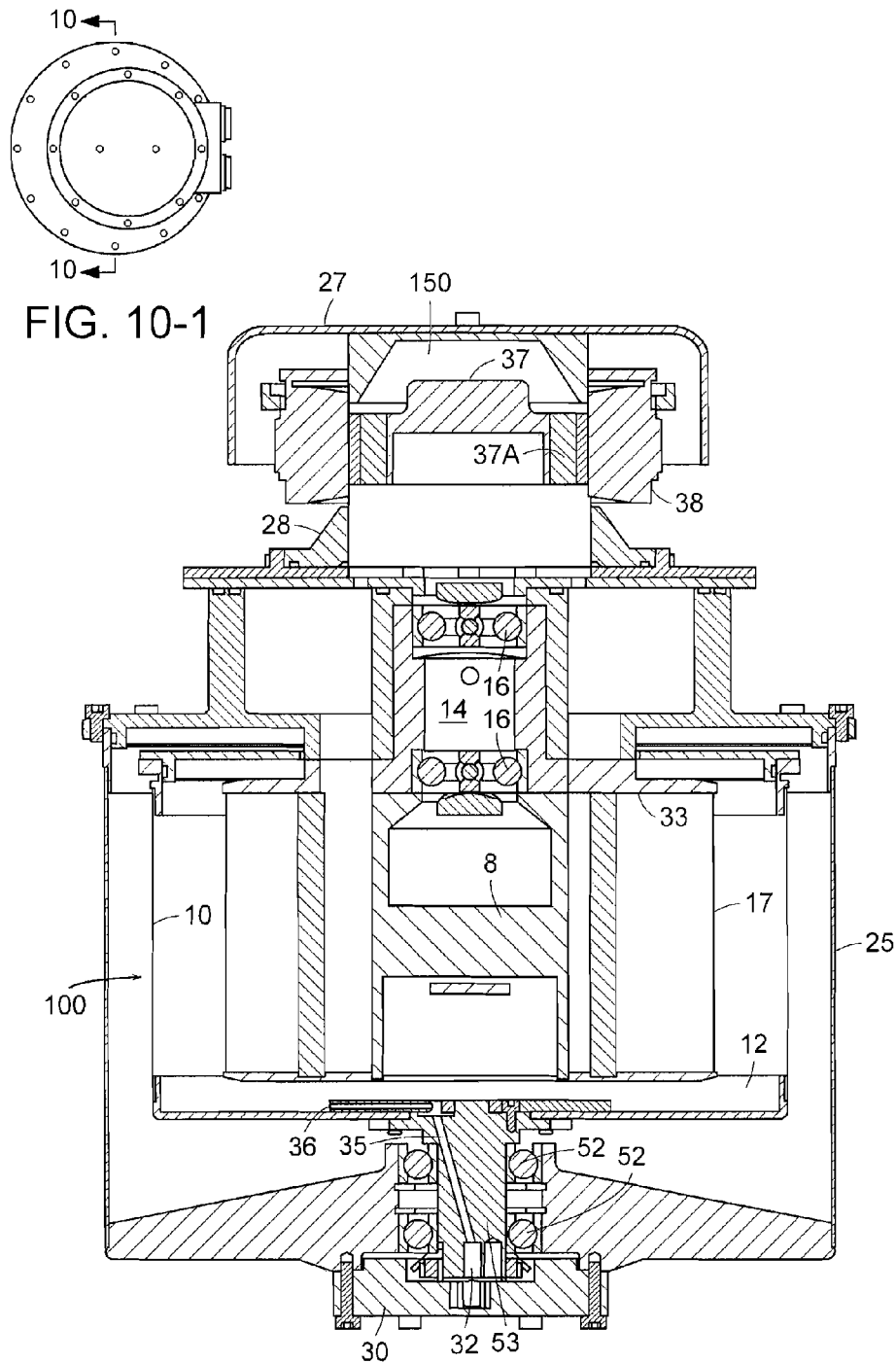
FIG. 10 is a cross-sectional view of a particular embodiment of a liquid ring pump in accordance with the present invention, showing a hermetically sealed motor rotor and magnets that are housed within the pressure and fluid boundary of the system, the drive shaft, rotor, and rotatable housing wherein water droplets are spun off and recycled back to the base water level of the pump, and a siphon pump for drawing water up into the main chamber of the pump from the lower reservoir.
Figure 11:
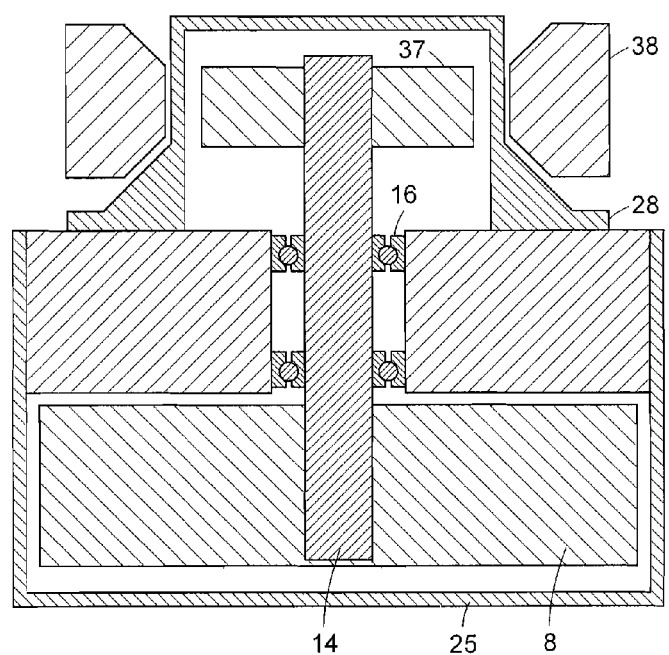
FIG. 11 is a detailed view of the hermetically sealed motor rotor shown in FIG. 10.

In a preferred embodiment, there may also be an actuator 150, such as a motor, for driving compressor/pump 100, as shown in FIG. 10. Motor 150 receives power from power source 800 (shown in FIG. 1A). In the particular embodiment shown in FIGS. 10 and 11, the motor rotor/magnets 37 are hermetically sealed inside the pressure and fluid boundary of the system, and the motor can 27 and motor stator/windings 38 are located outside the main pressure system envelope. A single continuous shaft 14 spans the length from motor 150 to pump 100, about which sit bearings 16, to enable rotation of motor rotor 37 and pump rotor 8. Use of a hermetically sealed motor and continuous shaft eliminates the need for a sealed shaft penetration of the pressure boundary. In addition, the motor is maintained at a constant temperature by the surrounding saturated steam and circulation of liquid intake 39 about motor stator 38 (see FIG. 14A, infra). Heat generated by the motor is therefore transferred into the system, reducing the overall heat input required to maintain the temperature.

In one embodiment, motor 150 is a motor of the type designed to be run in steam and water, eliminating the need for shaft couplings and mechanical seals, thereby reducing drag and complexity in the mechanical components, and simultaneously allowing better recovery of motor power loss. In such an embodiment, motor rotor 37 (see FIG. 10) is made of laminations. To protect against rust, the laminations may be made of steel, and are protected by plasma coatings, silicone coatings, powder coatings or the laminations and magnets may be plated with nickel.

In a more preferred embodiment, motor rotor 37 is a solid material rotor such as pure iron or stainless steel, for example, a high-chromium content steel such as 446 stainless steel. The iron or steel rotors 37 may be nickel-plated, as may be magnets 37A. Pure iron rotors have the best magnetic properties, and improved torque relative to laminated rotors. Alternatively, solid stainless steel rotors with nickel-plated magnets may be used. Preferably the stainless steel has a high chromium content, thereby creating a coating of chrome oxide on the surface of rotor 37, which protects the iron content in the rotor from rust. As with pure iron rotors, stainless steel rotors also have improved torque over laminated rotors.

In yet another embodiment, the high-chromium content stainless steel rotor may be passivated to remove surface iron, creating a thick chromium oxide coating for enhanced corrosion protection. Other applied coatings may be used to aid in corrosion resistance. In addition, the nickel-plated magnets may be curved surface magnets, which will further increase motor torque and reduce manufacturing costs.

As shown in FIG. 10, motor housing 27 contains motor 150 with motor stator/windings 38. Motor can 28 hermetically seals motor rotor 37, motor magnets 37A, and motor and pump rotor continuous drive shaft 14 within the fluid/pressure envelope of the system. Fixed housing 25 encloses non-rotating valve-plate 33, and pump rotor 8 having multiple rotor vanes 17, rotor bearings 16, and a liquid ring 19 (see FIG. 6A or 9), typically water, that rotates with rotating housing 10. A drain (not shown) on outer housing 25 prevents over filling of the liquid ring pump fixed housing.

A lower reservoir 30 containing a level of liquid, connects to a drain/fill fluid line (not shown), and houses siphon pump 32 and rotating housing bearings 52 about rotating housing shaft 53. Siphon pump 32 redirects liquid, preferably water, from lower reservoir 31 up siphon pump line 35 and continuing through siphon feed line 36 into chamber 12. As rotor 8 and liquid ring 19 rotate, water droplets 20 are flung by centrifugal force outwards, through a liquid ring overflow opening (not shown), against fixed housing 25, and then run down fixed housing wall 25 and back into lower reservoir 30.

Figure 12A:
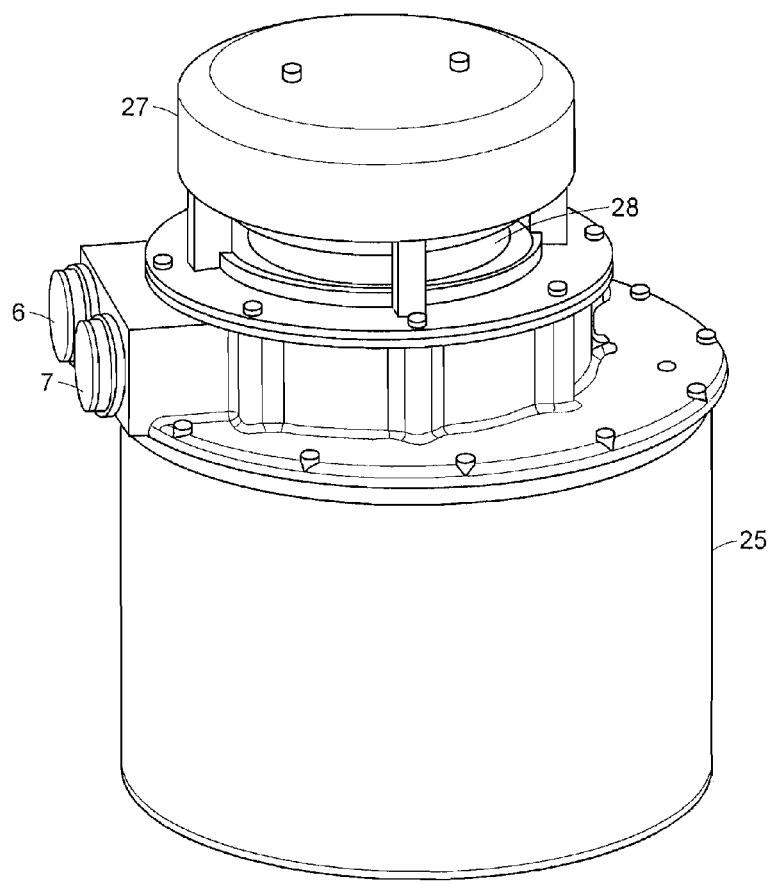
FIG. 12A is a view of the external pump housing and motor housing for an embodiment in accordance with that of FIG. 10, showing steam input and output ports.
Figure 12B:
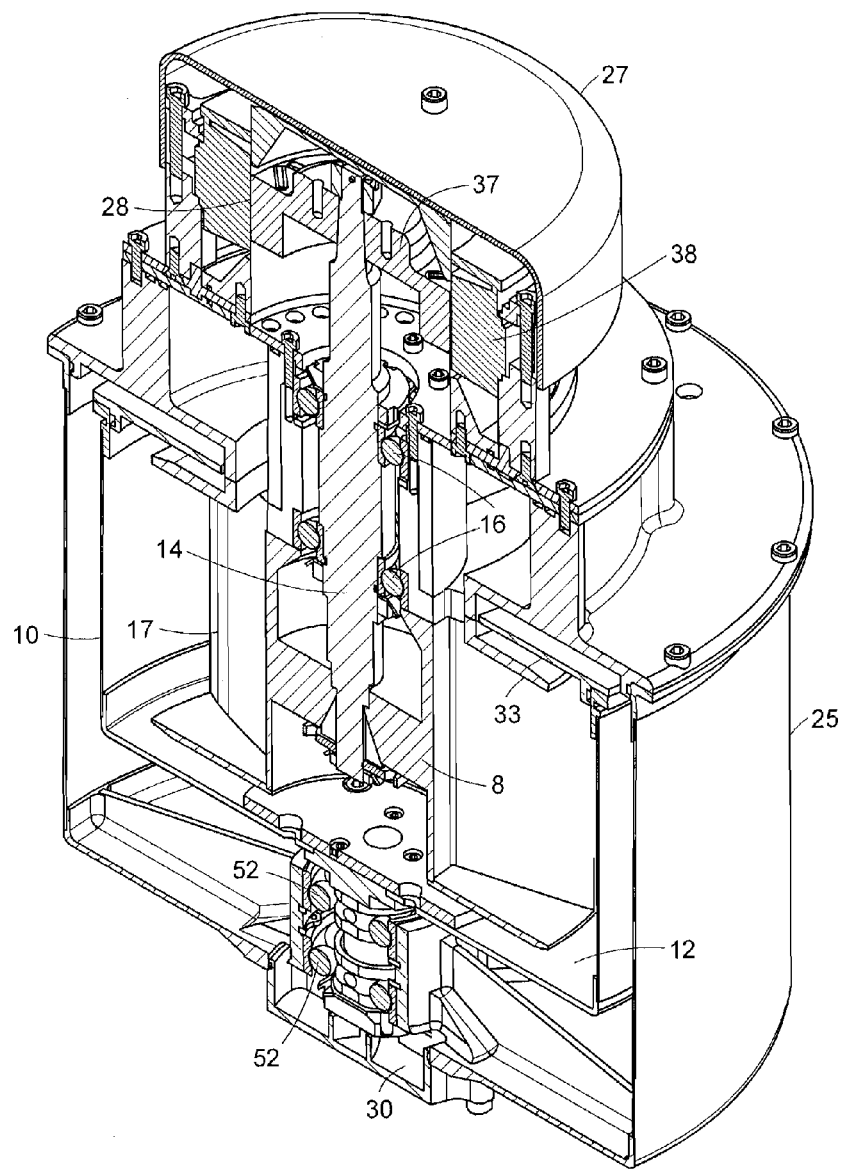
FIG. 12B is a cross-sectional view of FIG. 12A, showing the motor within its housing, the motor shaft and rotor, and the lower reservoir.

FIG. 12A shows an embodiment in accordance with the present invention of external fixed housing 25, external motor housing 27, exhaust and intake manifolds 6 and 7, respectively, and motor can 28. FIG. 12B is a cross-sectional view of the embodiment depicted in FIG. 12A. External motor housing 27, external housing 25, and lower reservoir 30, are visible, including rotating housing bearings 52. In addition, a motor with motor rotor 37, motor stator 38, and single continuous rotor shaft 14 and rotor vanes 17 are also visible.

Figure 12C:
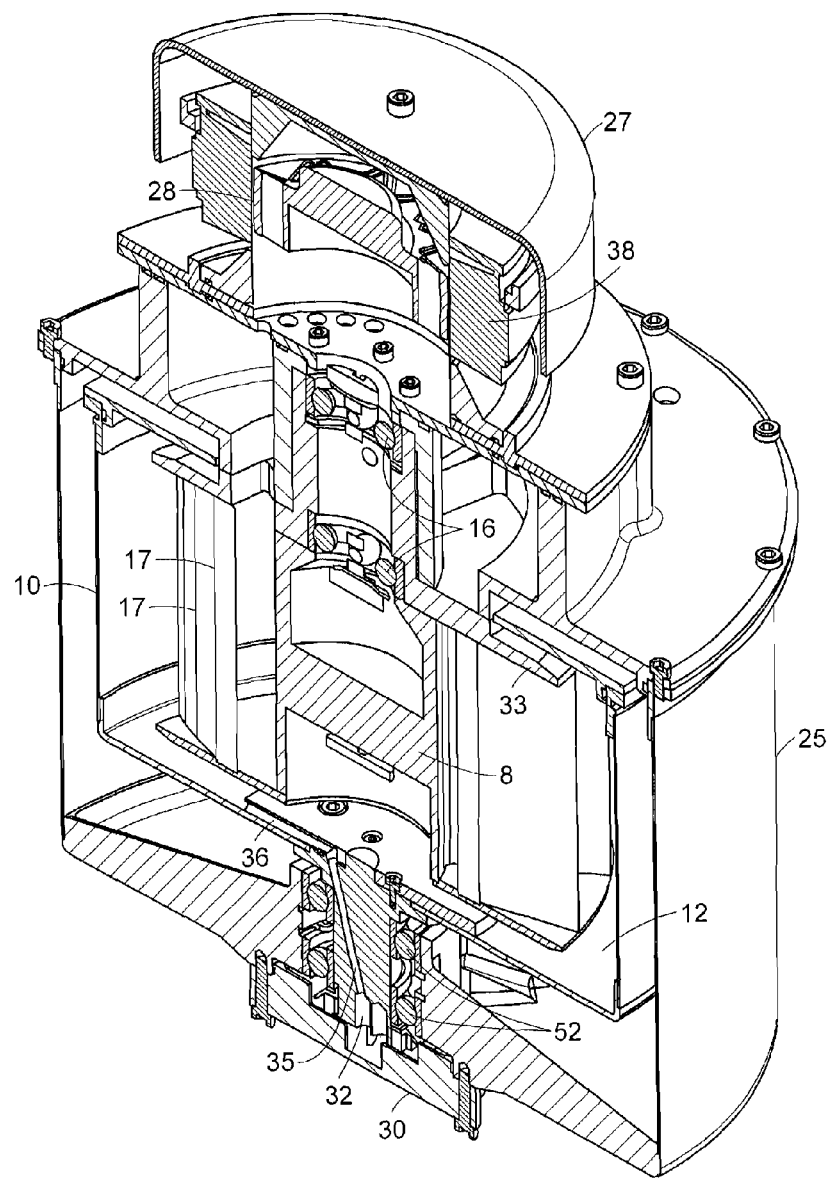
FIG. 12C is another cross-sectional view of FIG. 12A through a different plane, again showing the motor within its housing, the motor shaft and rotor, and the fluid line connecting to the lower reservoir, wherein the siphon pump is now visible.

Similarly, FIG. 12C shows a cross-sectional view of the same embodiment as seen in FIGS. 12A and 12B, but through a different plane. Now, siphon pump 32, with siphon pump line 35 and siphon feed line 36 connecting into chamber 12, can be readily seen within lower reservoir 30.

A detailed view of siphon pump 32 can be seen in FIG. 13, a cross-sectional view of lower reservoir 30. FIG. 13 shows lower reservoir 30, within which can be seen rotating housing bearings 52 and a cut-away view of siphon pump 32, siphon pump line 35, siphon feed line 36 and chamber 12. In operation, siphon pump 32 draws water from lower reservoir 30, pumps the water up through siphon pump line 35 to siphon feed line 36, and thereby back into chamber 12. With reference to FIG. 10, embodiments of the invention that transfer fluid from lower reservoir 30 to chamber 12 may utilize one or more baffles in lower reservoir 30, preferably attached to the fixed, exterior housing 25. The baffles, which preferably may be radial in configuration, disrupt the flow of fluid induced by the rotation of housing 10, to prevent loss of siphon in siphon pump 32, thereby maintaining better siphon flow and enabling prime if siphon is lost.

Figure 14A:
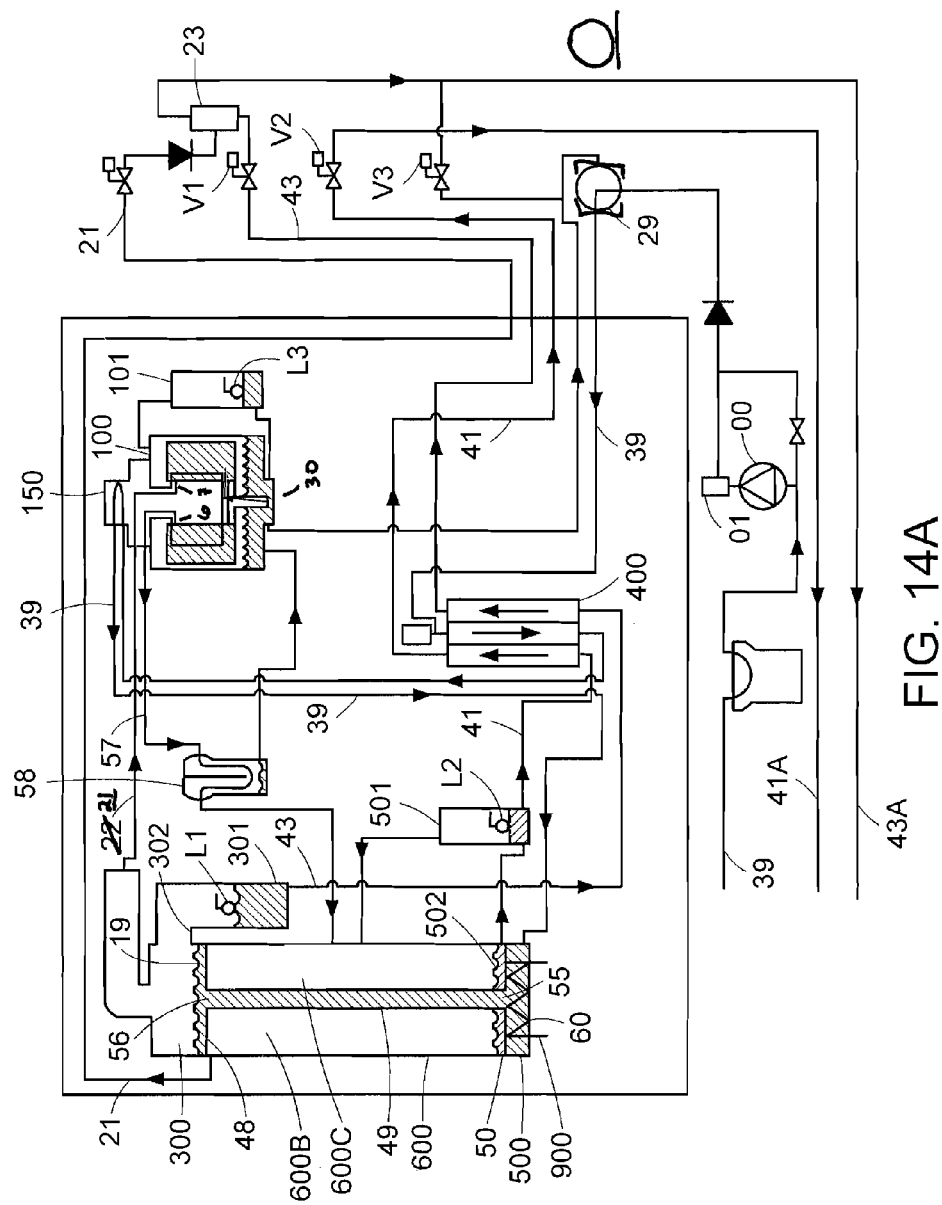
FIG. 14A is a schematic of an overall system in accordance with an embodiment of the invention, showing the intake passing through a pump, into a heat exchanger, continuing into the core of the still wherein a heater vaporizes the liquid into steam in the head section after which the steam flows to the compressor and into the condenser, after which condensed product can be recovered.

Another specific embodiment of the present invention is designed to improve overall energy efficiency of the system, and is shown in FIG. 14A. A system in accordance with this particular embodiment has cold liquid intake 39 flowing through pump intake 00, continuing through exchanger 400. Pump 00 is typically a diaphragm positive-displacement pump, which is self-priming when the system is not pressurized—i.e., P inside the system equals P outside. In a preferred embodiment, pump 00 may also have a loop feedback configuration, with air vent 01, to help prime pump 00 upon start-up, or more particularly, to re-prime the operating system, under pressure, if the prime is lost, as would happen if the source hose were removed from the liquid source container.

From exchanger 400, the intake line may continue in a cooling loop about motor 150, and then continue into core evaporator/condenser 600 wherein condenser 200 has a top core plate 48 and a bottom core plate 50. Within core evaporator/condenser 600 may be multiple parallel tubes 49, typically made of copper-nickel alloy or other heat-transferable material, having head manifold openings 56 to allow core tubes 49 to communicate with head 300, and having sump manifold openings 55 to allow tubes 49 to communicate with sump 500. Core tubes 49 are the heat exchange surface through which the latent heat of evaporation is transferred in the evaporation/condensation cycle. The rate at which heat can be exchanged between the condensing steam, outside the tubes, and evaporating water, inside the tubes, is a key factor in output rate and efficiency. If the thermal resistance of the heat exchange surface is low, better heat exchange occurs and output volume and efficiency increases. Any air impinged against the condensing surface becomes an insulator that inhibits transfer of heat. To prevent this, any air present in the system is continuously vented out of the system, via, for example, air vent 01, volatile mixer 23, or other venting outlets as required. Heat transfer may also be adversely affected when water forms sheets as it condenses and coats the exterior of the tubes as it runs down to the bottom of the condenser chamber, a phenomenon known as "skinning." The extent to which the water "skins" on the surface of the condenser is determined largely by the surface energy (hydrophobicity) of the heat transfer surface. In an embodiment of the present invention, hydrophobic coatings may be applied to cause condensing water to bead-up rather than skin, thereby leaving more of the heat transfer surface exposed for efficient heat transfer. Examples of suitable hydrophobic coatings include a coating manufactured by Ocular Technologies, or any other hydrophobic coating that imposes little to no thermal resistance itself.

Steam 21 from the evaporator section 600B of evaporator/condenser 600 may also feed into a volatile mixer 23 where volatile gases may be released from the system.

The system maintains a constant blowdown water flow to prevent scaling and other accumulation in the system. Water level 19 in head chamber 300 is adjusted through a feedback control loop using level sensor L1, valve V1, and source pump 00, to maintain proper water flow through the blowdown stream 43. The three-way source pump fill valve 29 is set to pump water into sump 500, which causes water level 19 in head chamber 300 to rise. As liquid level 19 rises in head chamber 300, liquid overflows past a dam-like barrier 302 into blowdown control chamber 301 containing blowdown level sensor L1. As required, blowdown valve V1 is controlled to allow water flow from blowdown control chamber 301 through heat exchanger 400, to extract heat and cool blowdown stream 43, and flow out valve V1, through volatile mixer 23 allowing cooling of hot gases and steam 21 from the evaporator section 600B, and then completing the blowdown stream, out to waste 43A.

The system also maintains proper product flow. Product level 502 builds up in condenser chamber 600C, and enters into product control chamber 501, where product level sensor L2 is housed. Using a feedback control loop with level sensor L2 and valve V2, product stream 41 is controlled to flow from product control chamber 501 through heat exchanger 400, to extract heat and cool product stream 41, then through valve V2 and on out to complete the product stream as product water outlet 41A.

The system may preferably be configured to maintain proper liquid ring pump water level by the use of a liquid recovery system to replenish liquid loss. There are several ways that liquid from the ring pump may be depleted during system operation, including leakage into lower reservoir 30, expulsion through exhaust port 6, and evaporation. The leakage and expulsion losses can be large depending on operational parameters, such as the speed of rotation and liquid ring pump throughput. These leakage and expulsion losses could require total replacement of the fluid in the pump several times per hour. The evaporation loss is typically small.

Liquid level in the ring pump can be maintained by adding additional source water, product water, or preferably by re-circulating liquid water lost from the liquid ring pump for improved system efficiency. In one preferred embodiment, the liquid level in the ring pump is primarily maintained by re-circulation of the liquid accumulated in lower reservoir 30 in FIG. 14A. Liquid can accumulate in lower reservoir 30 from leakage from the liquid ring pump and from fluid expelled in exhaust 57, captured in mist eliminator 58 and pumped to lower reservoir 30. Alternatively, fluid expelled in exhaust 57 and captured in mist eliminator 58 can be returned via the liquid ring pump intake port 161 (shown in FIG. 14C). Fluid accumulated in lower reservoir 30 can be re-circulated by one of several pumping mechanisms. One preferred method is to use a siphon pump 32 (described above) as shown in FIGS. 10 and 12C.

A minimum depth of water is preferably maintained in the lower reservoir for the siphon pump 32 to perform properly. In one preferred embodiment, liquid ring pump control chamber 101, which houses liquid ring pump level sensor L3 can be used to control the liquid ring pump level and control the level of water in the lower reservoir 30, as shown in FIG. 14A. Liquid ring pump control chamber 101 is fluidly connected to liquid ring pump 100 and lower reservoir 30. Liquid ring pump 100 is connected to the three-way source fill valve 29, which is set to open when the liquid ring pump requires more water and it is also connected to the liquid ring pump drain valve V3, which opens when it is required to drain water from liquid ring pump 100 into blowdown stream 43. Exhaust 57 from outlet port 6 may also flow into mist eliminator 58, while steam 21 from the head 300 of evaporator/condenser 600 flows into inlet port 7 of the liquid ring pump 100.

If re-circulated water from lower reservoir 30 is not primarily used to maintain the fluid level in the liquid ring pump, then either cold source water or product water could to be used. In the event source water were used, the introduction of cold water (which could be approximately 85 degrees C. colder than system temperature) may require the use of a pre-heater. Alternatively, product water can be used to maintain liquid ring pump fluid level, which would not adversely affecting the system temperature, although it could decrease production level. At startup, the initial fluid level for the liquid ring pump is preferably supplied from source water.

Figure 14B:
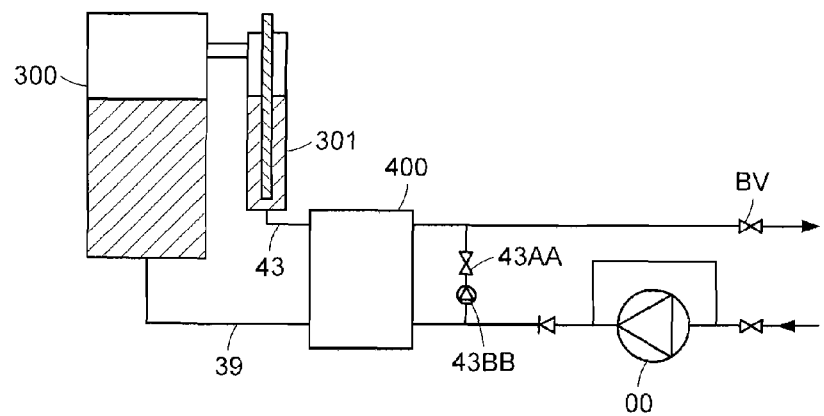
FIG. 14B is a detailed schematic of an evaporator head and blowdown level sensor housing, showing an external connecting valve between source and blowdown fluid lines.

In one embodiment, the start-up time may be reduced by using an external connecting valve 43AA between source 39 and blowdown 43 fluid lines, located adjacent to heat exchanger 400, on the cold side, as shown in FIG. 14B. To determine the level of fluid in evaporator head 300 during the initial fill, connecting valve 43 would be open, blowdown valve BV would be closed, and fluid would be pumped into the system through source line 39. Connecting blowdown 43 and source 39 lines results in equal fluid height in the blowdown level sensor housing 301 and evaporator head 300, thereby permitting a determination of fluid level in evaporator head 300 and enabling the evaporator to be filled to the minimum required level at startup. Using the minimum level required shortens initial warm-up time and prevents spillover from the evaporator head 300 through the liquid ring pump 100 to the condenser 600 when the liquid ring pump 100 starts (see FIG. 14A).

The concentration of solids in blowdown stream 43 may be monitored and controlled to prevent precipitation of materials from solution and thus clogging of the system. Also during start-up, circulating pump 43BB can circulate water through heat exchanger 400 to pre-heat the heat exchanger to the proper temperature for normal operation. A conductivity sensor (not shown) may be used to determine total dissolved solid (TDS) content by measuring the electrical conductivity of the fluid. In a particular embodiment, the sensor is an inductive sensor, whereby no electrically conductive material is in contact with the fluid stream. If the TDS content in blowdown stream 43 rises above a prescribed level, for example, during distillation of sea water, the fluid source feed rate is increased. Increasing the fluid source feed rate will increase the rate of blowdown stream 43, because distilled water production changes only slightly as a function of fluid feed rate, and an increased blowdown stream rate results in reduced concentration of TDS, thereby maintaining overall efficiency and productivity of the system.

Figure 14C:
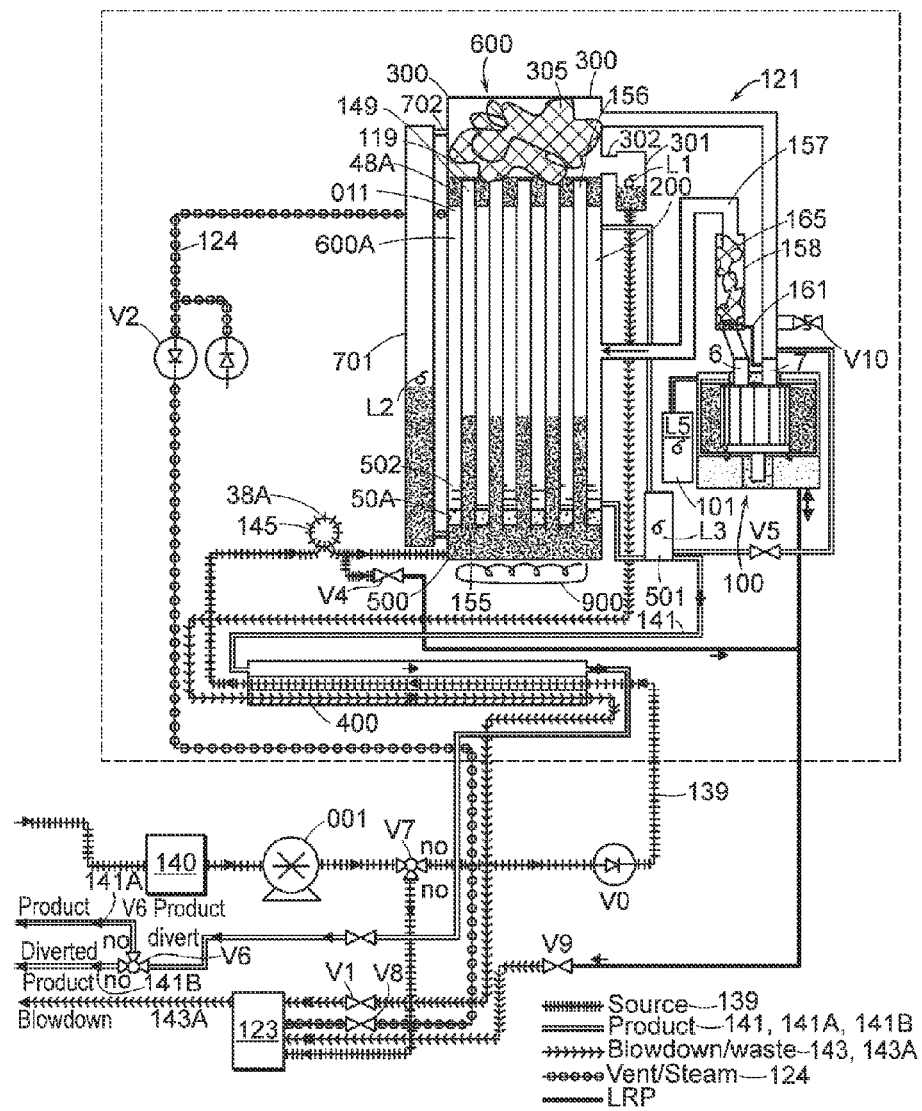
FIG. 14C shows a schematic of an overall liquid purification system, designed to operate with water, according to an embodiment of the invention.

Another specific embodiment of the present invention is shown in FIG. 14C. A system in accordance with this particular embodiment has source/intake liquid 139 flowing through strainer 140 and then feed pump 001, after which is enters a 3-way source/divert valve V7. Pump 001 is typically a diaphragm positive-displacement pump, which is self-priming when the system is not pressurized—i.e., P inside the system equals P outside. In a preferred embodiment, pump 001 may also have a loop feedback configuration, with an air vent (not shown), to help prime pump 001 upon start-up, or more particularly, to re-prime the operating system, under pressure, if the prime is lost, as would happen if the source hose were removed from the liquid source container. In valve V7, source liquid 139 may either continue through source check valve V0 or be diverted to mixing can (volatile mixer) 123 and then diverted out as waste 143, as required. As source liquid 139 continues through exchanger 400 it warms to temperature T3, feeds around steam pump motor 150 via cooling loop 145 which surrounds stator 38A, and emerges at temperature T4. At this point source liquid 139 may be directed to evaporator/condenser sump 500, where it is at temperature T2, or source liquid 139 may be directed to liquid ring pump source fill valve V4, depending on the needs of the system for either restoring liquid to sump 500 or filling liquid ring pump 100. Upon entering sump 500 of evaporator/condenser 600, source liquid 139 is heated by heater 900 to boiling through heating tubes 149 until the liquid evaporates. Condenser 200 or evaporator/condenser 600 has Vapor rises to evaporator/condenser head chamber 300, whereupon the vapor passes through mesh 305 for eliminating mist in the vapor and continues into liquid ring pump 100 through inlet port 7. Liquid entrained in mesh 305 returns to the bottom of evaporator head 300, where its level is controlled by a blowdown level sensor L1 in blowdown control chamber 301 (see below).

From exchanger 400, the source liquid 139 continues in a cooling loop about motor 150, and then continues into core evaporator/condenser 600 wherein condenser 200 has a top core plate 48A and a bottom core plate 50A. Within core evaporator/condenser 600 may be multiple parallel tubes 149, typically made of copper-nickel alloy or other heat-transferable material, having head manifold openings 156 to allow core tubes 149 to communicate with head 300, and having sump manifold openings 155 to allow tubes 149 to communicate with sump 500. Core tubes 149 are the heat exchange surface through which the latent heat of evaporation is transferred in the evaporation/condensation cycle. The rate at which heat can be exchanged between the condensing steam, outside the tubes, and evaporating water, inside the tubes, is a key factor in output rate and efficiency. If the thermal resistance of the heat exchange surface is low, better heat exchange occurs and output volume and efficiency increases. Any air impinged against the condensing surface becomes an insulator that inhibits transfer of heat. To prevent this, any air present in the system is continuously vented out of the system, via, for example, vent 011, volatile mixer 123, or other venting outlets as required. Steam 121 from the evaporator section 600B of evaporator/condenser 600 may also feed into a volatile mixer 123 where volatile gases may be released from the system.

Heat transfer may also be adversely affected when water forms sheets as it condenses and coats the exterior of the tubes as it runs down to the bottom of the condenser chamber, a phenomenon known as "skinning." The extent to which the water "skins" on the surface of the condenser is determined largely by the surface energy (hydrophobicity) of the heat transfer surface. In an embodiment of the present invention, hydrophobic coatings may be applied to cause condensing water to bead-up rather than skin, thereby leaving more of the heat transfer surface exposed for efficient heat transfer. Examples of suitable hydrophobic coatings include a coating manufactured by Ocular Technologies, or any other hydrophobic coating that imposes little to no thermal resistance itself.

The system maintains a constant blowdown liquid flow to prevent scaling and other accumulation in the system. Liquid level 119 in head chamber 300 is adjusted through a feedback control loop using level sensor L1, valve V1, and source pump 001, to maintain proper liquid flow through the blowdown stream 143. The three-way source pump fill valve V7 is set to pump liquid through source check valve V0 into sump 500, which causes liquid level 119 in head chamber 300 to rise. As liquid level 119 rises in head chamber 300, liquid overflows past a dam-like barrier 302 into blowdown control chamber 301 containing blowdown level sensor L1. As required, blowdown valve V1 is controlled to allow liquid flow from blowdown control chamber 301 through heat exchanger 400, to extract heat and cool blowdown stream 143, and flow out valve V1, through volatile mixer 123 allowing cooling of hot gases and steam 121 from the evaporator section 600B, and then completing the blowdown stream, out to waste 143A.

The evaporation/condensation level between liquid sump 500 and vapor in head 300 is maintained/adjusted through a feedback control loop using level sensor L2, vent check valve V2, and vent 011, to maintain proper liquid/vapor ratios in evaporator/condenser 600. Liquid from sump 500 flows over barrier 703 into evaporator level sensor chamber 701 containing evaporator level sensor L2. As needed, vapor either flows over barrier 702 into head 300, or is vented via vent line 011 by vent check valve V2 or directed to volatile mixer 123 via condenser vent valve V8.

The system also maintains proper product flow. Product level 502 builds up in condenser chamber 600C, and enters into product control chamber 501, where product level sensor L2 is housed. Using a feedback control loop with level sensor L2 and valve V2, product stream 141 is controlled to flow from product control chamber 501 through heat exchanger 400, to extract heat and cool product stream 141, then through valve V2 and on out to product divert valve V6, where product is removed as product outlet stream 141A, or as diverted product outlet stream 141B.

The system may preferably be configured to maintain proper liquid ring pump water level by the use of a liquid recovery system to replenish liquid loss. There are several ways that liquid from the ring pump may be depleted during system operation, including leakage into lower reservoir 30 (not shown in FIG. 14C), expulsion through exhaust port 6, and evaporation. The leakage and expulsion losses can be large depending on operational parameters, such as the speed of rotation and liquid ring pump throughput. These leakage and expulsion losses could require total replacement of the fluid in the pump several times per hour. The evaporation loss is typically small.

Thus, the liquid level in the ring pump may be maintained by adding additional source water, product water, or preferably by re-circulating liquid water lost from the liquid ring pump for improved system efficiency. In one preferred embodiment shown in FIG. 14C, the liquid level in liquid ring pump 100 is maintained/adjusted through a feedback control loop using level sensor L3, liquid ring pump drain valve V9, and mist eliminator drain 161 which drains liquid entrapped in mesh 165 of mist eliminator 158 back into liquid ring pump 100 via intake port 7. Liquid may be drained from liquid ring pump 100 via liquid ring pump drain valve V9 as needed or fed back into liquid ring pump via liquid ring pump drain valve V9. In addition, product may be diverted from product level sensor chamber 501 containing product level sensor L3 and fed through product fill valve V5 back into liquid ring pump 100 via intake port 7.

In another preferred embodiment, the liquid level in the ring pump is primarily maintained by re-circulation of the liquid accumulated in lower reservoir 30 (shown in FIG. 14B). Liquid can accumulate in lower reservoir 30 from leakage from the liquid ring pump and from fluid expelled from mist eliminator drain 161, captured in mist eliminator 158 and pumped through intake 7 back into liquid ring pump 100. Alternatively, fluid expelled from mist eliminator drain 161 and captured in mist eliminator 158 can be returned back to lower reservoir 30 (shown in FIG. 14B but not 14C). Fluid accumulated in lower reservoir 30 can be re-circulated by one of several pumping mechanisms. One preferred method is to use a siphon pump 32 (described above) as shown in FIGS. 10 and 12C.

A minimum depth of water is preferably maintained in the lower reservoir for the siphon pump 32 to perform properly. In one preferred embodiment, liquid ring pump control chamber 101, which houses liquid ring pump level sensor L3 can be used to control the liquid ring pump level and control the level of water in the lower reservoir 30, as shown in FIGS. 14A and 14C. Liquid ring pump control chamber 101 is fluidly connected to liquid ring pump 100 and lower reservoir 30. Liquid ring pump 100 is also connected to liquid ring pump drain valve V9, which opens when it is required to drain liquid from liquid ring pump 100 into blowdown stream 143.

If re-circulated water from lower reservoir 30 is not primarily used to maintain the fluid level in the liquid ring pump, then either cold source water or product water could to be used. In the event source water were used, the introduction of cold water (which could be approximately 85 degrees C. colder than system temperature) to the liquid ring pump may require use of a pre-heater. Alternatively, the use of product water can be used to maintain the fluid level in the liquid ring pump 100, as shown in FIG. 14C. At startup, the initial fluid level for the liquid ring pump is preferably supplied from source water.

As discussed in relationship to FIGS. 14A and 14C, fluid control is achieved by using level sensors and variable flow valves in a feedback configuration. Optimal operation of the still requires total fluid flow in to closely match total fluid flow out. Maintaining fluid levels in the still at near constant levels accomplishes this requirement. In a particular embodiment, the sensors are capacitive level sensors, a particularly robust sensor for measuring fluid levels. Capacitive level sensors have no moving parts and are insensitive to fouling, and manufacture is simple and inexpensive. Opening of a variable flow valve is controlled by the level of liquid measured by the capacitive level sensor, whereby the fluid level is adjusted at the level sensor location. A rising fluid level causes the valve to open more, increasing flow out of the sensor volume. Conversely, a falling fluid level causes the valve to close more, decreasing flow out of the sensor volume.

Flow rate through the variable flow control valves and from the input pump can be determined using an in-situ calibration technique. The level sensors and associated level sensor volume can be used to determine the fill or empty rate of the sensor volume. By appropriately configuring the control valves, the flow rate calibration of each valve and also of the source pump can be determined. For example, one embodiment employs a self-calibrating level sensor, which has a built-in non-constant geometry so that discontinuity can be detected using a constant (or nearly constant) rate fill. With prior knowledge of the expected geometry, the fill rate may not need to be precisely controlled. Examples of a typical level sensor having a constant geometry and a self-calibrating level sensor with a non-constant geometry wherein a "bell-shaped" geometry at the top of the level sensor adds volume. Knowing the distance from a volume-displacement feature at the bottom of the level sensor to the start of the non-constant geometry area allows one to determine which sensor readings belong to which feature and this allows one to calibrate the input signal to those points during sensor fill.

In a particular embodiment of the invention, a valve block (not shown) may be utilized to consolidate all control valves for the system into a single part, which may be integrated with the fluid flow manifold. A control system comprising a sensor for total dissolved solids and blowdown stream may also be incorporated, as well as a float valve or other device for controlling the height/level of liquid in the head.

As shown in FIGS. 14A and 14C, steam 21 and 121, respectively, also flows from head 300 to liquid ring pump 100, and if needed, there is a relief valve V10 for venting pressure. In addition, there are steam outlets 57 and 157 for diverting steam to condenser 200, a hot product line 141 from condenser 200 leading through exchanger 400, which also allows for collection of hot purified condensed product 502, and a line (not shown) for diverting hot product to compressor 100 to allow adjustment of water level to keep it constant. There may also be a drain line (not shown), for when the system is shut down.

Further, there may be a heater 900 with heating element 60 for heating cold liquid to boiling at start-up, and for maintaining sufficient heat during operation of the still to continuously convert liquid to steam. In one embodiment of the invention, the distillation system may operate at steady-state without thermal input from the heater 900 after system start up. Alternatively, a second heater (not shown) may be used to maintain sufficient heat during operation; the heater may run continuously, in a pulsed mode, or be controlled by a controller.

Figure 15:
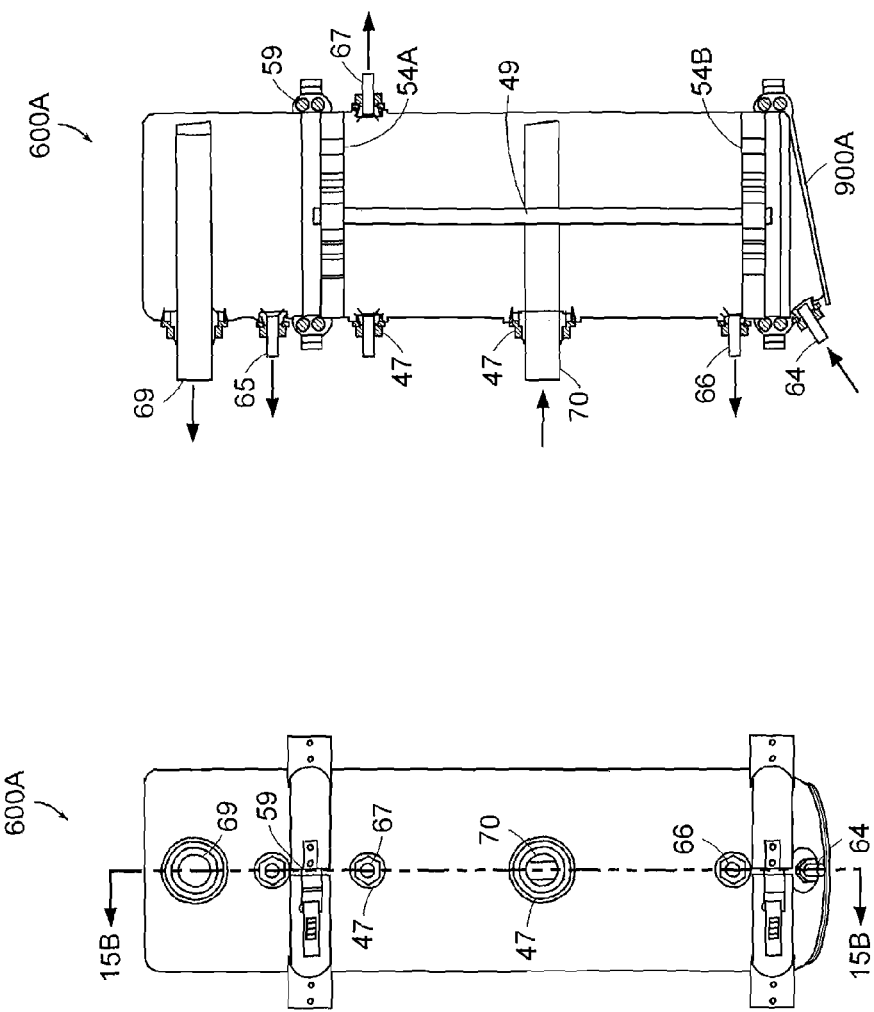
FIG. 15 shows an alternative embodiment of an evaporator/condenser having elastomer tube and shell seals.

In one particular embodiment, evaporator/condenser 600 is evaporator/condenser 600A having elastomer tube and shell seals 54A and 54B for core tubes 49, as shown in FIG. 15, replacing end plates 48 and 50, respectively, of FIG. 14C. Such elastomer tube and shell seals are exemplified in U.S. Pat. No. 4,520,868, which is hereby incorporated by reference herein. Tool-less clamp-on seals 59 external to evaporator/condenser 600A allow easy access for cleaning and repair, and replacement of core tubes 49, if needed. Externally removable fittings 47 may be used to couple fluid condenser steam inlet port 70, liquid product outlet port 66, evaporator steam outlet port 69, blowdown stream outlet port 65, liquid input port 64, and volatile port 67 to evaporator/condenser 600A. In this particular embodiment, a thick film heater 900A may be used to heat liquid in the sump, replacing heater 900 and heating element 60 (see FIG. 14C).

Figure 16B:
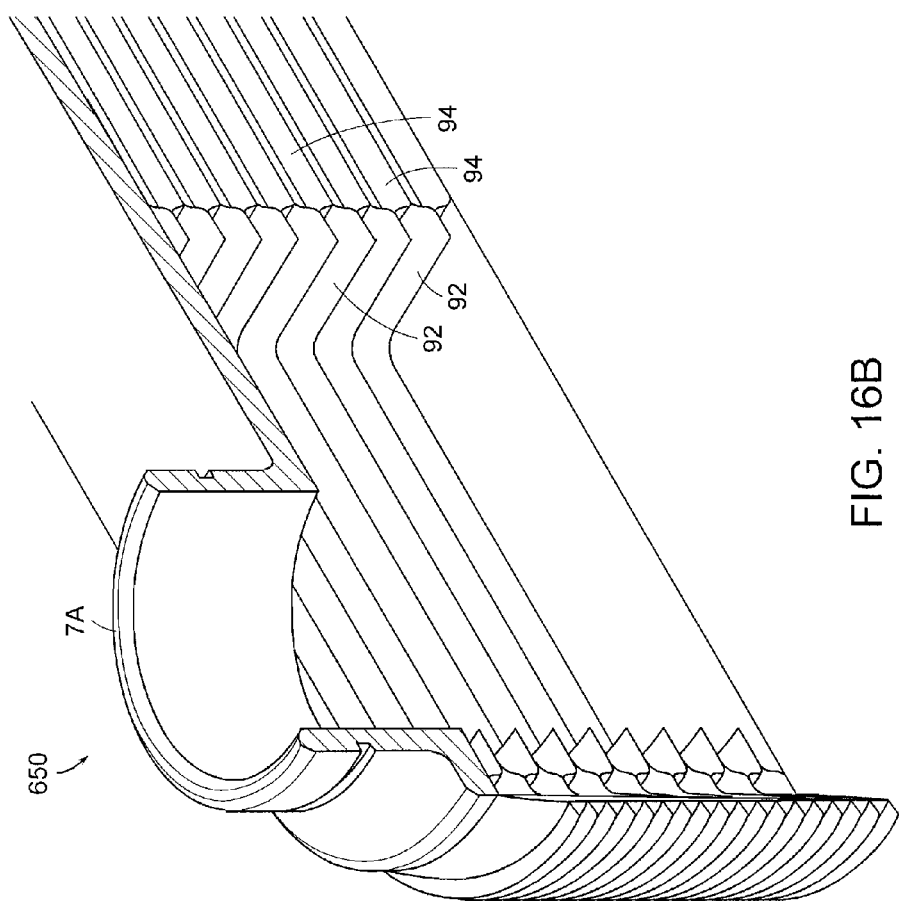
FIG. 16B is a detail of a cross-section of an evaporator/condenser core section in accordance with FIG. 16A, showing how the ribs effectively partition the steam/evaporation from the liquid/condensation layers.

In yet another particular embodiment in accordance with the invention there may be an evaporator/condenser 650, as shown in FIGS. 16A and 16B, in place of core 600. As seen in FIG. 16A, evaporator/condenser 650 is a flat evaporator/condenser and contains multiple parallel core layers 92 and 94, typically made of copper-nickel alloy or other heat-transferable material, with rib sections 90 creating channels 95 and 97 for directing steam and condensed liquid flow. Steam intake 7A and product exit 6A manifolds (as well as dirty intake and volatile exit manifolds, not shown) connect via a fluid interface to liquid ring pump/compressor 100. Bolts 88 secure core evaporator/condenser 650 to brackets of external housing 25. In operation, every alternating horizontal (as shown in FIGS. 16A and 16B) row 92 and 94 comprises evaporator channels 95 and condenser channels 97, such that the two functions never overlap on any given layer. FIG. 16B, a detail of FIG. 16A, shows more clearly how the combined condenser/evaporator manifolding works. As indicated, rows 92 do not interact with rows 94, they are closed off to each other, thereby separating the functions of evaporation and condensation in the horizontal core layers.

Figure 17A:
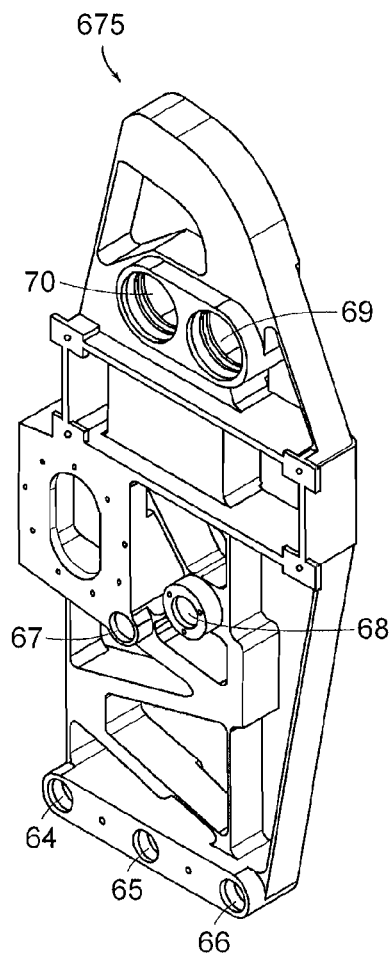
FIG. 17A is a view of one face of the pump side of a fluid distribution manifold.
Figure 17B:
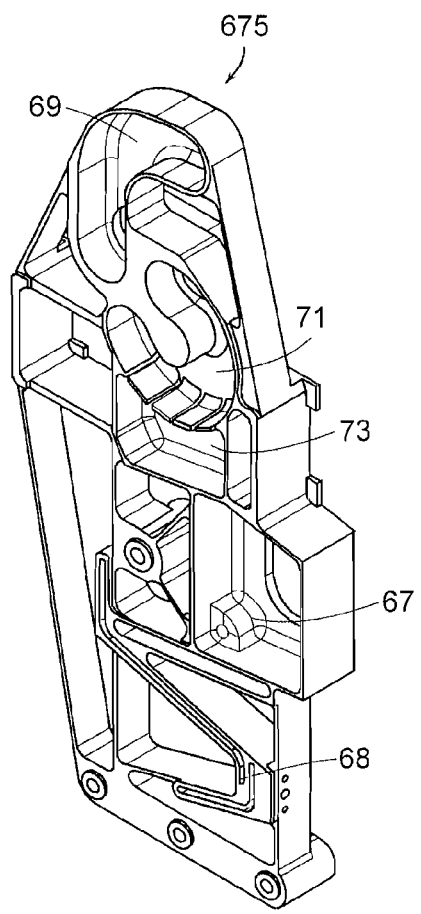
FIG. 17B is a view of a second face of the pump side of a fluid distribution manifold.

In addition, another particular embodiment in accordance with the invention may include fluid distribution manifold 675, shown in FIGS. 17A through 17D. FIG. 17A shows one face of the pump side of one particular embodiment of a fluid distribution manifold 675. Input, in the form of raw source feed, flows through port 64, and blowdown stream (output) flows through port 65. Additional output in the form of product flows through port 66, while port/chamber 67 provides the vent for volatiles (output) and port 68 provides the drain (output) for the liquid ring pump. FIG. 17B shows the other face of the pump side of the same particular embodiment of fluid distribution manifold 675. Port/chamber 67, for output of volatiles, is apparent, as is the drain 68 for a liquid ring pump. In this view of this particular embodiment, a condenser steam mist eliminator chamber 71 is visible, as is a mist collector and drain area 73.

Figure 17C:
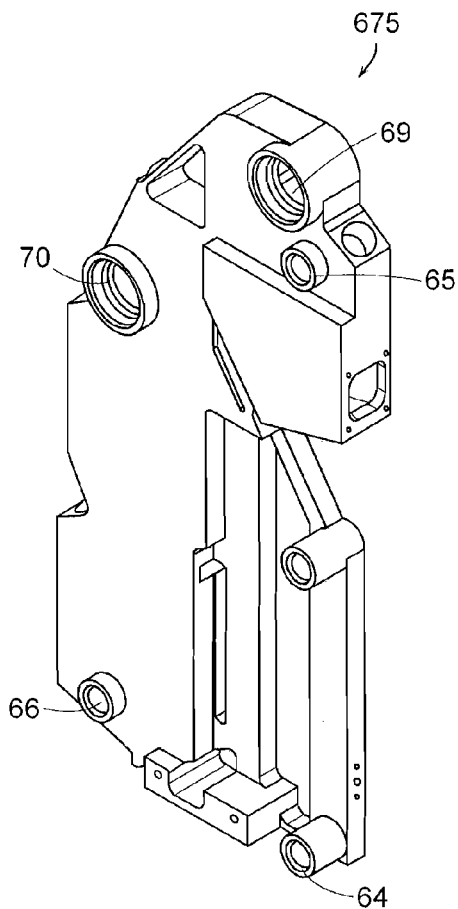
FIG. 17C is a view of one face of the evaporator/condenser side of a fluid distribution manifold.

FIG. 17C shows one face of the evaporator/condenser side of the same particular embodiment of fluid distribution manifold 675. Raw source feed port 64, as well as blowdown passage ports 65 and product passage ports 66, are readily visible in this view. In addition, evaporator steam passage port 69 and condenser steam passage port 70 can be seen.

Figure 17D:
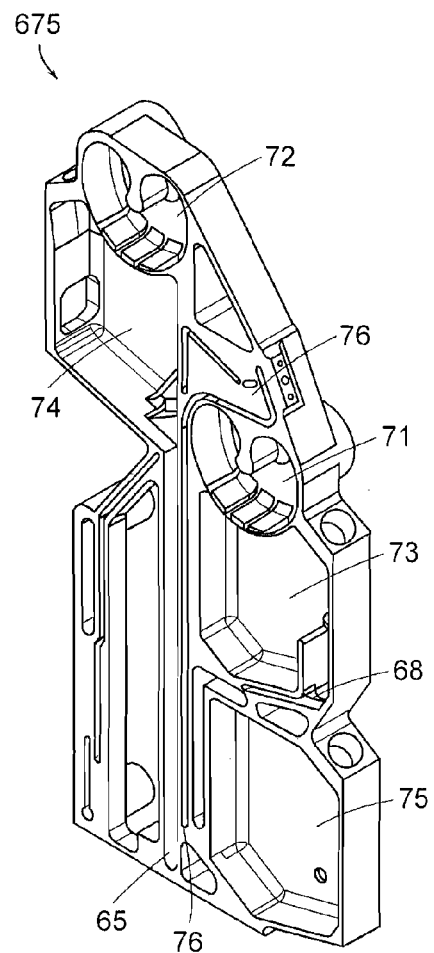
FIG. 17D is a view of a second face of the evaporator/condenser side of a fluid distribution manifold.

Finally, FIG. 17D shows the other face of the evaporator/condenser side of the same particular embodiment of fluid distribution manifold 675. Again blowdown passage port 65 is visible, as is liquid ring pump drain port 68, a second condenser steam mist eliminator 71, evaporator steam mist eliminator 72, and mist collector and drain area 73. Also, a sump level control chamber can be seen in this view, along with a product level control chamber 75 and a liquid ring pump supply feed 76.

In such a particular embodiment, a fluid distribution manifold 675 is capable of eliminating most plumbing in a liquid purification system, advantageously incorporating various functionality in one unit, including flow regulation, mist removal, and pressure regulation, thereby simplifying manufacture and significantly reducing overall component parts. The core plates and manifolding may be made of, for example, plastic, metal, or ceramic plates, or any other non-corrosive material capable of withstanding high temperature and pressure. Methods of manufacture for the core plates and manifolding include brazing and over-molding.

FIGS. 18A and 18B show couplers that allow fluid interfacing throughout the system in a particular embodiment. For example, there may be a floating fluid interface between exchanger 400 and intake/exhaust ports 7 and 6 seen in FIG. 12A. FIG. 18A shows such a fitting 61 that can be welded to heat exchanger ports (not shown), wherein fitting 61 connects to fluid interface 62 which is in turn in communication with the fluid distribution manifold. FIG. 18A shows a sectional view across line A-A (see FIG. 18B). Fitting 61 has the ability to float to compensate for shifts in registration, possibly caused by temperature or manufacturing variations. Sealing is accomplished by o-ring 63. As can be seen in the view depicted in FIG. 18B, o-ring seal 63, upon rotation of line A-A 90° about a central axis, fitting 61 and fluid interface 62 lock together to make a fluid interface connection.

For either core 600 having core tubes 49, or core 650 having parallel core layers 92 and 94, the geometry of the core tubing or layer channels may be cylindrical, square, rectangular, and the like. In still another specific embodiment in accordance with the present invention, core configurations may be selected to increase the net phase change rate of the liquid, and may include core inserts, which are more fully detailed in U.S. patent application Ser. No. 10/636,303 filed Aug. 7, 2003 entitled "Method and Apparatus for Phase Change Enhancement," the contents of which are hereby incorporated by reference herein.

Scale control may be achieved using chemical treatments such as with polyphosphates or polyaspartates, via plasma coating of appropriate components through the use of galvanic or electrochemical processes, by treatment with acids such as an organic acid, or through the use of electric and/or magnetic fields.

Other particular embodiments of the present invention may advantageously improve energy efficiency of the overall system by including, for example, highly efficient heat exchangers 400A and 400B as shown in FIGS. 19A and 19B, wherein such heat exchangers capitalize on available systemic and heat sources. In one particular embodiment, heat from at least one of a plurality of sources passes through a multi-line heat exchanger 400A such as depicted in FIG. 19A, wherein a series of two-channel heat exchangers such as 38, 40, 42, and 44 are plumbed to produce a multi-line effect. Note that in the particular multi-line heat exchanger embodiment shown in FIG. 19A, the flow of cold intake 39 passes through all heat exchanger units 38, 40, 42, and 44; one heat source, for example hot product 41, flows through heat exchanger units 38 and 42; and another heat source, for example hot blowdown stream 43, flows through heat exchange units 40 and 44. In this way, multiple heat sources can be used to exchange with the cold intake flow 39.

Alternatively, a single multi-channel heat exchanger 400B such as depicted in FIG. 19B may be used. In this particular embodiment, cold intake 39, and heat sources such as hot product 41 and hot blowdown stream 43, for example, flow through exchanger 400B simultaneously, but in opposite directions, thereby enabling heat exchange with cold intake 39 from both heat sources 41 and 43 within a single heat exchanger 400B. Heat sources for heat exchanger 400 include product stream 41 and blowdown stream 43. Another possible heat source for the heat exchanger 400 is radiative heat produced by steam pump drive motor 150, such as by the motor windings, when the embodiment utilizes an external drive motor.

As discussed above, tube bundle heat exchanger technology detailed in U.S. Pat. No. 4,520,868 may be utilized for the heat exchangers in accordance with the present invention, wherein elastomeric end plates may be used to seal the tubes in a fixed orientation, in place of metal or otherwise inelastic end plates soldered or brazed to the heat exchanger tubes.

As discussed above with respect to FIGS. 1A and 1B, the power source 800 may be, for example, an IC generator or a Stirling engine generator. In one embodiment, the radiative heat produced by the generator may be used to heat the intake stream, wherein the radiative heat produced by the generator is directed to heat exchanger 400. Such a heat exchanger would optimally be positioned at the hot side of a three-channel heat exchanger, such as shown in FIG. 19B, where source liquid 39 enters evaporator 600. FIG. 14A or FIG. 4 (element 2506) also show such a heat exchanger that could be utilized with exhaust heat in one of the channels.

If an external drive shaft motor is utilized, the overall system may employ an additional "cold" fluid pump of the gear-, diaphragm-, or "ram-" pump variety inline with cold intake line. In a particular embodiment, such a pump will be driven off the same rotor drive shaft as the liquid ring pump. Other particular embodiments of the present invention may also be envisioned without a fluid intake pump, whereby a gravity-feed mechanism or creation of a vacuum is used to drive the fluid through the system.

In another particular embodiment, sump 500 may employ a pre-heater or supplemental heater, wherein a switch and temperature sensor with relay monitor is employed to regulate heat input and temperature of the water in the sump. Other fluid reservoirs may also contain temperature sensors. For example, a temperature sensor in the sump could be used to determine optimum conditions for the initiation of distillation as the still heats up. Temperature sensors may also be employed to detect changes in water temperature, thereby allowing adjustment of fluid flow rates to maintain overall still production.

Figure 20:
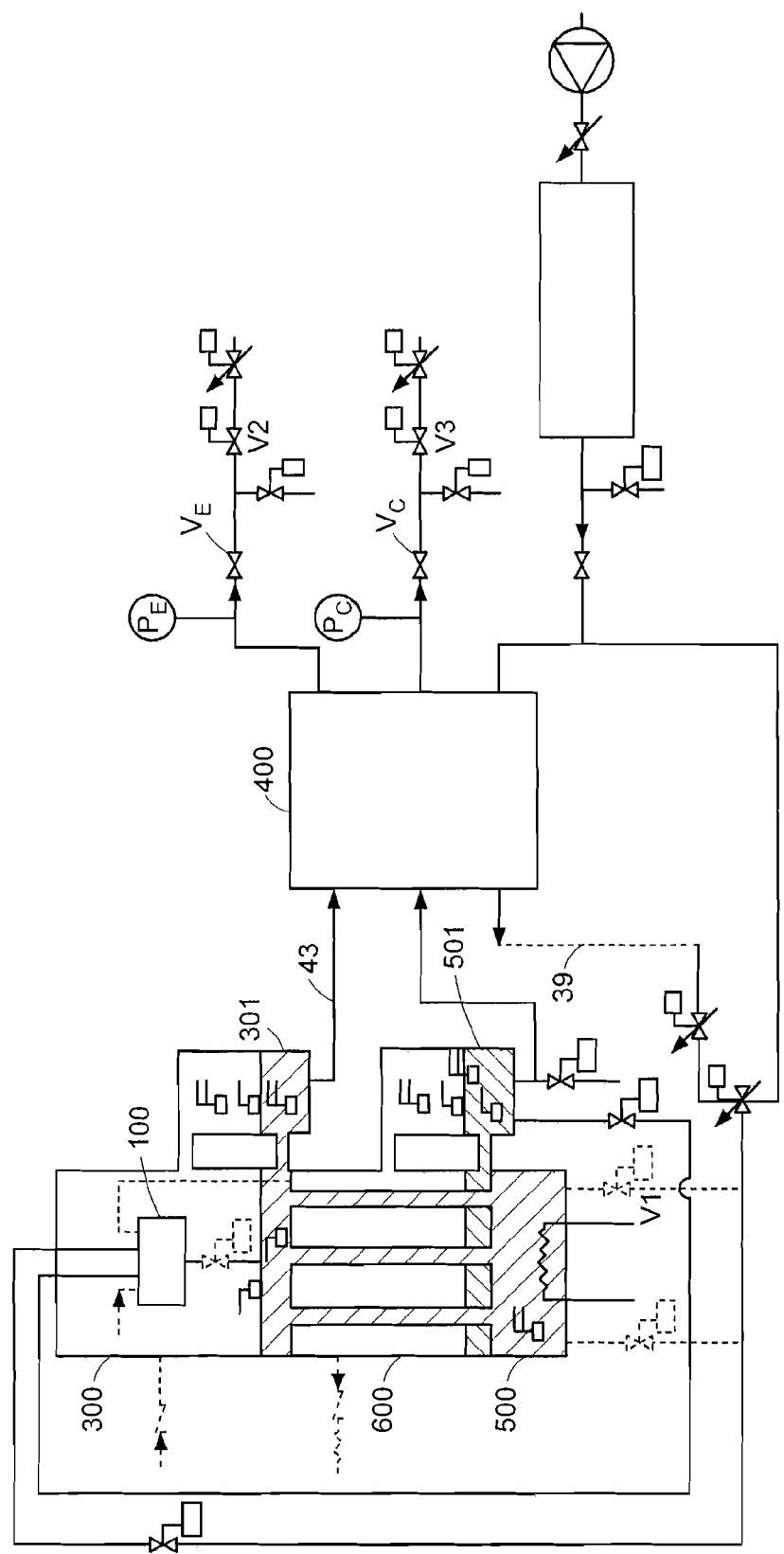
FIG. 20 is a schematic overview of the system showing pressure measurement of the system using a cold sensor.

In one embodiment, shown in FIG. 20, the evaporator and condenser pressures are measured, to assess overall system performance and/or provide data to a control system. To avoid the use of expensive sensors that would be required to withstand the elevated temperatures of condenser/evaporator 600, pressure sensors $P_E$ and $P_C$ are mounted on fluid lines between the cold side of heat exchanger 400 and corresponding control valves $V_E$ and $V_C$. To avoid measuring a pressure less than the actual pressure of the system, which would occur when fluid is flowing for pressure sensors located at this position, the control valve would be closed momentarily to stop flow. During the "no-flow" period, pressure will be constant from the control valve back to the evaporator or condenser, enabling accurate measurement of the system pressure. No adverse effects on still performance will occur from these short "no-flow" periods.

Figure 21A:
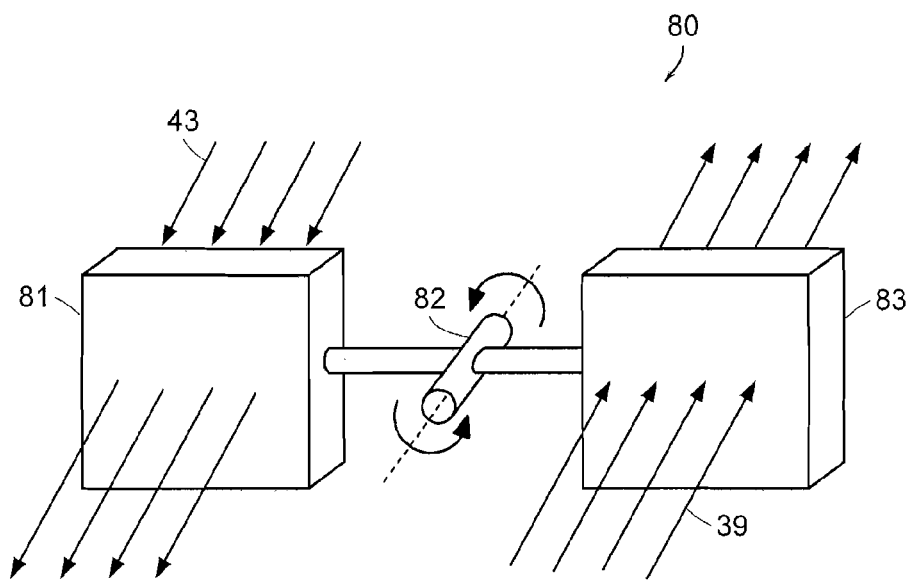
FIG. 21A shows a view of a flip-filter with the intake stream and blowdown stream flowing through filter units, each filter unit rotating around a pivot joint about a center axis.

Still another embodiment of the present invention is designed to increase the purity of the final purified liquid product by incorporating a filtering mechanism within intake 00, as shown in FIG. 21A. A multi unit flip-filter 80, having a pivot joint 82 joining at least two filter units 81 and 83, is situated within a filter housing 80A which directs liquid through filter units 81 and 83 and facilitates rotation of filter units 81 and 83 about central pivot joint 82. As shown, blowdown stream 43 passes through flip-filter unit 81, while intake liquid stream 39 simultaneously flows from intake 00 through flip-filter unit 83 en route to purification. After some interval a flip-filter switch (not shown), rotates flip-filter 80 around its central axis, shown by the dotted line, at flip-filter pivot joint 82, such that filter unit 83, now fouled with contaminates filtered from dirty intake liquid, is backwashed by blowdown stream 43, and filter unit 81 becomes the filter unit which filters intake liquid stream 39. In such an embodiment, o-ring gaskets 81A and 83A may be utilized as seals between filter units 81 and 83 and the liquid flow routes of blow-down stream 43 and intake liquid stream 39, respectively.

Figures 1, 21B:
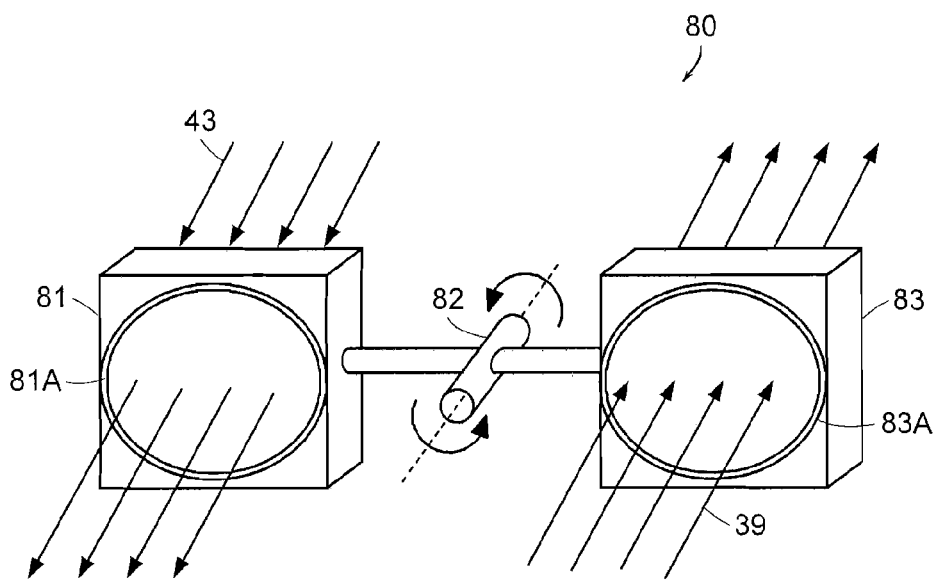
FIG. 21B shows flip filter housings and an alternative embodiment of a multi-unit flip filter.

In another embodiment, the multi-unit flip filter may be a multi-sected circular filter 80B, shown schematically in FIG. 21B. Multi unit flip-filter 80B, having a pivot point 82B about which multiple flip-filter units such as 81B and 83B pivot, may also be situated within filter housing 80C that directs liquid flow through individual filter units 81B and 83B and facilitates rotation of filter 80B about pivot point 82B. As shown, blowdown stream 43 passing through one flip-filter unit 81B, while intake liquid stream 39 simultaneously flows from intake 00 through flip-filter unit 83B en route to purification. As in FIG. 21B, a flip-filter switch (not shown), rotates flip-filter 80B around its central axis, shown by the dotted line, at flip-filter pivot point 82B, such that filter unit 83B, now fouled with contaminates filtered from dirty intake liquid, is backwashed by blowdown stream 43, and filter unit 81B becomes the filter unit which filters intake liquid stream 39. A series of seals, as indicated by 81B-1 and 83B-1, are utilized between individual filter units 81B and 83B, to partition blowdown stream 43 flowing through one filter section, from intake liquid stream 39 flowing through another filter section.

Alternatively, a manual valve 85, such as shown schematically in FIG. 22, could be employed to manually change the direction of water flow. Such a valve allows use of, for example, blowdown stream 43 to continuously clean one unit of each flip-filter, and with a single operation effectively switches which unit is being filtered and which unit is being back-washed, thereby back-washing filter units 81 or 83 without the need to actually flip filter 80 itself. As can be seen in FIG. 22, in one particular embodiment when valve 85 is in position A, filter unit 81 is filtering intake liquid 39, and filter unit 83 is being back-washed with blowdown stream 43. Upon switching valve 85 to position B, filter unit 81 is now being backwashed by blowdown stream 43, and filter unit 83 is now filtering input liquid 39.

In another particular embodiment, not shown, there may be an external system including a holding tank with a pump for waste discharge, if circumstances require.

The particular embodiments described above generally operate above atmospheric pressure, typically around 10 psig. Such a system advantageously provides higher steam density at the higher pressure, thereby allowing more steam to be pumped through a positive displacement pump than at lower pressure. The resulting higher throughput provides overall improved system efficiency. Further, the higher throughput and higher system pressure reduces the power needed for compressor 100, and eliminates the need for two additional pumps—one for pumping condensed product 41 and another for pumping blowdown stream 43. Overall construction is simplified, as many shapes withstand internal pressure better than external pressure. Importantly, operating at super-atmospheric pressure reduces the impact of minor leaks on the overall efficiency and performance. Non-condensable gases such as air inhibit the condensation process, and would be magnified at sub-atmospheric pressure, where minor leaks would serve to suck in air, something which will not occur in a system operating at super-atmospheric pressure.

Figure 23A:
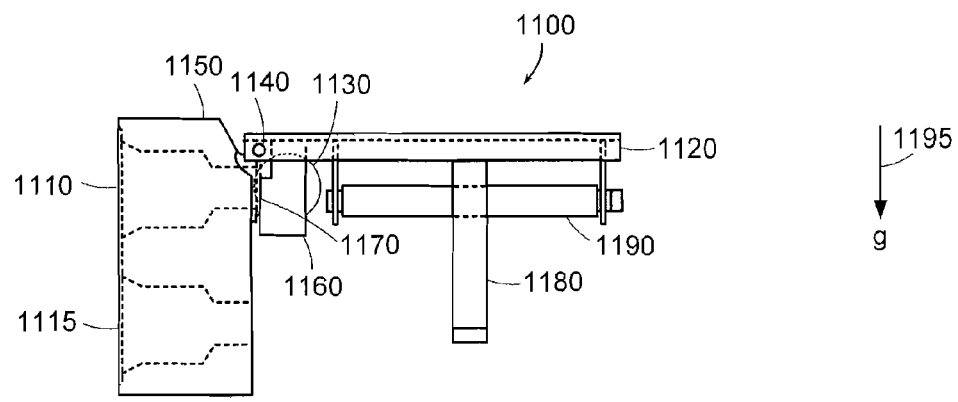
FIG. 23A is side view of a backpressure regulator in accord with an embodiment of the invention.
Figure 23B:
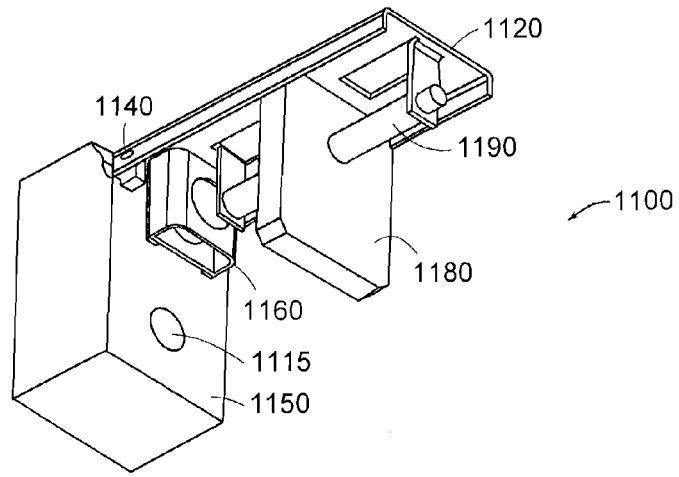
FIG. 23B is a diagonal view of the backpressure regulator shown in FIG. 23A.

When embodiments of the invention operate above atmospheric pressure, the use of a novel backpressure regulation may serve to control the operating pressure of the system. FIGS. 23A and 23B depict views of a backpressure regulator consistent with an embodiment of the invention. The backpressure regulator 1100 has a vessel 1150 containing an orifice 1110. One side of the orifice is connected to a pressurized conduit of a system (e.g., the outlet of a compressor in a vapor compression distillation system) which may be exposed to the fluctuating elevated pressure. The other side of the orifice terminates in a port 1170. The port 1170 is covered by a movable stop 1130, in the shape of a ball. The stop 1130 is retained to an arm 1120 by means of a retainer 1160 at a fixed distance from a pivot pin 1140. The arm 1120 is attached by a hinge via the pivot pin 1140 to a point with a fixed relation to the orifice port 1170. The arm 1120 includes a counter mass 1180 suspended from the arm that is movable along an axis 1190 such that the distance between the counter mass 1180 and the pivot pin 1140 may be varied. In the embodiment shown in FIG. 23A, the axial direction of the orifice 1110 is perpendicular to the direction of the gravitational vector 1195. The backpressure regulator may also include a housing, which prevents foreign matter from entering the regulator and interfering with the function of the internal components.

In operating the embodiment shown in FIGS. 23A and 23B, the arm 1120 maintains a horizontal position with respect to the direction of gravity 1195 when the pressure in the pressurized conduit is below a given set point; this arm position, in this embodiment, is known as the closed position, and corresponds to the stop 1130 covering the port 1170. When the pressure in the conduit exceeds the set point, a force acts on the stop 1130, which results in a torque acting around the pivot pin 1140. The torque acts to rotate the arm 1120 around the pivot pin 1140 in a counter-clockwise direction, causing the arm to move away from its closed position and exposing the port 1170, which allows fluids to escape from the orifice 1110. When the pressure in the conduit is relieved below the set point, the force of gas is no longer sufficient to keep the arm 1120 away from its closed position; thus, the arm 1120 returns to the closed position, and the stop 1130 covers the port 1170.

In the embodiment of FIGS. 23A and 23B, the arm 1120 acts as a lever in creating adjustable moments and serves to multiply the force applied by the counter mass 1180 through the stop 1130 to the port 1170. This force multiplication reduces the weight needed to close the orifice 1110 as opposed to a design where the stop 1130 alone acts vertically on top of the orifice 1110, as in a pressure cooker. Thus a large port size, to promote expedited venting from a pressurized conduit, may be covered by a relatively lightweight, large-sized stop, the counter mass acting to adjust the desired set point; less design effort may be expended in choosing specific port sizes and stop properties. The addition of an axis 1190 for adjusting the position of the counter mass 1180, in the present embodiment, allows for changes in the multiplier ratio. As the counter mass 1180 is moved to a position closer to the pivot pin 1140, the multiplier ratio is reduced, creating a lower closing force. If the counter mass 1180 is moved farther from the pivot pin 1140, the multiplier ratio is increased, hence increasing the closing force. Therefore, the position of the counter mass 1180 effectively acts to adjust the set point of the backpressure regulator.

Adjustment of the backpressure regulator set point may be useful, when the backpressure regulator is utilized in systems at higher altitudes. When the atmospheric pressure is lower, the system operating pressure is commensurately lower. As a result, the temperature of the distillation apparatus is lowered, which may adversely affect system performance. As well, such adjustment allows one to identify set points for the backpressure regulator that are desired by the end user. The use of a counter mass to apply the closing force may also lower cost of the backpressure regulator and reduce component fatigue. In a particular embodiment of the invention, the adjustable counter mass is designed to allow a range of set points with a lowest set point substantially less than or equal to 10 psig. and a highest set point substantially greater than or equal to 17 psig. Thus embodiments of the invention allow for precise system pressure regulation, unlike devices, which act simply as safety relief valves.

Figure 24A:
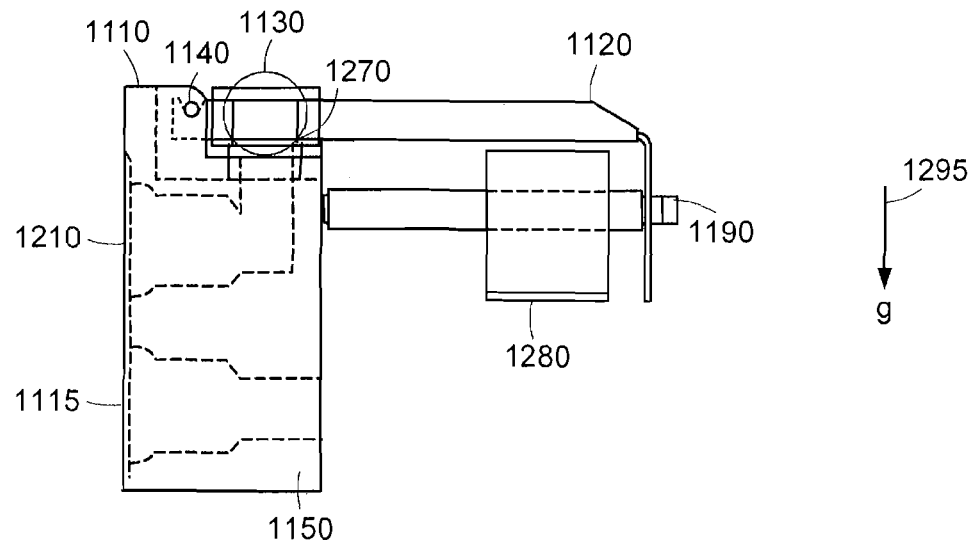
FIG. 24A is a side view of a backpressure regulator with a vertically positioned port in accord with an embodiment of the invention.
Figure 24B:
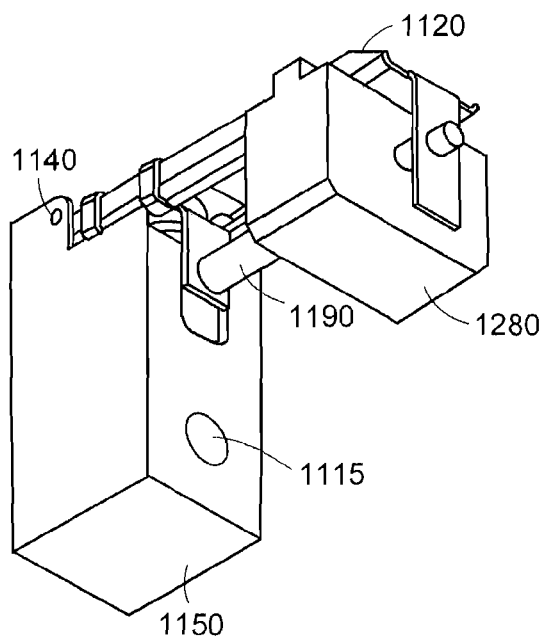
FIG. 24B is a diagonal view of the backpressure regulator shown in FIG. 24A.

In another embodiment of the invention shown in FIGS. 24A and 24B, the orifice 1210 is configured such that the port 1270 is oriented vertically with respect to the direction of gravity 1295. Thus other embodiments of the invention may accommodate any orifice orientation while maintaining the use of an adjustable counter mass.

Figure 25:
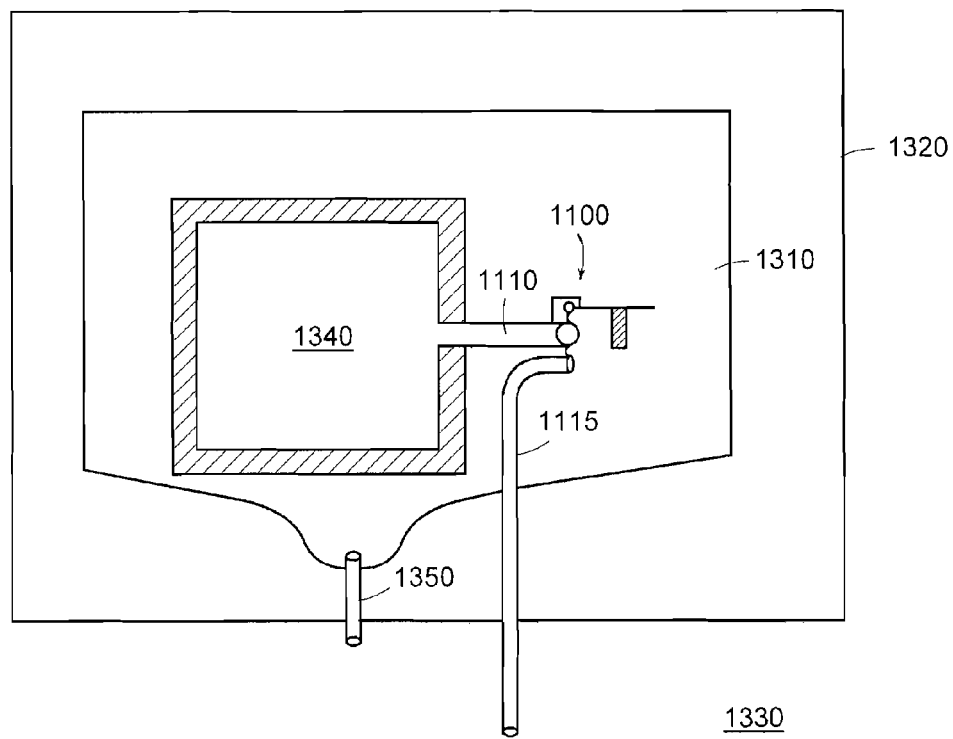
FIG. 25 is a schematic of a backpressure regulator implemented into a process, consistent with an embodiment of the invention.

In an embodiment of the invention shown in FIGS. 23A, 23B, and 25, the vessel 1150 includes a drain orifice 1115. Since the backpressure regulator 1100 may operate within a bounded region 1310 of a large system 1320, the drain orifice 1115 acts as a pathway to release fluids that are purged from the pressurized conduit 1340 through orifice 1110 into the bounded region 1310. The drain orifice 1115 may connect the bounded region 1310 to another area of the larger system, or to the external environment 1330. In addition, the build-up of gases in the bounded region 1310 may result in condensation of such gases. Also, gases purged through the orifice 1110 may be entrained with droplets of liquid that may accumulate in the bounded region 1310. Thus the drain orifice 1115 may also be used to purge any build up of condensables that accumulate in the bounded region 1310; the condensables may also be released from the bounded region using a separate orifice 1350.

The backpressure regulator may be configured to allow a small leakage rate below the set point in order to purge the build up of volatile gases that act to insulate heat exchange and suppress boiling in a system; the regulator is designed, however, to allow pressure to build in the pressurized conduit despite this small leakage. In an embodiment of the invention, release of volatile components from a pressurized conduit, below the set point of the backpressure regulator, may also be achieved through a specifically-designed leak vent while the arm of the backpressure regulator is in the closed position. The leak vent is configured to allow a certain leakage rate from the port or the orifice while the pressure in the conduit is below the set point. Such leak vent may be designed by a variety of means known to those skilled in the art. Non-limiting examples include specific positioning of the stop and port to allow a small opening while the arm is in the closed position; designing the port such that a small opening, not coverable by the stop, is always exposed; specifying a particular rigid, non-compliant seal configuration between the stop and port when the arm is in the closed position; and configuring the orifice leading to the port to have a small opening to allow leakage of fluids.

In a particular embodiment of the invention directed toward the leakage of volatiles below the set point of the backpressure regulator, the port 1410 has a small notch 1420 as shown in FIG. 26A and the close-up of region C of FIG. 26A depicted in FIG. 26B. Thus, when a stop is in contact with the port 1410, when the arm of the backpressure regulator is in the closed position, a leak vent is present that allows a small leakage through notch 1420. In another particular embodiment of the invention, orifice 1510 has a small opening 1520, as depicted in FIG. 27A and blow up of region E of FIG. 27A depicted in FIG. 27B. The opening 1520 is configured such that a leak vent is present when the stop covers the port 1510 since fluids may leak through the opening 1520.

Various features of a backpressure regulator consistent with embodiments of the invention may be altered or modified. For example, stops to be used with backpressure regulators may have any shape, size, or mass consistent with desired operating conditions, such stops need not be ball-shaped as shown in some embodiments of the invention discussed herein. As well, stops of different weight but similar sizes may be utilized with the retainer to alter the set point of the regulator. Similarly, counter masses of different sizes, shapes and masses may be utilized with embodiments of the invention as long as they are accommodated by the axis and arm configurations (compare 1180 in FIGS. 23A and 23B with 1280 in FIGS. 24A and 24B); such counter masses may be attached and oriented relative to the arm by any of a variety of techniques apparent to those skilled in the art. The pivot pin placement need not be positioned as shown in FIGS. 23 and 24, but may be positioned wherever advantageous to provide the mechanical advantage required to achieve a particular pressure set point.

Embodiments of the invention may optionally utilize the drain orifice feature described earlier. Also, embodiments of the invention may not utilize the counter mass force adjustment feature, relying on the specific properties of a stop to provide the set point for the backpressure regulator.

Other embodiments of the invention may not utilize a vessel, but rely on orifices that are intrinsically part of the system. In such instances, the backpressure regulator arm may be directly attached to a portion of the system such that the arm, stop, and counter mass are appropriately oriented for the operation of the regulator.

Cassettes suitable for use in the present liquid distillation system include valve cassettes disclosed in U.S. Pat. No. 6,464,667 the entire contents of which are incorporated by reference herein. The valve cassette, which is preferably pneumatically operated by a control assembly, includes various combinations of membrane-based chambers and valves. The cassette preferably includes, along the fluid passage through the cassette, one or more membrane based valves. A first and second rigid member are in an open position with respect to each other, with a sealing member defining an aperture through which fluid communication is provided. The membrane defines the valving chamber and the second membrane-based valve is preferably resilient, so that the valving chamber may provide a supply of pressurized fluid, when the valve is closed.

In the preferred embodiment valve stations are closed on the back side of the cassette, except that each valve station includes a pair of through holes for ports. One port communicates with a selected liquid path on the back side of the cassette, the other port communicates with another selected liquid or pneumatic path on the back side of the cassette.

It is preferred that the valve be made by molding a resilient material about and to the second rigid member so as to form an aperture sealing member about the port on the complementing surface of the second rigid member, and then assembling the first and second rigid members, which are preferably molded out of a rigid material, so as to bring the complementing surfaces adjacent each other and so that the sealing member is urged against the complementing surface of the first rigid surface.

In a preferred version of the cassette, which is primarily made out of rigid material, the membrane for the membrane-based valves is disposed adjacent the housing, such that the rigid housing and the membrane define a valving chamber. One passage enters the valving chamber at a first mouth located at the end of a protrusion of the rigid housing and the valving chamber toward the membrane and the valve may prevent the flow of fluid therethrough when the membrane is forced against the first mouth, by the control unit.

Figure 53:
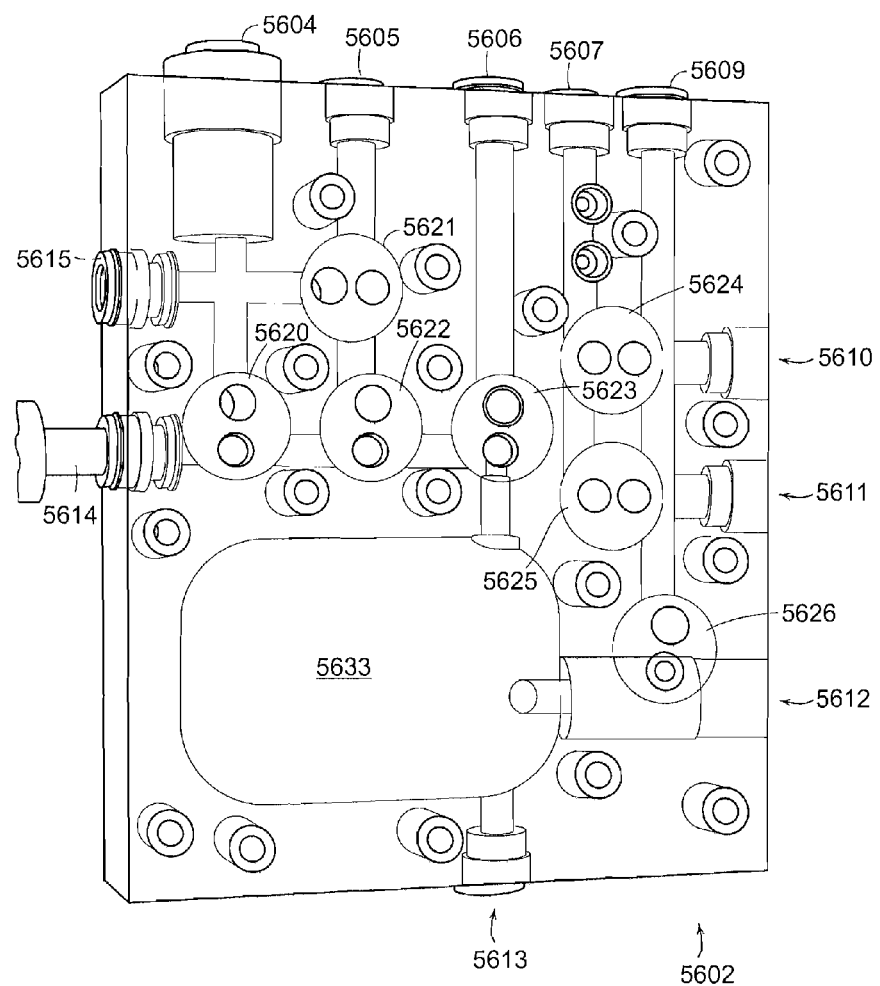
FIG. 53 shows a front view of an assembled valve cassette in accordance with an embodiment of the invention, depicting various ports and various "volcano" valves.

Embodiments described in the above references pump fluid using a valve cassette such as shown in FIG. 53, a front view of an assembled exemplary pump cassette 5602 in accordance with an embodiment of the present invention. The pump cassette 5602 is essentially a rigid core including formations (see FIG. 54) constituting the various ports 5604-5615, chamber 5633, valves 5620-5626, and fluid pathways (channels) 5750 (see FIG. 54) In this embodiment, chamber 5633 may be a pumping or a mixing chamber.

Figure 54:
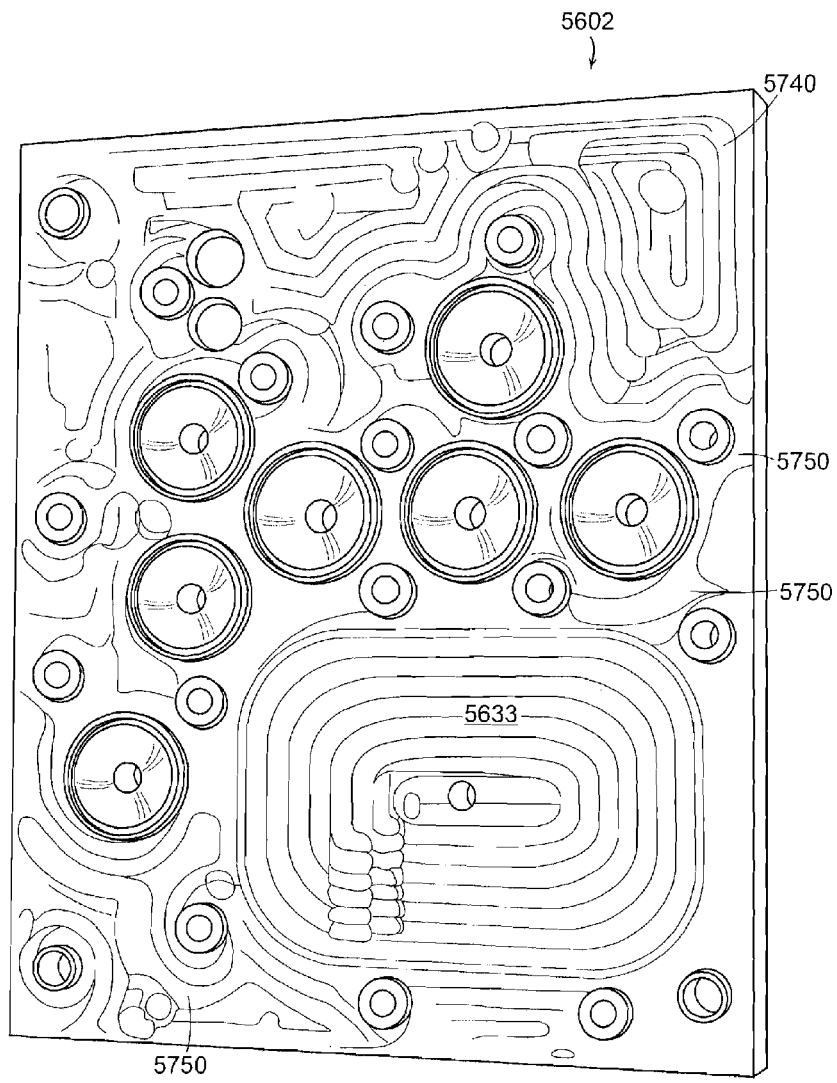
FIG. 54 shows a back view of a section of a valve cassette in accordance with a particular embodiment of the invention, wherein various sealing ribs and formations, and flow pathways/channels can be seen.
Figure 55:
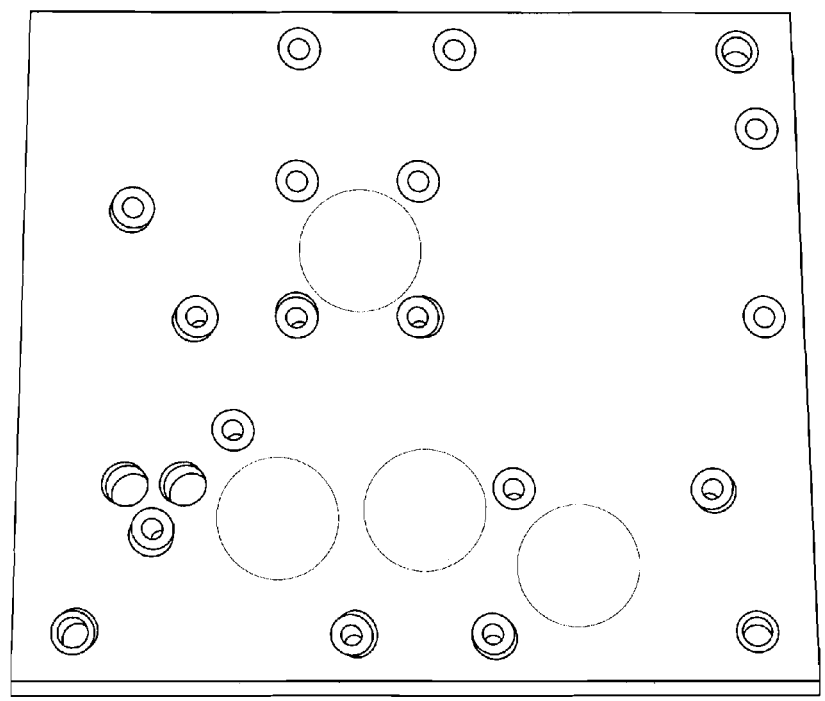
FIG. 55 shows a flexible gasket, which is captured between both sides of the valve cassette.

As can be seen in FIG. 54, fluid pathways/channels 5750 so the fluid can flow through the various ports 5604-5615, chamber 5633, and valves 5620-5626. The rigid core is covered on each side by a flexible membrane 5800 depicted in FIG. 55, which may be, without limitation, a flexible PVC sheet or a silicone membrane. The flexible membranes seal against the core of each valve and isolate the control assembly from fluids within the cassette.

The pump cassette 5602 is typically designed to interface with the control assembly in one or more directions, as needed. Pump cassette 5602 depicted in FIGS. 53 and 54 is designed to interface with the control assembly in a single direction. For example, a pump cassette such as 5602 will typically include an asymmetric feature, such as placement of tubing, or other interlock that prevents pump cassette 5602 from being inserted into the system incorrectly. Pump cassette 5602 may preferably also include a top rib (not shown) that limits vertical travel of the pump cassette 5602 when the pump cassette 5602 is installed in a pump, as well as a peripheral rib (not shown) extending along portions of the sides and bottom of pump cassette 5602 that is used to hold the cassette within a cassette receptacle.

The various valves 5620-5626 depicted in FIG. 53 are commonly referred to as "volcano" valves and are used to open and close various fluid pathways within pump cassette 5602. The volcano valves and the pumping chambers may be operated pneumatically from the rear of pump cassette 5602, as discussed below.

A control assembly capable of operating the pump cassette 5602 is utilized in conjunction with pump cassette 5602. The control assembly includes pneumatic pathways that interface with a receiving surface through which pump cassette 5602 is operated. The receiving surface may be, without limitation, a bezel gasket that is part of a bezel assembly. During operation, pump cassette 5602 is aligned and pressed against the bezel gasket by a movable member. Air lines connected to the bezel assembly are controlled pneumatically, and used to displace membranes of the bezel gasket to operate the various valves and chambers of pump cassette 5602.

Figure 56:
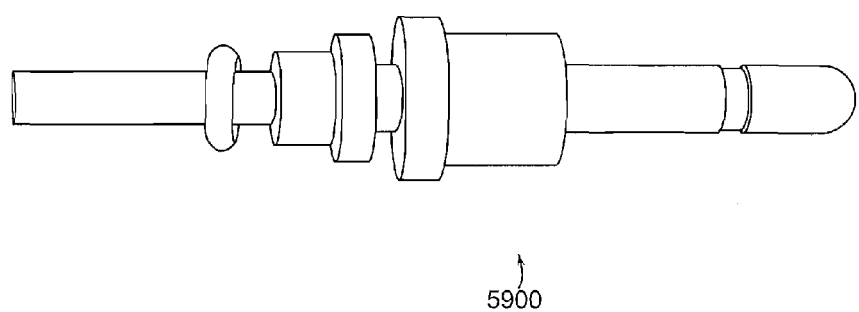
FIG. 56 shows a conductivity sensor probe for measuring conductivity of the water.

FIG. 56 shows a conductivity sensor probe 5900 for use in pump cassette 5610, in accordance with a particular embodiment of the invention. Without intending to be limited, any of the various accessory pumps or pumping means described, for example, in FIGS. 1A, 10, 12C, 13, 14B, 57 (below) and elsewhere throughout this application, may utilize pumps designed in accordance with pump cassette 5502 as described in FIGS. 53-56.

Alternative embodiments of the system may employ fluid management system pumps, such as reciprocating positive-displacement pumps wherever an accessory pump is required or desired. For example, siphon pump 32 (see FIGS. 10, 12C and 13), intake pump 00 (see FIG. 1A), circulating pump 43BB (see FIG. 14B), and pumps for the blowdown stream 43, the condensed product 41, the air through the HEPA filter, the volatile mixer 23 (see FIG. 14A), for scale control and pressure control, for adding liquid to the liquid ring pump and pumping mechanisms inline with the cold intake, or in communication with the fluid distribution manifolds, may all be a reciprocating positive-displacement pod. Such pumps are described thoroughly in U.S. Patent Application Ser. No. 60/792,073 for Extracorporeal Thermal Therapy Systems and Methods" filed Apr. 14, 2006, as mentioned above, the contents of which are hereby incorporated by reference herein.

In one embodiment the pod pump is a reciprocating positive-displacement pump with a hemispherical rigid chamber wall; a flexible membrane attached to the rigid chamber wall, so that the flexible membrane and rigid chamber wall define a pumping chamber; an inlet for directing flow through the rigid chamber and an outlet for directing flow through the rigid chamber wall out of the pumping chamber. A reciprocating positive-displacement pump is provided comprising a rigid hemispherical chamber wall; a flexible membrane attached to the rigid chamber wall, so that the flexible membrane and rigid chamber wall define a pumping chamber; an inlet for directing flow through the rigid chamber wall into the pumping chamber in a direction that is substantially tangential to the rigid chamber wall; and an outlet for directing flow through the rigid chamber wall out of the pumping chamber in a direction that is substantially tangential to the rigid chamber wall. In other embodiments, the reciprocating positive-displacement pump also includes a rigid limit structure for limiting movement of the membrane and limiting the maximum volume of the pumping chamber, the flexible membrane and the rigid limit structure defining an actuation chamber. The rigid limit structure is preferably adapted to limit movement of the flexible membrane such that, when the pumping chamber is at maximum volume, the rigid chamber and the flexible membrane (which will be urged against the rigid limit structure) define the pumping chamber as a spherical volume. The rigid limit structure is preferably a hemispherical limit wall that, together with the flexible membrane, defines a spherical actuation chamber when the pumping chamber is at minimum volume.

As described above, various embodiments of this invention may advantageously provide a low-cost, easily maintained, highly efficient, portable, and failsafe liquid purification system that can provide a reliable source of drinking water for use in all environments regardless of initial water quality. The system of the present invention is intended to produce a continuous stream of potable water, for drinking or medical applications, for example, on a personal or limited community scale using a portable power source and moderate power budget. As an example, at the desired efficiency ratio, it is envisioned that the present system may be utilized to produce approximately 10 gallons of water per hour on a power budget of approximately 500 watts. This may be achieved through a very efficient heat transfer process and a number of subsystem design optimizations.

Knowledge of operating temperatures, TDS, and fluid flows provides information to allow production of potable water under a wide range of ambient temperatures, pressures, and dissolved solid content of the source water. One particular embodiment may utilize a control method whereby such measurements (T, P, TDS, flow rates, etc) are used in conjunction with a simple algorithm and look-up table allowing an operator or computer controller to set operating parameters for optimum performance under existing ambient conditions.

Embodiments of the present invention may be described and used as indicated in the following listing, which is neither exhaustive nor limiting:

What is claimed is:

1. A water vapor distillation system comprising:
   a compressor upstream from a condenser, the compressor having a rotatable housing;
   at least one capacitive level sensor for measuring the level of water in the compressor;
   a controller for receiving information from the at least one capacitive level sensor; and
   at least one variable flow valve coupled to the at least one capacitive level sensor and controlled by the controller, wherein the at least one capacitive level sensor, the controller and the at least one variable flow valve maintain the level of water in the compressor in the water vapor distillation system,
wherein the water vapor distillation system further comprising:
   means for distilling source water to produce product water;
   means for measuring the conductivity of the product water;
   means for determining whether the conductivity of the product water is below a pre-set level; and
   if the conductivity of the product water is below a pre-set level, means for triggering a signal mechanism to pump a volume of at least one additive into the product water.

2. A water vapor distillation system comprising:
   a compressor upstream from a condenser, the compressor having a rotatable housing, the water vapor distillation system configured to:
      drive the compressor with vapor from the water distillation system;
      control pressure within the compressor with at least one valve; and
      add water to the compressor as needed;
   at least one capacitive level sensor for measuring the level of water in the compressor;
   a controller for receiving information from the at least one capacitive level sensor; and
   at least one variable flow valve coupled to the at least one capacitive level sensor and controlled by the controller, wherein the at least one capacitive level sensor, the controller and the at least one variable flow valve maintain the level of water in the compressor in the water vapor distillation system,
   wherein the water vapor distillation system further comprising:
   means for distilling source water using a water vapor distillation system;
   means for measuring conductivity of product water;
   means for determining whether the conductivity of the product water is below a pre-set level; and
   if the conductivity of the product water is below a pre-set level, means for triggering a signal mechanism to pump a volume of at least one additive into the product water.

3. A method for controlling a vapor pump of a water distillation system, the method comprising:
   driving a liquid ring vapor pump with vapor from the water distillation system using the water distillation system comprising:
      a compressor upstream from a condenser, the compressor having a rotatable housing;
      at least one capacitive level sensor for measuring the level of water in the compressor;
      a controller for receiving information from the at least one capacitive level sensor; and
      at least one variable flow valve coupled to the at least one capacitive level sensor and controlled by the controller, wherein the at least one capacitive level sensor, the controller and the at least one variable flow valve maintain the level of water in the compressor in the water vapor distillation system;
   controlling pressure within the liquid ring vapor pump with at least one valve; and
   adding water to the liquid ring vapor pump as needed.

* * * * *